United States Patent
Ikeda et al.

(10) Patent No.: US 9,174,552 B2
(45) Date of Patent: Nov. 3, 2015

(54) DRIVING-ENVIRONMENT SETUP SYSTEM, IN-VEHICLE DEVICE AND PROGRAM THEREOF, PORTABLE DEVICE AND PROGRAM THEREOF, MANAGEMENT DEVICE AND PROGRAM THEREOF

(75) Inventors: Hirotane Ikeda, Nagoya (JP); Toshihiro Hattori, Okazaki (JP); Mitsuyasu Matsuura, Chiryu (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 2307 days.

(21) Appl. No.: 12/071,929

(22) Filed: Feb. 28, 2008

(65) Prior Publication Data

US 2008/0215209 A1 Sep. 4, 2008

(30) Foreign Application Priority Data

Mar. 2, 2007 (JP) .................................. 2007-52941

(51) Int. Cl.
| | |
|---|---|
| B60R 25/25 | (2013.01) |
| B60N 2/00 | (2006.01) |
| B60H 1/00 | (2006.01) |
| B60R 25/20 | (2013.01) |
| B60R 25/30 | (2013.01) |
| B62D 1/181 | (2006.01) |

(52) U.S. Cl.
CPC ............ *B60N 2/002* (2013.01); *B60H 1/00742* (2013.01); *B60R 25/2081* (2013.01); *B60R 25/25* (2013.01); *B60R 25/252* (2013.01); *B60R 25/255* (2013.01); *B60R 25/257* (2013.01); *B60R 25/305* (2013.01); *B62D 1/181* (2013.01)

(58) Field of Classification Search
USPC ..................................................... 701/49, 36
See application file for complete search history.

(56) References Cited

U.S. PATENT DOCUMENTS

| | | | | |
|---|---|---|---|---|
| 6,198,996 | B1 * | 3/2001 | Berstis | ............................ 701/36 |
| 6,304,817 | B1 * | 10/2001 | Troedel | ......................... 701/539 |
| 7,301,441 | B2 | 11/2007 | Inada et al. | |
| 7,937,075 | B2 * | 5/2011 | Zellner | ......................... 455/418 |
| 2003/0086588 | A1 | 5/2003 | Shinada et al. | |
| 2005/0237150 | A1 * | 10/2005 | Sun et al. | ...................... 340/5.52 |
| 2006/0147093 | A1 | 7/2006 | Sanse et al. | |
| 2006/0290503 | A1 | 12/2006 | Sumida et al. | |

FOREIGN PATENT DOCUMENTS

| | | |
|---|---|---|
| JP | A-H10-160496 | 6/1998 |
| JP | A-H11-313410 | 11/1999 |

(Continued)

OTHER PUBLICATIONS

Office Action mailed Nov. 8, 2011 in corresponding JP Application No. 2007-052941 (and English Translation).

*Primary Examiner* — Keith Frisby
(74) *Attorney, Agent, or Firm* — Posz Law Group, PLC

(57) ABSTRACT

A driving-environment setup system has a plurality of portable devices, each of which transmits a feature identification information item used for identifying a physical feature of an associated user of the each of the plurality of portable devices and transmits an environment identification information item used for identifying a driving environment for the associated user. An in-vehicle device of the system detects a physical feature of a person sitting in a driver's seat and identifies one of the associated users as a driver when the physical feature identified based on the received feature identification information item of the one of the associated users corresponds to the detected physical feature. The in-vehicle device sets a driving environment for the driver based on the received environment identification information item.

43 Claims, 25 Drawing Sheets

(56) References Cited

FOREIGN PATENT DOCUMENTS

| JP | A-2002-288670 | 10/2002 |
| JP | A-2003-237504 | 8/2003 |
| JP | A-2004-001765 | 1/2004 |
| JP | A-2004-005345 | 1/2004 |
| JP | A-2006-004180 | 1/2006 |
| JP | A-2007-295524 | 11/2007 |
| WO | WO 2006/095688 | 9/2006 |

* cited by examiner

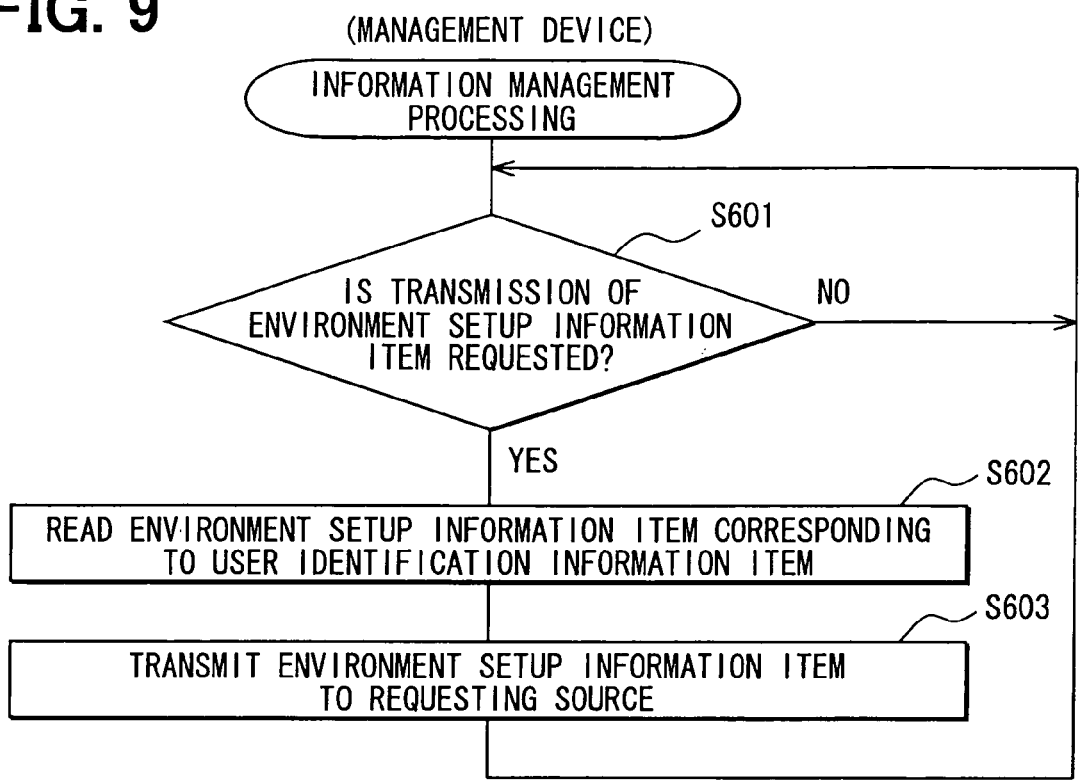
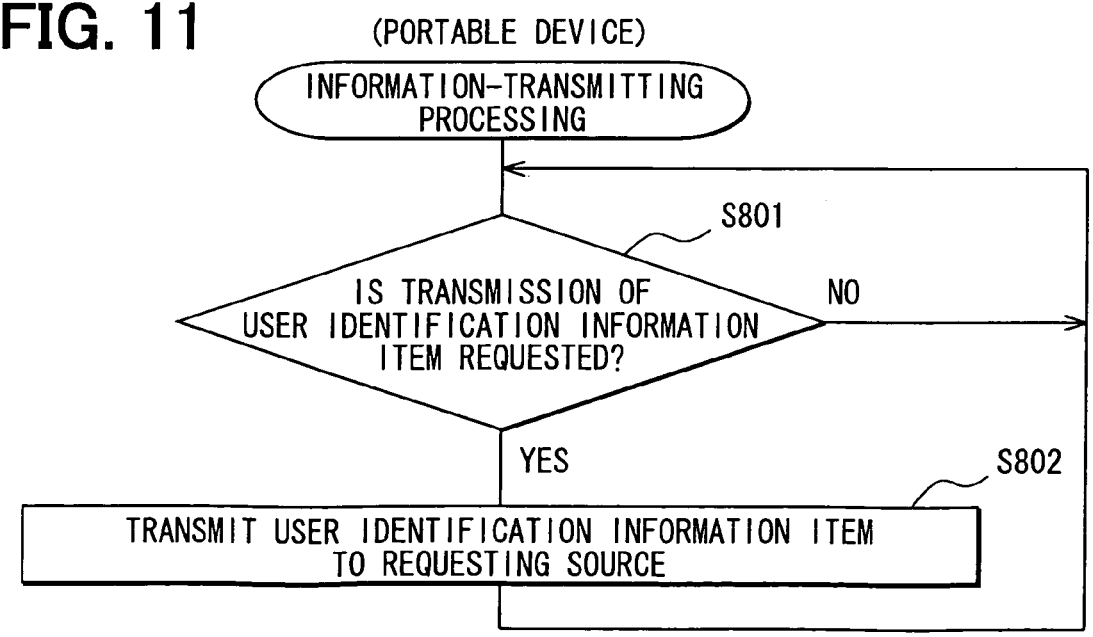

FIG. 15
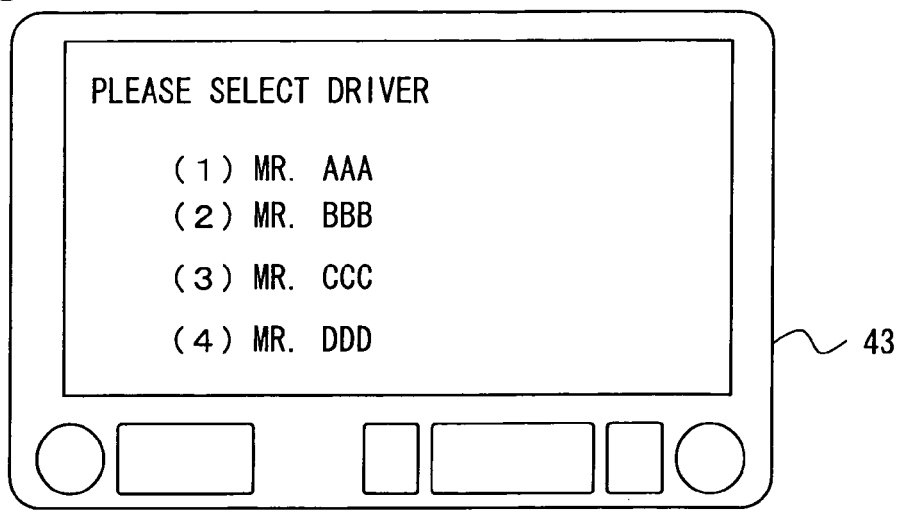
FIG. 16 (PERSONAL IDENTIFICATION DEVICE)
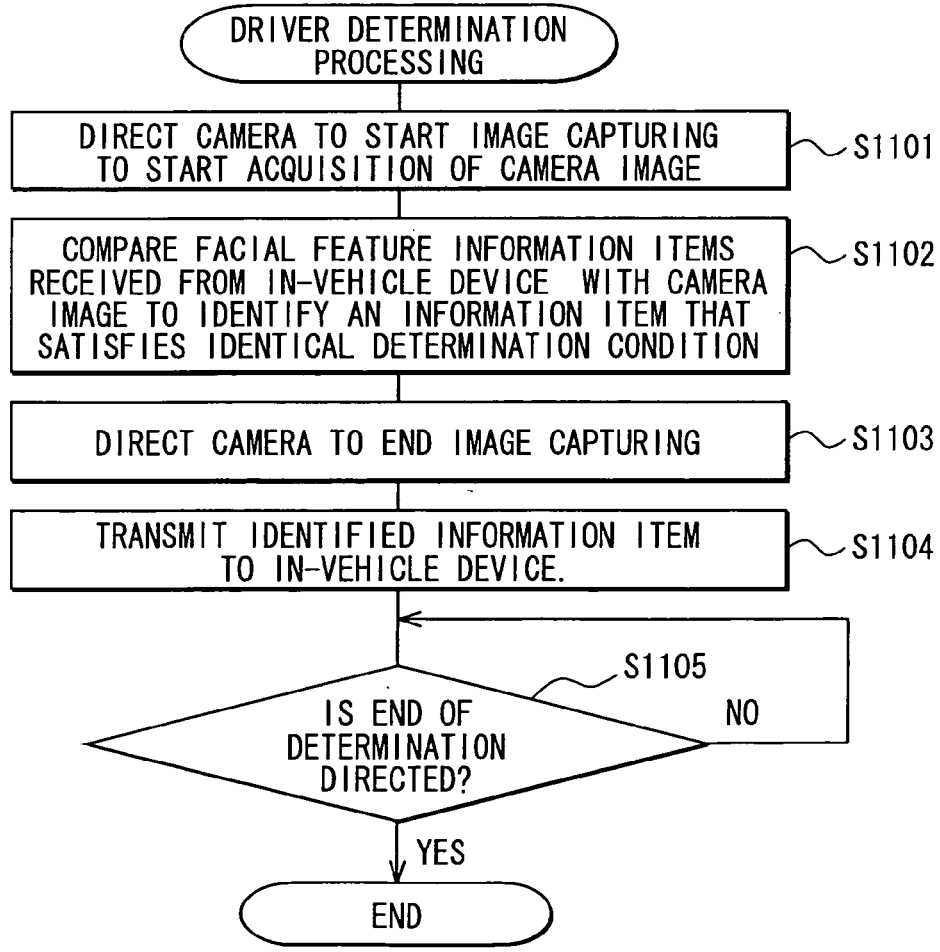

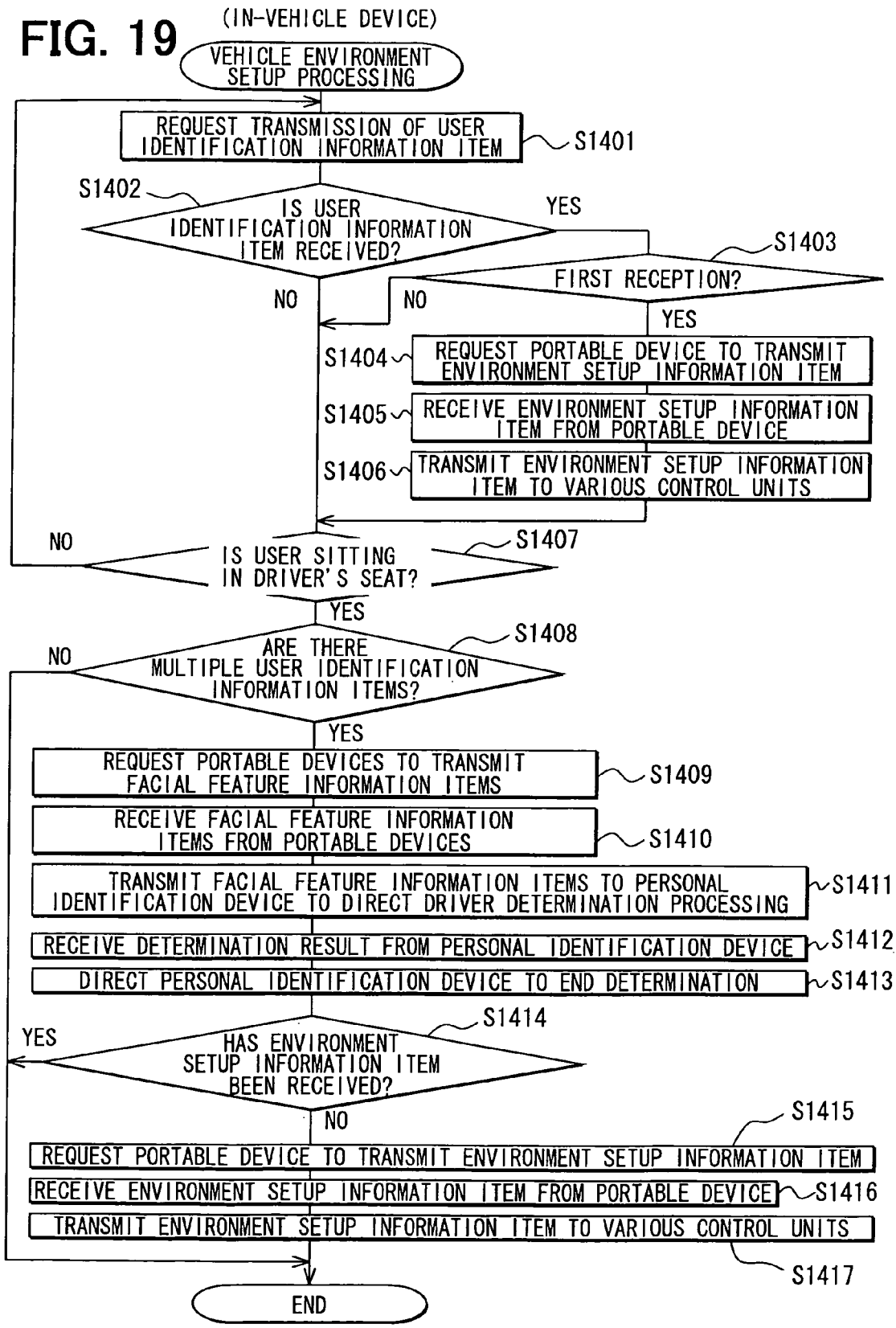

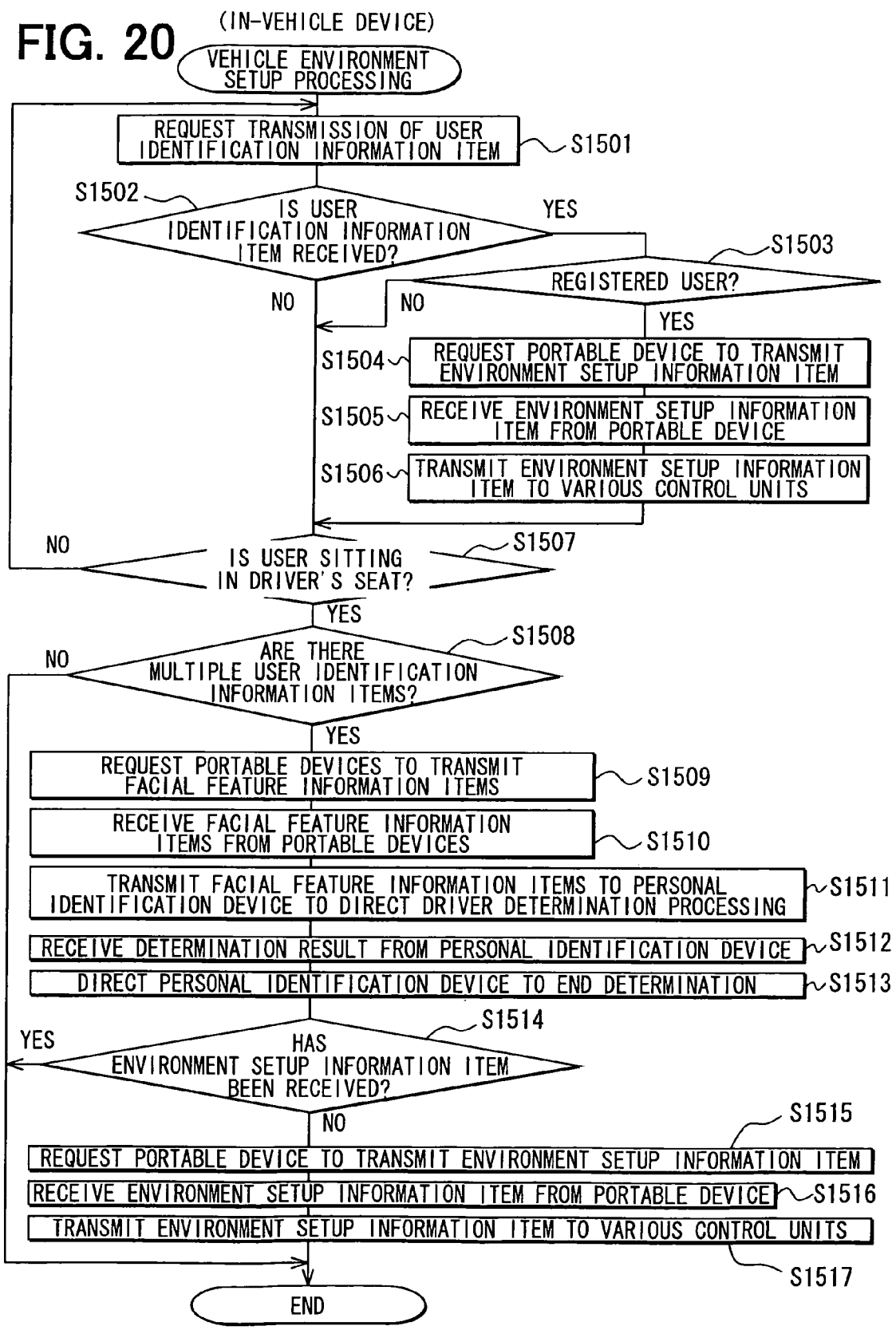

DRIVING-ENVIRONMENT SETUP SYSTEM, IN-VEHICLE DEVICE AND PROGRAM THEREOF, PORTABLE DEVICE AND PROGRAM THEREOF, MANAGEMENT DEVICE AND PROGRAM THEREOF

CROSS REFERENCE TO RELATED APPLICATION

This application is based on and incorporates herein by reference Japanese Patent Application No. 2007-52941 filed on Mar. 2, 2007.

BACKGROUND OF THE INVENTION

1. Field of the Invention

The present invention relate to a driving-environment setup system which sets up a driving environment of a vehicle.

2. Description of Related Art

Conventionally, in a vehicle, various setups are possible, such as a seat position, a steering wheel position, angles of various mirrors, an air-conditioning setup, an audio system setup, and a navigation system setup. The driving environment of the vehicle can be changed according to a driver's liking. However, when two or more users share the same vehicle to drive, a driving environment must be set up whenever a driver changes,.

Accordingly, JP-A-2003-237504 proposes a system which recognizes a driver who rides a vehicle and sets the driving environment of the vehicle as a driving environment for the recognized driver. In this system, a scanner for taking an image of the picture of a driver's license is installed in the vehicle, and a user who rides the vehicle operates the scanner to take his or her image of the driver's license. By the above operation, the driving environment of the vehicle is set as the driving environment for the driver recognized through the scanner.

In the above-described construction, a user who rides a vehicle does not need to perform the operation itself to set up the driving environment of the vehicle, but needs to operate a scanner to take an image of a driver's license. Therefore, the user is made conscious of the setting operation of the driving environment. In order to set up a driving environment of a vehicle, without making a user conscious of the setting operation of the driving environment, there may be provided a construction, in which a user is made to carry a portable device that stores information regarding a driving environment for the user, for example, and the vehicle automatically acquires the information from the portable device of the user when the user rides the vehicle.

Such construction will work satisfactorily if there is only one user who rides the vehicle. However, when two or more users, each possessing a portable device, ride the vehicle, it is easy to imagine that the driving environment of the vehicle will be set as a driving environment for an occupant other than the driver (a fellow passenger).

SUMMARY OF THE INVENTION

The present invention has been made in view of the above disadvantages, and it is an object of the present invention to provide a driving-environment setup system which can set the driving environment of a vehicle as a driving environment for a driver, even when two or more users ride or get in the vehicle.

According to a first aspect of the disclosure, a driving-environment setup system includes an in-vehicle device mounted on a vehicle and a plurality of portable devices capable of being carried in the vehicle. Each of the plurality of portable devices includes feature information transmitting means and environmental information transmitting means. The feature information transmitting means transmits, to the in-vehicle device, a feature identification information item used for identifying a physical feature of an associated user of the each of the plurality of portable devices. The environmental information transmitting means transmits, to the in-vehicle device, an environment identification information item used for identifying a driving environment for the associated user. The in-vehicle device includes feature detection means, driver identifying means, and driving-environment setup means. The feature detection means detects a physical feature of a person sitting in a driver's seat of the vehicle. The driver identifying means identifies one of the associated users as a driver of the vehicle when the physical feature identified based on the received feature identification information item of the one of the associated users corresponds to the physical feature detected by the feature detection means. The driving-environment setup means sets a driving environment of the vehicle for the driver based on the received environment identification information item of the one of the associated users.

According to a second aspect of the disclosure, an in-vehicle device includes driver identifying means and driving-environment setup means. The in-vehicle device is mounted on a vehicle for being capable of communicating with a plurality of portable devices. The plurality of portable devices are capable of being carried in the vehicle. Each of the plurality of portable devices transmits, to the in-vehicle device, a feature identification information item used for identifying a physical feature of an associated user of the each of the plurality of portable devices. The each of the plurality of portable devices transmits, to the in-vehicle device, an environment identification information item used for identifying a driving environment for the associated user. The driver identifying means identifies one of the associated users as a driver of the vehicle when the physical feature identified based on the feature identification information item of the one of the associated users corresponds to a physical feature detected from a person sitting in a driver's seat of the vehicle. The driving-environment setup means sets a driving environment of the vehicle for the driver based on the received environment identification information item of the one of the associated users.

According to a third aspect of the disclosure, a portable device for an associated user includes feature information transmitting means and environmental information transmitting means. The portable device is capable of communicating with an in-vehicle device mounted in a vehicle. The portable device is capable of being carried in the vehicle. The in-vehicle device detects a physical feature of a person sitting in a driver's seat of the vehicle. The in-vehicle device identifies the associated user as a driver of the vehicle when a physical feature identified based on a received feature identification information item of the associated user corresponds to a physical feature detected by the in-vehicle device. The in-vehicle device sets a driving environment of the vehicle for the driver based on a received environment identification information item of the associated user. The feature information transmitting means transmits, to the in-vehicle device, the feature identification information item used for identifying the physical feature of the associated user of the portable device. The environmental information transmitting means transmits, to the in-vehicle device, the environment identification information item used for identifying the driving environment for the associated user.

According to a fourth aspect of the disclosure, a management device capable of communicating with a plurality of portable devices and an in-vehicle device mounted in a vehicle includes storing means and setup information replying means. The plurality of portable devices are capable of being carried in the vehicle. Each of the plurality of portable devices transmits, to the in-vehicle device, a feature identification information item used for identifying a physical feature of an associated user of the each of the plurality of portable devices. The each of the plurality of portable devices transmits, to the in-vehicle device, an environment identification information item used for identifying an environment setup information item indicative of a driving environment of the associated user of the each of the plurality of portable devices among environment setup information items stored in the management device. The in-vehicle device detects a physical feature of a person sitting in a driver's seat of the vehicle. The in-vehicle device identifies one of the associated users as a driver of the vehicle when a physical feature identified based on the received feature identification information item of the one of the associated users corresponds to the physical feature detected by the in-vehicle device. The in-vehicle device acquires the environment setup information item of the one of the associated users by transmitting the received environment identification information item of the one of the associated users to the management device. The in-vehicle device sets the driving environment of the vehicle for the driver as the driving environment indicated by the acquired environment setup information item. The storing means stores the environment setup information item indicative of the driving environment of the associated user of the each of the plurality of portable devices. The setup information replying means transmits, to the in-vehicle device, the environment setup information item identified based on the environment identification information item, when the environment identification information item is received from the in-vehicle device.

According to a fifth aspect of the disclosure, a management device capable of communicating with a plurality of portable devices and an in-vehicle device mounted in a vehicle includes storing means and feature information replying means. The plurality of portable devices are capable of being carried in the vehicle, wherein each of the plurality of portable devices transmits, to the in-vehicle device, a feature identification information item used for identifying a feature information item indicative of a physical feature of an associated user of the each of the plurality of portable devices among feature information items stored in the management device, wherein the each of the plurality of portable devices transmits, to the in-vehicle device, an environment identification information item used for identifying a driving environment for the associated user, wherein the in-vehicle device detects a physical feature of a person sitting in a driver's seat of the vehicle, wherein the in-vehicle device acquires the feature information item of the associated user of the each of the plurality of portable devices by transmitting the received feature identification information item of the associated user to the management device, wherein the in-vehicle device identifies one of the associated users as a driver of the vehicle when a physical feature indicated by the acquired feature information item of the one of the associated users corresponds to the physical feature detected by the in-vehicle device, and wherein the in-vehicle device sets a driving environment of the vehicle for the driver based on the received environment setup information item of the one of the associated users. The storing means stores the feature information item indicative of the physical feature of the associated user of the each of the plurality of portable devices. The feature information replying means transmits, to the in-vehicle device, the feature information item identified based on the feature identification information item, when the feature identification information item is received from the in-vehicle device.

According to a sixth aspect of the disclosure, an article manufacture for an in-vehicle device mounted on a vehicle includes a computer readable medium and program instructions. The in-vehicle device is capable of communicating with a plurality of portable devices, wherein the plurality of portable devices are capable of being carried in the vehicle, wherein each of the plurality of portable devices transmits, to the in-vehicle device, a feature identification information item used for identifying a physical feature of an associated user of the each of the plurality of portable devices, and wherein the each of the plurality of portable devices transmits, to the in-vehicle device, an environment identification information item used for identifying a driving environment for the associated user. The computer readable medium is readable by a computer. The program instructions are carried by the computer readable medium for causing the computer to serve as driver identifying means and driving-environment setup means. The driver identifying means identifies one of the associated users as a driver of the vehicle when the physical feature identified based on the feature identification information item of the one of the associated users corresponds to a physical feature detected from a person sitting in a driver's seat of the vehicle. The driving-environment setup means sets a driving environment of the vehicle for the driver based on the received environment identification information item of the one of the associated users.

According to a seventh aspect of the disclosure, an article manufacture for a portable device for an associated user includes a computer readable medium and program instructions. The portable device is capable of communicating with an in-vehicle device mounted in a vehicle, wherein the portable device is capable of being carried in the vehicle, wherein the in-vehicle device detects a physical feature of a person sitting in a driver's seat of the vehicle, wherein the in-vehicle device identifies the associated user as a driver of the vehicle when a physical feature identified based on a received feature identification information item of the associated user corresponds to a physical feature detected by the in-vehicle device, and wherein the in-vehicle device sets a driving environment of the vehicle for the driver based on a received environment identification information item of the associated user. The computer readable medium is readable by a computer. The program instructions are carried by the computer readable medium for causing the computer to serve as feature information transmitting means and environmental information transmitting means. The feature information transmitting means transmits, to the in-vehicle device, the feature identification information item used for identifying the physical feature of the associated user of the portable device. The environmental information transmitting means transmits, to the in-vehicle device, the environment identification information item used for identifying the driving environment for the associated user.

According to an eighth aspect of the disclosure, an article manufacture for a management device capable of communicating with a plurality of portable devices and an in-vehicle device mounted in a vehicle includes a computer readable medium and program instructions. The plurality of portable devices are capable of being carried in the vehicle, wherein each of the plurality of portable devices transmits, to the in-vehicle device, a feature identification information item used for identifying a physical feature of an associated user of the each of the plurality of portable devices, wherein the each of the plurality of portable devices transmits, to the in-vehicle device, an environment identification information item used for identifying an environment setup information item indicative of a driving environment of the associated user of the each of the plurality of portable devices among environment setup information items stored in the management device, wherein the in-vehicle device detects a physical feature of a person sitting in a driver's seat of the vehicle, wherein the in-vehicle device identifies one of the associated users as a driver of the vehicle when a physical feature identified based on the received feature identification information item of the one of the associated users corresponds to the physical feature detected by the in-vehicle device, wherein the in-vehicle device acquires the environment setup information item of the one of the associated users by transmitting the received environment identification information item of the one of the associated users to the management device, and wherein the in-vehicle device sets the driving environment of the vehicle for the driver as the driving environment indicated by the acquired environment setup information item. The computer readable medium is readable by a computer. The program instructions are carried by the computer readable medium for causing the computer to serve as storing means and setup information replying means. The storing means stores the environment setup information item indicative of the driving environment of the associated user of the each of the plurality of portable devices. The setup information replying means transmits, to the in-vehicle device, the environment setup information item identified based on the environment identification information item, when the environment identification information item is received from the in-vehicle device.

According to a ninth aspect of the disclosure, an article manufacture for a management device capable of communicating with a plurality of portable devices and an in-vehicle device mounted in a vehicle includes a computer readable medium and program instructions. The plurality of portable devices are capable of being carried in the vehicle, wherein each of the plurality of portable devices transmits, to the in-vehicle device, a feature identification information item used for identifying a feature information item indicative of a physical feature of an associated user of the each of the plurality of portable devices among feature information items stored in the management device, wherein the each of the plurality of portable devices transmits, to the in-vehicle device, an environment identification information item used for identifying a driving environment for the associated user, wherein the in-vehicle device detects a physical feature of a person sitting in a driver's seat of the vehicle, wherein the in-vehicle device acquires the feature information item of the associated user of the each of the plurality of portable devices by transmitting the received feature identification information item of the associated user to the management device, wherein the in-vehicle device identifies one of the associated users as a driver of the vehicle when a physical feature indicated by the acquired feature information item of the one of the associated users corresponds to the physical feature detected by the in-vehicle device, and wherein the in-vehicle device sets a driving environment of the vehicle for the driver based on the received environment setup information item of the one of the associated users. The computer readable medium is readable by a computer. The program instructions are carried by the computer readable medium for causing the computer to serve as storing means and feature information replying means. The storing means stores the feature information item indicative of the physical feature of the associated user of the each of the plurality of portable devices. The feature information replying means transmits, to the in-vehicle device, the feature information item identified based on the feature identification information item, when the feature identification information item is received from the in-vehicle device.

According to a tenth aspect of the disclosure, an in-vehicle device mounted on a vehicle includes feature detection means, driver identifying means, and driving-environment setup means. The in-vehicle device is capable of communicating with a plurality of portable devices, each of which transmits identification information unique to the each of the plurality of portable devices. The feature detection means detects a physical feature of a person sitting in a driver's seat of the vehicle. The driver identifying means determines whether the physical feature detected by the feature detection means corresponds to a predetermined physical feature identified based on the identification information received from one of the plurality of portable devices. The driving-environment setup means sets a driving environment of the vehicle as a predetermined driving environment identified based on the identification information received from the one of the plurality of the portable devices when the driver identifying means determines that the detected physical feature corresponds to the predetermined physical feature of the one of the plurality of the portable devices.

According to an eleventh aspect of the disclosure, a driving-environment setup system includes an in-vehicle device mounted on a vehicle and a portable device capable of being carried in the vehicle. The portable device includes feature information transmitting means and environmental information transmitting means. The feature information transmitting means transmits, to the in-vehicle device, feature identification information item used for identifying a physical feature of an associated user of the portable device. The environmental information transmitting means transmits, to the in-vehicle device, environment identification information item used for identifying a driving environment for the associated user of the portable device. The in-vehicle device includes feature detection means, driver identifying means, and driving-environment setup means. The feature detection means detects a physical feature of a person sitting in a driver's seat of the vehicle. The driver identifying means determines whether the physical feature detected by the feature detection means corresponds to the physical feature identified based on the received feature identification information item of the associated user of the portable device. The driving-environment setup means sets a driving environment of the vehicle as the driving environment identified based on the received environment identification information item of the associated user when the driver identifying means determines that the detected physical feature corresponds to the identified physical feature of the associated user.

BRIEF DESCRIPTION OF THE DRAWINGS

Embodiments of the present invention will be described in detail based on the following figures, wherein:

FIG. 9 is a flow chart illustrating an information management processing according to the second embodiment;

FIG. 11 is a flow chart illustrating an information-transmitting processing according to the third embodiment;

FIG. 15 is an explanatory drawing of a display device displaying names of the users;

FIG. 16 is a flow chart illustrating a driver determination processing according to the fourth embodiment;

FIG. 19 is a flow chart illustrating a vehicle environment setup processing according to a sixth embodiment of the present invention;

FIG. 20 is a flow chart illustrating a vehicle environment setup processing according to a seventh embodiment of the present invention;

DETAILED DESCRIPTION OF PREFERRED EMBODIMENTS

Hereinafter, with reference to the accompanying drawings, the embodiments of the present invention are explained in detail.

[1 First Embodiment]

First, a driving-environment setup system according to a first embodiment of the present invention is explained.

[1-1 Entire Configuration]

Figure 1:
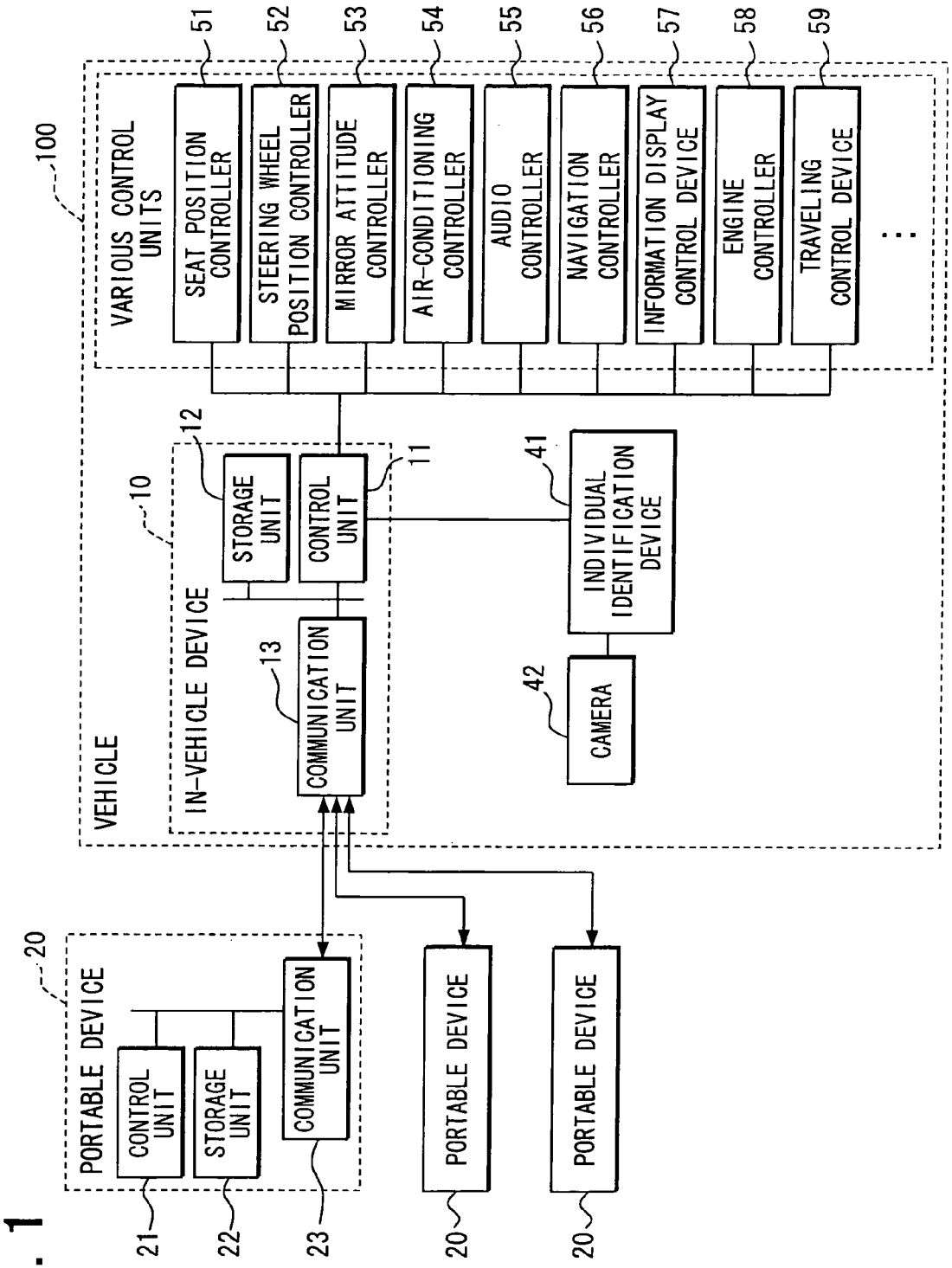
FIG. 1 is a block diagram illustrating an outline structure of a driving-environment setup system according to a first embodiment of the present invention.

FIG. 1 is a block diagram illustrating an outline structure of a driving-environment setup system according to the first embodiment.

The present driving-environment setup system is for automatically setting a driving environment of a vehicle 100 as a driving environment for a user, when the user who serves as the driver rides or gets in the vehicle 100. The present driving-environment setup system includes an in-vehicle device 10 and a portable device 20.

Here, the concrete construction of the devices 10 and 20 of the driving-environment setup system is explained.

[1-1-1 Construction of an In-Vehicle Device]

The in-vehicle device 10 is used in the state where it is mounted in the vehicle 100. When there exist two or more vehicles 100 which use the driving-environment setup system, each of the two or more vehicles 100 is mounted with one driving-environment setup system.

The in-vehicle device 10 possesses or includes a control unit 11, a storage unit 12, and a communication unit 13.

The control unit 11 includes as a main element a microcomputer having a CPU, a ROM, a RAM, and executes various processing. The control unit 11 is coupled for capable of communicating with a personal identification device 41 and various control units 51-59 which are mounted in the vehicle 100.

Here, the personal identification device 41 is for authenticating a user sitting in the driver's seat based on his or her physical feature. To be specific, a camera 42 is installed ahead of the driver's seat inside the vehicle 100, and can take an image of a face of a user sitting in the driver's seat. The personal identification device 41 performs authentication by detecting a facial feature point from the taken image of the camera 42 as the driver's physical feature. Other devices for other in-vehicle systems, such as an inattentive driving prevention device, may be used as the personal identification device 41 and the camera 42.

Various control units 51-59 enable a setup (change) of the driving environment according to a driver's liking. In the present embodiment, a seat position controller 51, a steering wheel position controller 52, a mirror attitude controller 53, an air-conditioning controller 54, an audio controller 55, a navigation controller 56, an information display control device 57, an engine controller 58, and a traveling control device 59 are mounted.

These control units 51-59 are operable to set or change the driving environment, according to the external operation by the user who rides the vehicle 100. For example, the seat position controller 51 adjusts the position of the driver's electric seat (the height of the seat surface, the position in the back-and-forth direction, etc.), according to the external operation. Here, the driving environment (the height of the seat surface, the position in the back-and-forth direction, etc.)

realizable with the seat position controller 51 is indicated as the environment setup information item (for example, numerical data). The seat position controller 51 is operable to reproduce the driving environment indicated by the environment setup information item, when the environment setup information item is directly inputted from the exterior. That is, if the environment setup information item is inputted, the driving environment can be reproduced correctly, without performing fine tuning by the external operation, etc.

In the above, the seat position controller 51 is explained as an example. The other control units 52-59 are similarly operable to reproduce the driving environment indicated by the environment setup information item, when the environment setup information item is inputted.

The storage unit 12 is operable to store a variety of information. The vehicles identification information which is identification information unique to the in-vehicle device 10 concerned is stored in the storage unit 12 in advance.

The communication unit 13 is for performing a short distance radio communication with the portable device 20, and enables radio communication with the portable device 20 which exists in a communications area or in an area, in which the short distance radio communication is enabled, covering at least the entire of the inside of the vehicle 100 in which the in-vehicle device 10 concerned is mounted. Examples of the short distance radio communication include Bluetooth (registered trademark), DSRC (Dedicated Short Range Communication), wireless LAN, ZIGBEE (registered trademark), etc.

[1-1-2 Construction of a Portable Device]

The portable device 20 is a portable terminal which the user who rides the vehicle 100 can carry, and is possessed by a user who uses the present driving-environment setup system (a user who can drive the vehicle 100). When there are two or more users who use the present driving-environment setup system, each user possesses one portable device 20.

The portable device 20 includes a control unit 21, a storage unit 22, and a communication unit 23.

The control unit 21 includes as a main element a microcomputer having a CPU, a ROM, a RAM, etc., and executes various processing.

The storage unit 22 is operable to store a variety of information or various information items. The storage unit 22 prestores user identification information, which is identification information unique to a user or an associated user who possesses the portable device 20, facial feature information, which is indicative of the user's facial feature point, and environment setup information, which is indicative of the driving environment for the user.

The environment setup information item is stored in the storage unit 22 of the portable device 20 with a predetermined procedure. In the present embodiment, when registration operation of the environment setup information item is performed in the portable device 20 after the driving environment for the user is set up by the user's external operation in the vehicle 100, the portable device 20 transmits the registration directions of the environment setup information item to the in-vehicle device 10. Then, the in-vehicle device 10 which has received the registration directions transmits the environment setup information item indicative of the current driving environment of the vehicle 100 to the portable device 20 as a transmitting source, and the portable device 20 stores the received environment setup information item in the storage unit 22. Here, the current driving environment a driving environment, which the user has set up through the external operation by the time of registration procedure.

The communication unit 23 is for performing a short distance radio communication with the in-vehicle device 10, and able to perform radio communication with the in-vehicle device 10 in a communications area which covers the entire of the cabin or the occupant compartment of the vehicle 100.

In the driving-environment setup system of the present embodiment, a portable telephone terminal is employed as the portable device 20.

[1-2 Processing Performed by a Driving-Environment Setup System]

Next, the processing performed by the devices 10 and 20 which are included in the driving-environment setup system of the first embodiment is explained.

[1-2-1 Processing Performed by an In-Vehicle Device]

Figure 2:
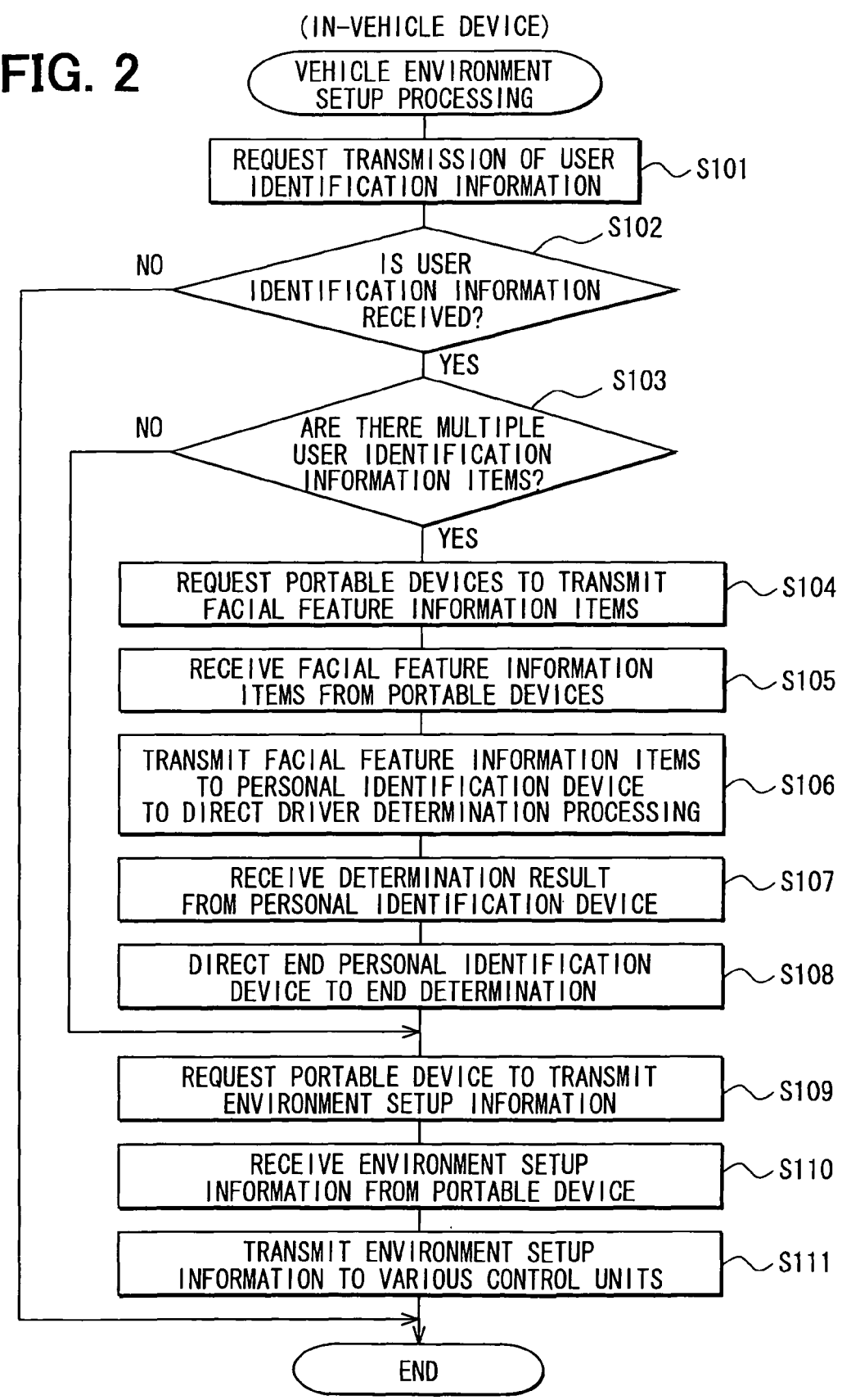
FIG. 2 is a flow chart illustrating a vehicle environment setup processing according to the first embodiment.

First, the vehicle environment setup processing performed by the control unit 11 of the in-vehicle device 10 is explained using a flow chart of FIG. 2. This vehicle environment setup processing is started at the time when a driver is detected to ride in the vehicle 100. Detection of the driver to ride in the vehicle 100 can be performed by, for example, detecting a user's seating with a sitting sensor provided in the driver's seat.

When the vehicle environment setup processing is started, first, in Step S101, the control unit 11 transmits an identification information-sending request which is a request to the portable device 20 for the transmission of the user identification information, using a short distance radio communication in order to detect that the user is in a state of riding the vehicle 100. Consequently, when the portable device 20 exists in the communications area (when a user who possesses the portable device 20 has ridden the vehicle 100), the user identification information stored in the portable device 20 is transmitted to the in-vehicle device 10 concerned (Step S302 in the information-transmitting processing (FIG. 4) described later). That is, it is so designed that the portable device 20 (user) which exists in the communications area is detected by receiving the user identification information transmitted by the portable device 20 in response to the identification information-sending request.

Then, in Step S102, it is determined whether the user identification information is received.

When it is determined in Step S102 that no user identification information is received (for instance, when the user who rides the vehicle 100 does not possess the portable device 20), the present vehicle environment setup processing is terminated without further execution.

On the other hand, when it is determined in Step S102 that the user identification information is received, flow or execution proceeds to Step S103 to determine whether two or more pieces of the user identification information are received. That is, it is determined whether two or more users possessing the portable device 20 are in the vehicle 100.

When it is determined in Step S103 that two or more pieces of the user identification information are received or that two or more users possessing the portable device 20 ride in the vehicle 100, the flow proceeds to Step S104.

In Step S104, the feature information-sending request is sent to the portable device 20, which is the transmitting source of the user identification information. The feature information-sending request is sent to request the portable device 20 to send facial feature information. Consequently, the facial feature information (the facial feature information of the user who rides in the vehicle 100) stored in the portable device 20 is transmitted to the in-vehicle device 10 concerned, together with the user identification information (Step S304 in the information-transmitting processing (FIG. 4) to be described later).

In Step S105, the multiple facial feature information items or two or more pieces of facial feature information transmitted by the portable devices 20 are received.

Figure 3:
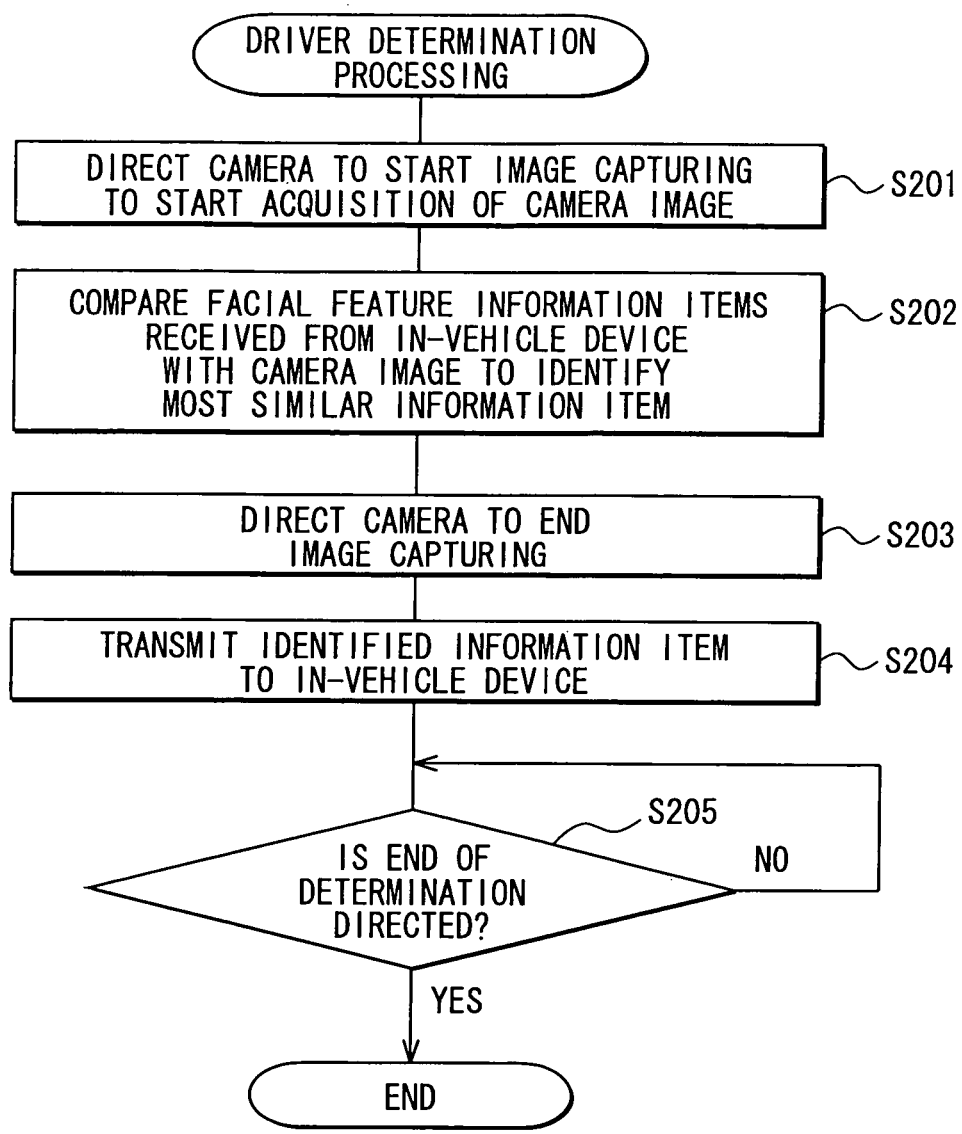
FIG. 3 is a flow chart illustrating a driver determination processing according to the first embodiment.

In Step S106, the in-vehicle device 10 transmits the facial feature information items received in Step S105 to the personal identification device 41 such that the personal identification device 41 is directed to perform the driver determination processing in order to identify or select a facial feature information item of the driver among the transmitted facial feature information items. Consequently, the personal identification device 41 identifies the facial feature information belonging to the driver (the facial feature information of the user who rides the vehicle 100), among the facial feature information items which are received from the in-vehicle device 10. Concrete explanation of the driver determination processing will be described later (FIG. 3).

In Step S107, the identified facial feature information of the driver identified as the determination result of the driver determination processing is received from the personal identification device 41. That is, the in-vehicle device 10 has identified or selected the facial feature information item that corresponds to the detected facial feature point detected by the camera 42 among the facial feature information items which are received from the multiple portable devices 20.

In Step S108, the end of the driver determination processing is directed to the personal identification device 41, and the flow proceeds to Step S109. Consequently, the personal identification device 41 ends the driver determination processing.

On the other hand, when it is determined in Step S103 described above that not two or more pieces but a single piece of user identification information is received, the facial feature information which is receivable from the portable device 20 is highly possible to correspond to the facial feature point detected with the camera 42. Therefore, in this case, the received user identification information is considered to belong to the driver and the flow proceeds to Step S109, without processing Steps S104-S108.

In Step S109, in order to identify the driving environment for the driver, the setup information-sending request is transmitted to the portable device 20 of the driver. Here, the portable device 20 is the transmitting source of the facial feature information and user identification information of the driver, and the setup information-sending request requests the portable device 20 of the driver to send the environment setup information item. Consequently, the environment setup information item stored in the portable device 20 of the driver or the environment setup information item indicative of the driving environment for the driver is transmitted from the portable device 20 to the in-vehicle device 10 (see Step S306 in the information-transmitting processing (FIG. 4) to be described later.

In Step S110, the environment setup information item transmitted by the portable device 20 is received.

In Step S111, the environment setup information item received in Step S110 is transmitted to various control units 51-59, and the present vehicle environment setup processing is ended. Consequently, the driving environment of the vehicle 100 is set as the driving environment for the driver.

[1-2-2 Processing Performed by a Personal Identification Device]

Next, the driver determination processing performed by the personal identification device 41 is explained using a flow chart of FIG. 3. The driver determination processing is started at the time of reception of the directions for driver determination processing which is effected by transmission of the facial feature information from the in-vehicle device 10 (the directions in Step S106 in the vehicle environment setup processing (FIG. 2) described above).

When the driver determination processing is started, first in Step S201, the personal identification device 41 directs the camera 42 to start capturing an image of the driver and starts acquisition of the image taken or captured with the camera 42

Then, in Step S202, the personal identification device 41 identifies the driver's facial feature information item out of the facial feature information items received from the in-vehicle device 10, by template matching of the facial feature information items received from the in-vehicle device 10 with the image taken with the camera 42. In the present embodiment, one of the facial feature information items that has a facial feature point most similar to the facial feature point shown by the image taken with the camera 42 is identified to correspond to the facial feature information item of the driver. Accordingly, the facial feature information item that belongs to the driver is certainly identified or selected among the multiple facial feature information items received from the in-vehicle device 10.

In Step S203, the end of capturing the image is directed to the camera 42. Then, in Step S204, the facial feature information identified as belonging to the driver is transmitted to the in-vehicle device 10.

In Step S205, the personal identification device 41 stands by until it receives the directions of the end of the driver determination processing from the in-vehicle device 10, and terminates the present person determination processing at the time of reception of the directions. Above directions of ending the driver determination processing corresponds to the directions in Step S108 in the vehicle environment setup processing shown in FIG. 2.

[1-2-3 Processing Performed by a Portable Device]

Figure 4:
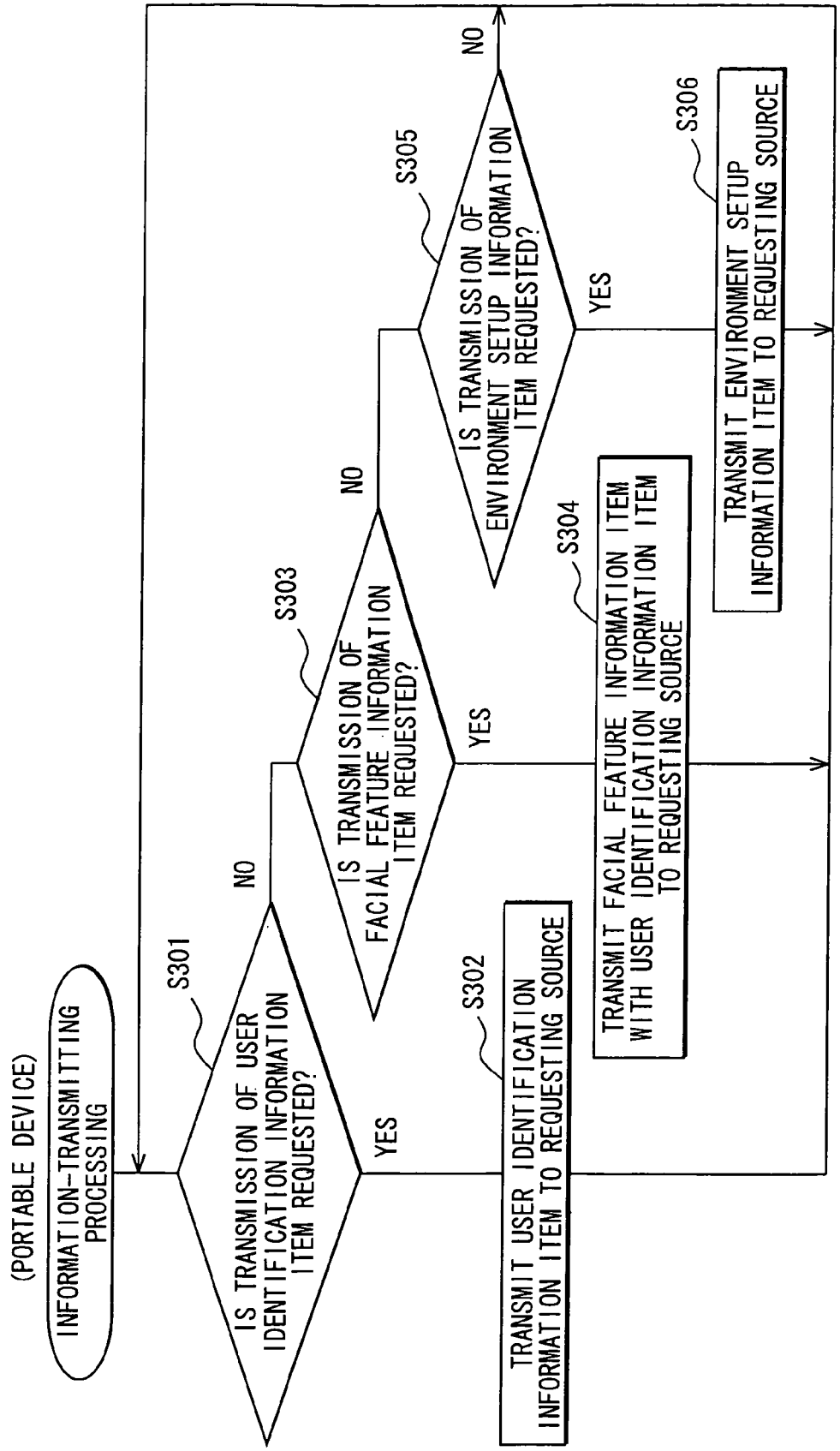
FIG. 4 is a flow chart illustrating an information-transmitting processing according to the first embodiment.

Next, the information-transmitting processing performed by a control unit 21 of the portable device 20 is explained using a flow chart of FIG. 4. The information-transmitting processing begins with starting (power ON) of the portable device 20, and continues until end of the operation of the portable device 20 (power OFF).

When the information-transmitting processing is started, in Step S301, the control unit 21 firstly determines whether the identification information-sending request is received. The identification information-sending request is transmitted by the in-vehicle device 10 in Step S101 in the vehicle environment setup processing (FIG. 2) described above.

In Step S301, when it is determined that the identification information-sending request is received, the flow proceeds to Step S302 to transmit the user identification information of the user who possesses the portable device 20 concerned to the in-vehicle device 10 as the requesting source, and the flow returns to Step S301.

On the other hand, in Step S301, when it is determined that the identification information-sending request is not received, the flow proceeds to Step S303 to determine whether the feature information-sending request is received. The feature information-sending request is transmitted by the in-vehicle device 10 in Step S104 in the vehicle environment setup processing (FIG. 2) described above.

In Step S303, when it is determined that the feature information-sending request is received, the flow proceeds to Step S304 to transmit the facial feature information of the user who possesses the portable device 20 concerned to the in-vehicle device 10 as the requesting source, together with the user identification information, and then the flow returns to Step S301.

On the other hand, in Step S303, when it is determined that the feature information-sending request is not received, the flow proceeds to Step S305 to determine whether the setup information-sending request is received. The setup information-sending request is transmitted by the in-vehicle device 10 in Step S109 in the vehicle environment setup processing (FIG. 2) described above.

In Step S305, when it is determined that the setup information-sending request is received, the flow proceeds to Step S306 to transmit the environment setup information item for the user who possesses the portable device 20 concerned to the in-vehicle device 10 as the requesting source, and the flow returns to Step S301.

On the other hand, in Step S305, when it is determined that the setup information-sending request is not received, the flow returns to Step S301 without performing anything.

[1-3 Effect]

As explained in the above, according to the driving-environment setup system of the first embodiment, the following effects or advantages are obtained.

(1A) The in-vehicle device 10 is operable to perform a radio communication with the portable device 20 which exists in the communications area covering the entire of the inside of the vehicle 100 acquires automatically the environment setup information item from the portable device 20 operable to perform a radio communication, and sets up the driving environment. As a result, the user using the vehicle 100 only has to possess the portable device 20 and ride the vehicle 100. Even if a special operation for setting the driving environment is not performed, the driving environment of the vehicle 100 is automatically set as the driving environment for the user.

Moreover, even when two or more users, each possessing the portable device 20, ride in the vehicle 100, the in-vehicle device 10 can set the driving environment of the vehicle 100 as the driving environment for the driver by identifying the driver based on the facial feature point.

Specifically, it is possible to set the driving environment of the vehicle 100 as the driving environment for the driver, for example, in the following cases.

Figure 5A:
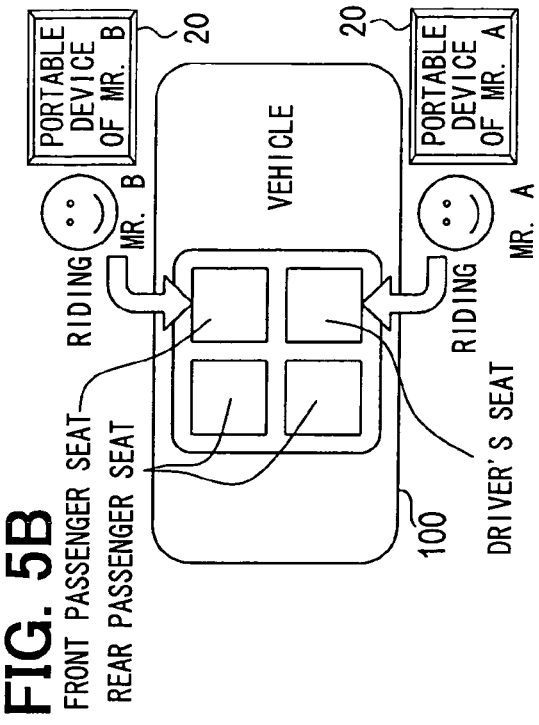
FIG. 5A is a schematic diagram for explaining the effect of the driving-environment setup system.

As illustrated in FIG. 5A, there may be a case where a certain user A (Mr. A) possesses own portable device 20 and rides in the driver's seat of the vehicle 100. In this case, the driving environment of the vehicle 100 is set as the driving environment for user A which rides in the driver's seat.

Figure 5B:
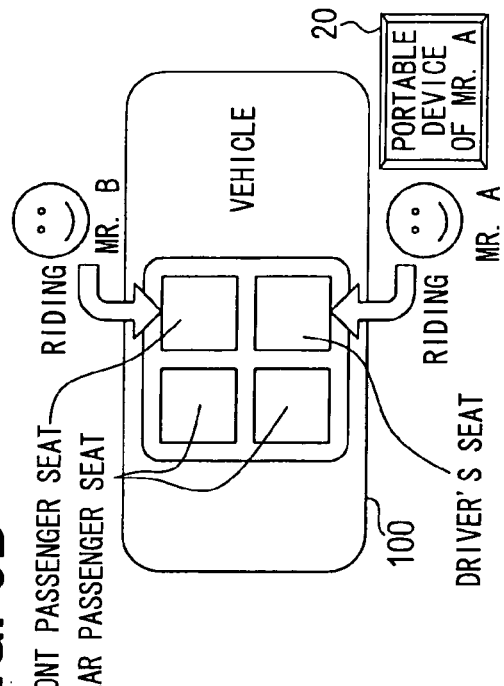
FIG. 5B is another schematic diagram for explaining the effect of the driving-environment setup system.

As illustrated in FIG. 5B, there may be a case where, while a certain user A (Mr. A) possesses own portable device 20 and rides in the driver's seat of the vehicle 100, another user B (Mr. B) possesses own portable device 20 and seats in any seat except the driver's seat of the vehicle 100. That is, the present case is a modified case of FIG. 5A where user B rides in the vehicle 100 as a fellow passenger or an occupant. Also in the present case, the driving environment of the vehicle 100 is set as the driving environment for user A who rides in the driver's seat, regardless of the order of the user of getting in the vehicle or regardless of the fact that which user A or user B gets in the vehicle earlier.

Figure 5C:
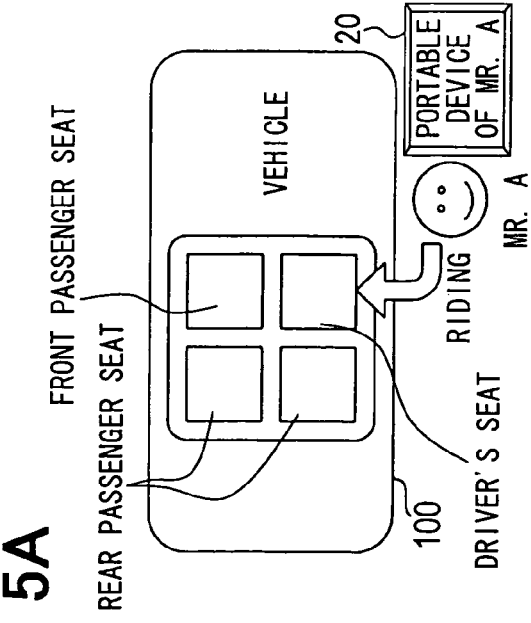
FIG. 5C is still another schematic diagram for explaining the effect of the driving-environment setup system.

Furthermore, as illustrated in FIG. 5C, there may be a case where, while a certain user A (Mr. A) possesses the portable device 20 of user B and rides in the driver's seat of the vehicle 100, another user B (Mr. B) possesses the portable device 20 of user A and seats in any seat except the driver's seat of the vehicle 100. That is, the present case is a modified case of FIG. 5B where user A and user B ride in the vehicle 100, each possessing the portable device 20 of the other user. Also in this case, the driving environment of the vehicle 100 is set as the driving environment for user A which rides in the driver's seat, regardless of the order of the user of getting in the vehicle.

Figure 5D:
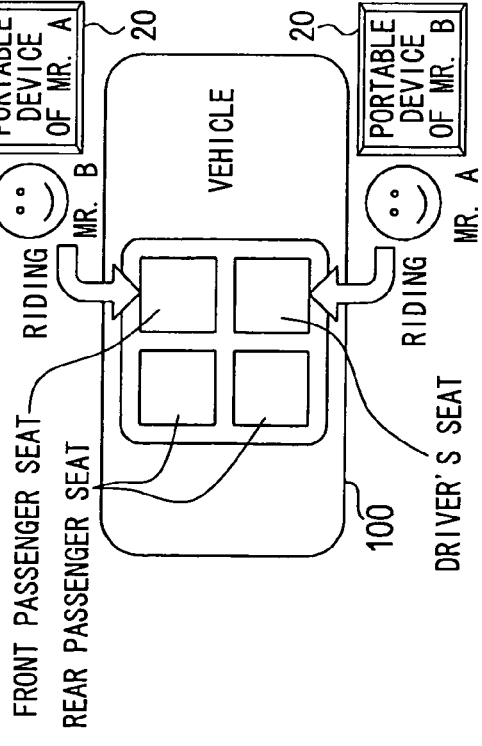
FIG. 5D is further another schematic diagram for explaining the effect of the driving-environment setup system.

As illustrated in FIG. 5D on the other hand, there may be a case where, while a certain user A (Mr. A) possesses own portable device 20 and rides in the driver's seat of the vehicle 100, and another user B (Mr. B) does not possess the portable device 20 and seats in any seat except the driver's seat of the vehicle 100. That is, the present case is another modified case of FIG. 5B where user B does not possess own portable device 20. Also in this case, the driving environment of the vehicle 100 is set as the driving environment for user A which rides in the driver's seat, regardless of the order of the user of getting in or riding the vehicle.

Because the portable device 20 should just be in the area where communication with the in-vehicle device 10 is possible, the same effect will be obtained even if the portable device 20 is put in a bag and placed in a rear passenger seat, a trunk, etc., for example. That is, the driver can be identified correctly, regardless of the position where the portable device 20 is placed in the indoor of the vehicle 100.

(1B) Because the in-vehicle device 10 is designed so as to authenticate the driver based on the facial feature point, the in-vehicle device 10 can employ the construction of other in-vehicle systems, such as an inattentive driving prevention device.

(1C) Because the portable device 20 transmits information according to the request from the in-vehicle device 10 only at the time of necessity, the present system can reduce transmission of unnecessary information, compared with the construction which transmits information regardless of the request from the in-vehicle device 10.

(1D) The in-vehicle device 10 performs the search of the portable device 20 (the detection of the user who rides the vehicle 100) at the time when the driver is detected to have gotten in the vehicle 100. Accordingly, compared with the construction which always searches for the portable device 20, the portable device 20 can be efficiently detected. Moreover, erroneous determination of the driver can be avoided, because a user who gets in the vehicle 100 after the driver is not detected.

(1E) The in-vehicle device 10 identifies as the driver a user having a facial feature point, which is indicated by the facial feature information received from the portable device 20, and which is most similar to a facial feature point of the image of the driver taken with the camera 42. Accordingly, the in-vehicle device 10 can identify as the driver one user with highest possibility of being the driver, based on the facial feature point.

(1F) When a single piece of the user identification information is received from the portable device 20, the in-vehicle device 10 sets the driving environment as the driving environment for the user identified based on the received user identification information, without requesting transmission of the facial feature information to the portable device 20. Accordingly, it is possible to simplify the processing in case where two or more users who possess the portable device 20 do not ride in the vehicle 100.

(1G) The in-vehicle device 10 acquires the facial feature information and the environment setup information item from the portable device 20. Therefore, because the in-vehicle device does not need to prestore the environment setup information item for each of the users who may use the vehicle 100, it becomes possible to set up the driving environment for a user who rides the vehicle for the first time.

[1-4 Correspondence with Claims]

In the driving-environment setup system according to the first embodiment, the camera 42 corresponds to feature detection means.

The control unit 11 of the in-vehicle device 10 which performs processing of Steps S103-S107 in the vehicle environment setup processing (FIG. 2) corresponds to driver identifying means, and the control unit 11 of the in-vehicle device 10 which performs processing of Steps S109-S111 corresponds to driving-environment setup means.

The control unit 21 of the portable device 20 which performs processing of Steps S303 and S304 in the information-transmitting processing (FIG. 4) corresponds to feature information transmitting means, and the control unit 21 of the portable device 20 which performs processing of Steps S305 and S306 corresponds to environmental information transmitting means.

[2 Second Embodiment]

Next, a driving-environment setup system according to a second embodiment is explained.

[2-1 Entire Configuration]

Figure 6:
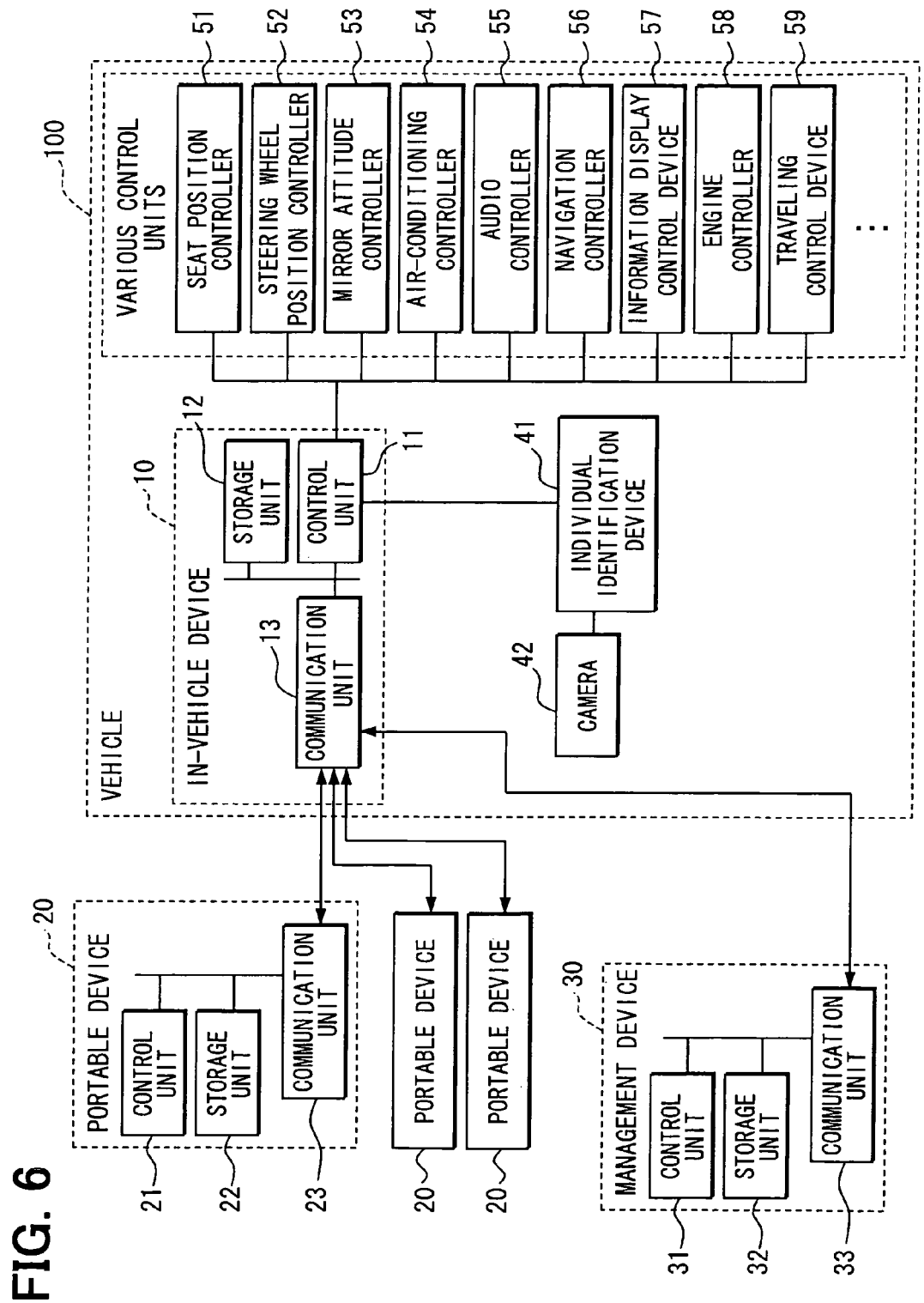
FIG. 6 is a block diagram illustrating an outline structure of a driving-environment setup system according to a second embodiment of the present invention.

FIG. 6 is a block diagram illustrating an outline structure of a driving-environment setup system according to the second embodiment.

In comparison with the driving-environment setup system (FIG. 1) of the first embodiment, the driving-environment setup system of the second embodiment differs in that it includes a management device 30. Hereinafter, explanation is given focusing on the portion which is different from the driving-environment setup system of the first embodiment, and further explanation on the identical or similar portion is omitted by using the same symbols and numerals to the same elements.

[2-1-1 Construction of an In-Vehicle Device]

In the driving-environment setup system of the second embodiment, the communication unit 13 of the in-vehicle device 10 is constructed such that radio communication may be performed between the portable device 20 and the management device 30.

Specifically, the communication unit 13 is operable to perform a short distance radio communication with the portable device 20, as in the driving-environment setup system of the first embodiment.

On the other hand, the communication unit 13 is operable to perform data communication by radio through a mobile phone network (communication network of mobile phones) with the management device 30. For this reason, the in-vehicle device 10 is operable to perform data communication with the management device 30, in a communications area covered by a mobile phone base station arranged in various places (it is markedly wider than the communications area with the portable device 20).

[2-1-2 Construction of a Portable Device]

In the driving-environment setup system of the second embodiment, the environment setup information item indicative of the driving environment for a user possessing the portable device 20 concerned is not stored in the storage unit 22 of the portable device 20. The above structure is different from the first embodiment. That is, user identification information which is identification information unique to a user possessing the portable device 20 concerned, and facial feature information indicative of a facial feature point of the user are prestored in the storage unit 22.

[2-1-3 Construction of a Management Device]

The management device 30 is for performing overall management of the information about two or more users, and is installed in a control center etc. One set of management device 30 is shared by two or more sets of the in-vehicle device 10.

The management device 30 includes a control unit 31, a storage unit 32, and a communication unit 33.

The control unit 31 includes as a main element a microcomputer having a CPU, a ROM, a RAM, etc., and performs various processing.

The storage unit 32 is operable to store a variety of information. The setting information database which registers the environment setup information item indicative of the driving environment for each of the users is stored in the storage unit 32. In the setting information database, the environment setup information item for each user is registered in association with user identification information of each user; thereby, the environment setup information item can be identified based on the user identification information.

The environment setup information item is registered into the setting information database by a predetermined procedure. In the present embodiment, the driving environment for a user is set up by an external operation by the user in the vehicle 100, and then the register operation of the environment setup information item is performed in the portable device 20. Subsequently, the portable device 20 transmits the registration directions of the environment setup information item to the in-vehicle device 10, together with the user identification information stored in the storage unit 22. Then, the in-vehicle device 10, upon receiving the registration directions, transmits the environment setup information item indicative of the current driving environment of the vehicle 100 to the management device 30, together with the user identification information received from the portable device 20. Here, the current driving environment is a driving environment which the user has set up through the external operation by the time of executing the above procedure. The management device 30, upon receiving the user identification information and the environment setup information item, registers the user identification information in association with the environment setup information item in the setting information database of the storage unit 32.

The communication unit 33 performs data communication by radio through a mobile phone network with two or more in-vehicle devices 10.

[2-2 Processing Performed by a Driving-Environment Setup System]

Next, the processing performed by the devices 10, 20, and 30 which are included in the driving-environment setup system of the second embodiment is explained.

[2-2-1 Processing Performed by an In-Vehicle Device]

Figure 7:
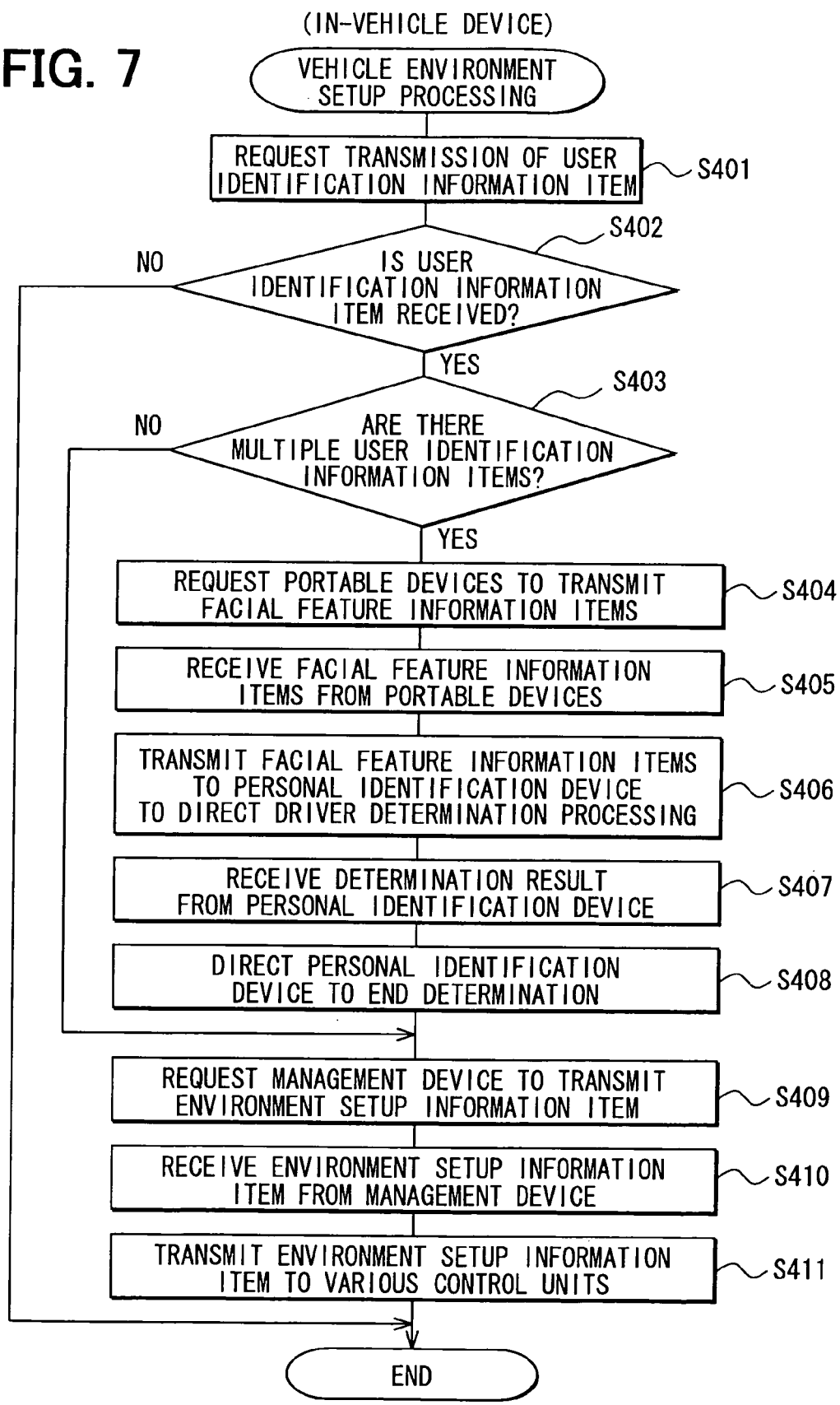
FIG. 7 is a flow chart illustrating a vehicle environment setup processing according to the second embodiment.

First, the vehicle environment setup processing performed by a control unit 11 of the in-vehicle device 10 is explained using a flow chart of FIG. 7. Compared with the vehicle environment setup processing (FIG. 2) of the first embodiment, the vehicle environment setup processing of the second embodiment differs in performing processing in Steps S409 and S410 instead of the processing in Steps S109 and S110. In addition, contents of each processing in Steps S401-S408, and Step S411 are respectively the same as those in Steps S101-S108, and Step S111; therefore, the explanation about the contents of the processing thereof is omitted.

In Step S409, in order to identify the driving environment for a driver, the setup information-sending request is transmitted to the management device 30, together with the user identification information of the driver and the vehicles identification information of the in-vehicle device 10. Here, the setup information-sending request is transmitted to request the management device 30 to send the environment setup information. Consequently, the environment setup information item corresponding to the transmitted user identification information (the environment setup information item indicative of the driving environment for the driver) is transmitted from the management device 30 to the in-vehicle device 10 concerned (Step S603 in the information management processing (FIG. 9) to be described later).

Then, in Step S410, the environment setup information item transmitted by the management device 30 is received.

[2-2-2 Processing Performed by a Personal Identification Device]

The driver determination processing performed by a personal identification device 41 is the same as the driver determination processing (FIG. 3) of the first embodiment; therefore, the explanation thereof is omitted.

[2-2-3 Processing Performed by a Portable Device]

Figure 8:
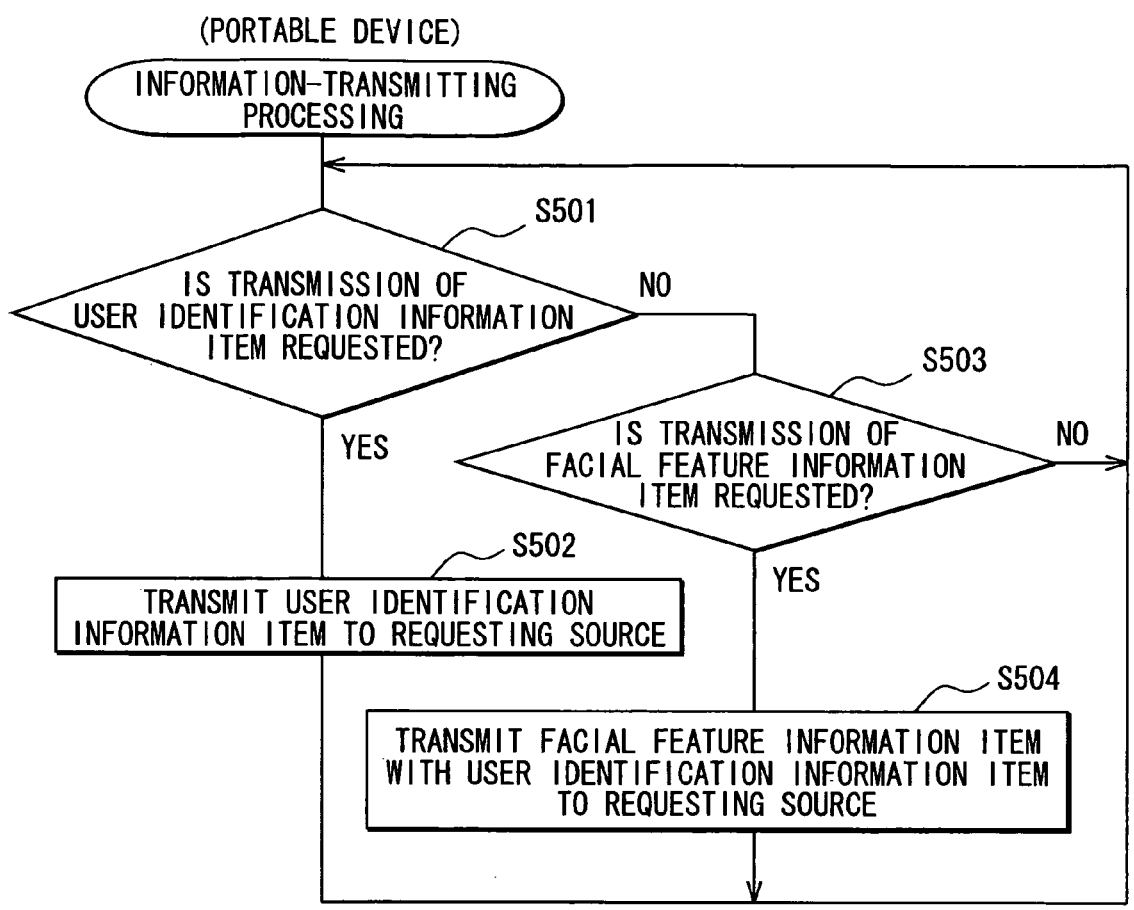
FIG. 8 is a flow chart illustrating an information-transmitting processing according to the second embodiment.

Next, the information-transmitting processing performed by a control unit 21 of the portable device 20 is explained using a flow chart of FIG. 8. Compared with the information-transmitting processing (FIG. 4) of the first embodiment, the information-transmitting processing of the second embodiment differs in not performing the processing of Steps S305 and S306. In addition, contents of each processing of Steps S501-S504 are respectively the same as contents of each processing of Steps S301-S304; therefore, the explanation about the concrete contents of the processing thereof is omitted.

[2-2-4 Processing Performed by a Management Device]

Next, the information management processing performed by the control unit 31 of the management device 30 is explained using a flow chart of FIG. 9. The information management processing begins with starting (power ON) of the management device 30, and continues until end of the operation of the management device 30 (power OFF).

When the information management processing is started, in Step S601, the control unit 31 determines first whether the setup information-sending request is received. When it is determined that the setup information-sending request is received, control proceeds to Step S602. The setup information-sending request is transmitted by the in-vehicle device 10 in Step S409 in the vehicle environment setup processing (FIG. 7) described above, together with the user identification information and the vehicles identification information.

In Step S602, the control unit 31 reads the environment setup information item stored in the storage unit 32 in association with the user identification information received. That is, the control unit 31 reads the environment setup information item indicative of the driving environment for a driver.

Then, in Step S603, the environment setup information item read in Step S602 is transmitted to the in-vehicle device 10 which is the transmitting source of the user identification information, and execution returns to Step S601. Here, the in-vehicle device 10 is identified based on the vehicles identification information, which has been received with the user identification information. Consequently, the driving environment of the vehicle 100 is set as the driving environment for the driver.

[2-3 Effect]

As explained above, according to the driving-environment setup system of the second embodiment, the following effects or advantages are achieved in addition to the same effects as in (1A)-(1F) of the first embodiment.

(2G) The in-vehicle device 10 acquires the facial feature information from the portable device 20, and acquires the environment setup information item from the management device 30. For this reason, the in-vehicle device 10 does not need to store the information about the user using the vehicle 100 beforehand, and can provide the driving environment for a user who rides the vehicle 100 for the first time.

(2H) Because the management device 30 performs the overall management of the environment setup information item about two or more users in the present construction, the environment setup information item is efficiently manageable. Because the portable device 20 only has to store and transmit to the in-vehicle device 10 the user identification information instead of the environment setup information item, it is possible to reduce the amount of information to be stored to the storage unit 22 as well as the amount of information to be transmitted to the in-vehicle device 10.

[2-4 Correspondence with Claims]

In the driving-environment setup system of the second embodiment, the camera 42 corresponds to feature detection means.

The control unit 11 of the in-vehicle device 10 which performs processing of Steps S403-S407 in the vehicle environment setup processing (FIG. 7) corresponds to driver identifying means, and the control unit 11 of the in-vehicle device 10 which performs processing of Steps S409-S411 corresponds to driving-environment setup means.

The control unit 21 of the portable device 20 which performs processing of Steps S501 and S502 in the information-transmitting processing (FIG. 8) corresponds to environmental information transmitting means, and the control unit 21 of the portable device 20 which performs processing of Steps S503 and S504 corresponds to feature information transmitting means.

The management device 30 corresponds to a setup information management device, and the control unit 31 of the management device 30 which performs processing of Steps S601-S603 in the information management processing (FIG. 9) corresponds to setup information reply means.

[3 Third Embodiment]

Next, a driving-environment setup system according to a third embodiment is explained. The entire structure of the driving-environment setup system of the third embodiment will be explained, referring to FIG. 6 which illustrates the outline structure of the driving-environment setup system of the second embodiment.

[3-1 Entire Structure]

In comparison with the driving-environment setup system of the second embodiment, the driving-environment setup system of the third embodiment differs in that the management device 30 is operable to manage not only the environment setup information item about two or more users but also the facial feature information for each user.

That is, the facial feature information indicative of the facial feature point of a user possessing the portable device 20 concerned is not stored in the storage unit 22 of the portable device 20.

On the other hand, the setting information database which registers, for two or more users, the environment setup information item indicative of the driving environment for each user and the facial feature information indicative of the facial feature point of each user are stored in the storage unit 32 of the management device 30. In the setting information database, the environment setup information item and the facial feature information for each user are registered in association with the user identification information for each user, and it is possible to identify the environment setup information item and the facial feature information based on the user identification information.

Hereinafter, explanation is given focusing on the portion which is different from the driving-environment setup system of the second embodiment, and further explanation on the similar or identical portion to the second embodiment is omitted by using the same symbols and numerals to the same elements.

[3-2 Processing Performed by a Driving-Environment Setup System]

Next, the processing performed by each of devices 10, 20, and 30 included in the driving-environment setup system of the third embodiment is explained.

[3-2-1 Processing Performed by an In-Vehicle Device]

Figure 10:
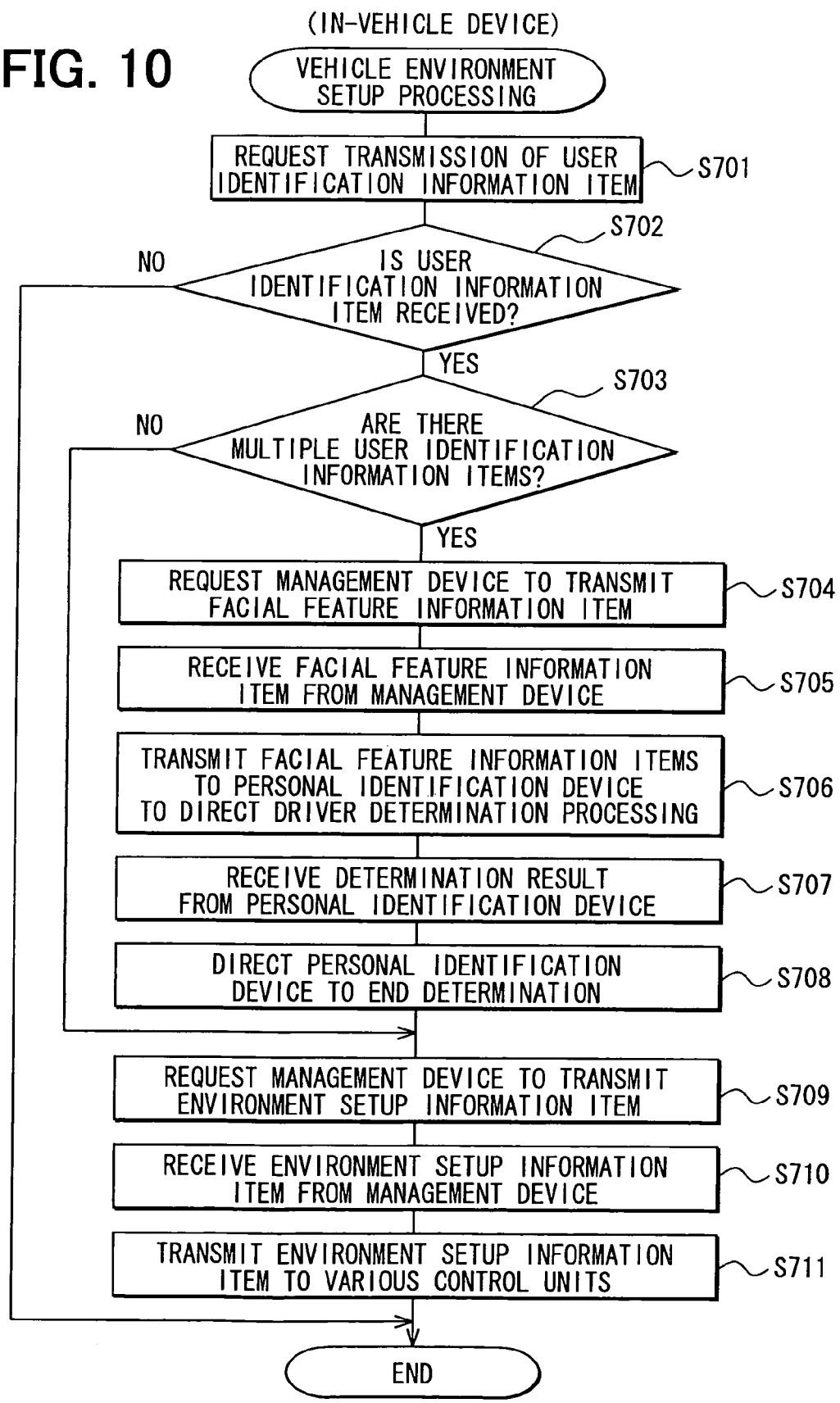
FIG. 10 is a flow chart illustrating a vehicle environment setup processing according to a third embodiment of the present invention.

First, the vehicle environment setup processing performed by the control unit 11 of the in-vehicle device 10 is explained using a flow chart of FIG. 10. Compared with the vehicle environment setup processing (FIG. 7) of the second embodiment, the vehicle environment setup processing of the third embodiment differs in performing processing of Steps S704 and S705 instead of processing of Steps S404 and S405. In addition, contents of each processing of Steps S701-S703, and Steps S706-S711 are respectively the same as contents of each processing of Steps S401-S403, and Steps S406-S411; therefore, the explanation about the contents of the processing thereof is omitted.

In Step S704, in order to acquire the facial feature information items of the users corresponding to the user identification information received from the portable devices 20, the feature information-sending request is transmitted to the management device 30, together with the user identification information and the vehicles identification information of the in-vehicle device 10 concerned. Here, the feature information-sending request is transmitted to request the management device 30 to send the facial feature information items. Consequently, the facial feature information items corresponding to the transmitted user identification information items are transmitted to the in-vehicle device 10 concerned from the management device 30 (Step S906 in the information management processing (FIG. 12) to be described later). The above facial feature information items corresponding to the transmitted user identification information items indicate the facial feature points of the users in the vehicle 100.

Then, in Step S705, the facial feature information items transmitted by the management device 30 are received.

[3-2-2 Processing Performed by a Personal Identification Device]

The driver determination processing performed by a personal identification device 41 is the same as the driver determination processing (FIG. 3) of the second embodiment; therefore, the explanation thereof is omitted.

[3-2-3 Processing Performed by a Portable Device]

Next, the information-transmitting processing performed by a control unit 21 of the portable device 20 is explained using a flow chart of FIG. 11. Compared with the information-transmitting processing (FIG. 8) of the second embodiment, the information-transmitting processing of the third embodiment differs in not performing processing of Step S503 and Step S504. In addition, contents of each processing of Steps S801 and S802 are respectively the same as contents of each processing of Steps S501 and S502; therefore, the explanation about the concrete contents of processing is omitted.

[3-2-4 Processing Performed by a Management Device]

Figure 12:
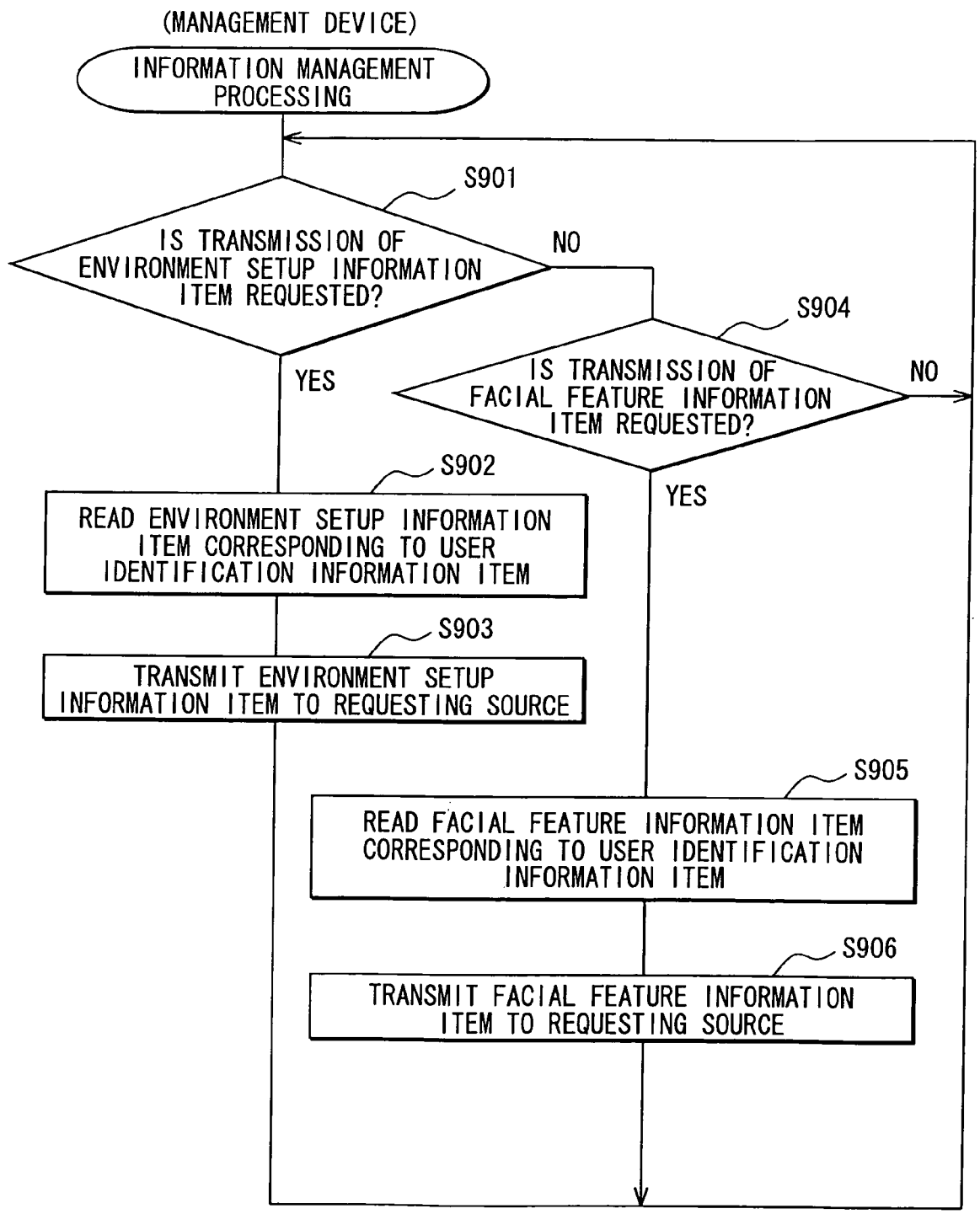
FIG. 12 is a flow chart illustrating an information management processing according to the third embodiment.

Next, the information management processing performed by a control unit 31 of the management device 30 is explained using a flow chart of FIG. 12. Compared with the information management processing (FIG. 9) of the second embodiment, the present information management processing differs in performing processing of Steps S904-S906. In addition, contents of each processing of Steps S901-S903 are respectively the same as contents of each processing of Steps S601-S603; therefore, the explanation about the contents of the processing thereof is omitted.

When it is determined that the setup information-sending request is not received in Step S901, the flow proceeds to Step S904 to determine whether the feature information-sending request is received. The feature information-sending request is transmitted by the in-vehicle device 10, together with the user identification information and the vehicles identification information, in Step S704 in the vehicle environment setup processing (FIG. 10) described above.

When it is determined in Step S904 that the feature information-sending request is not received, the flow returns to Step S901.

When it is determined, on the other hand, that the feature information-sending request is received in Step S904, the flow proceeds to Step S905. Then, the control unit 31 reads the facial feature information, which is stored in the storage unit 32 in association with the received user identification information. Here, the facial feature information indicates the facial feature point of the user who rides the vehicle 100.

Then, in Step S906, the facial feature information read in Step S905 is transmitted to the in-vehicle device 10 which is the transmitting source of the user identification information, and control returns to Step S901. Here, the in-vehicle device 10 is identified based on the vehicles identification information received by the user identification information.

[3-3 Effect]

As explained above, according to the driving-environment setup system of the third embodiment, the following effects or advantages are achieved in addition to the same effects as in (1A)-(1F) of the first embodiment.

(3G) The in-vehicle device 10 acquires the facial feature information and the environment setup information item from the management device 30. For this reason, the in-vehicle device 10 does not need to store the information about the user using the vehicle 100 beforehand, and can set up the driving environment for a user who rides the vehicle for the first time.

(3H) Because the management device 30 performs the overall management of the facial feature information and the environment setup information item about two or more users in the present construction, the facial feature information and the environment setup information item can be efficiently managed. Because the portable device 20 should just store and transmit to the in-vehicle device 10 the user identification information instead of the facial feature information and the environment setup information item, it is possible to reduce the amount of information to be stored to the storage unit 22 as well as the amount of information to be transmitted to the in-vehicle device 10.

[3-4 Correspondence with Claims]

In the driving-environment setup system of the third embodiment, the camera 42 corresponds to feature detection means.

The control unit 11 of the in-vehicle device 10 which performs processing of Steps S703-S707 in the vehicle environment setup processing (FIG. 10) corresponds to driver identifying means. The control unit 11 of the in-vehicle device 10 which performs processing of Steps S709-S711 corresponds to driving-environment setup means.

The control unit 21 of the portable device 20 which performs processing of Steps S801 and S802 in the information-transmitting processing (FIG. 11) corresponds to environmental information transmitting means and feature information transmitting means.

The management device 30 corresponds to a setup information management device and a feature information management device. The control unit 31 of the management device 30 which performs processing of Steps S901-S903 in the information management processing (FIG. 12) corresponds to setup information reply means, and the control unit 31 of the management device 30 which performs processing of Steps S904-S906 corresponds to feature information replying means.

[4 Fourth Embodiment]

Next, a driving-environment setup system of a fourth embodiment of the present invention is explained.

[4-1 Entire Structure]

Figure 13:
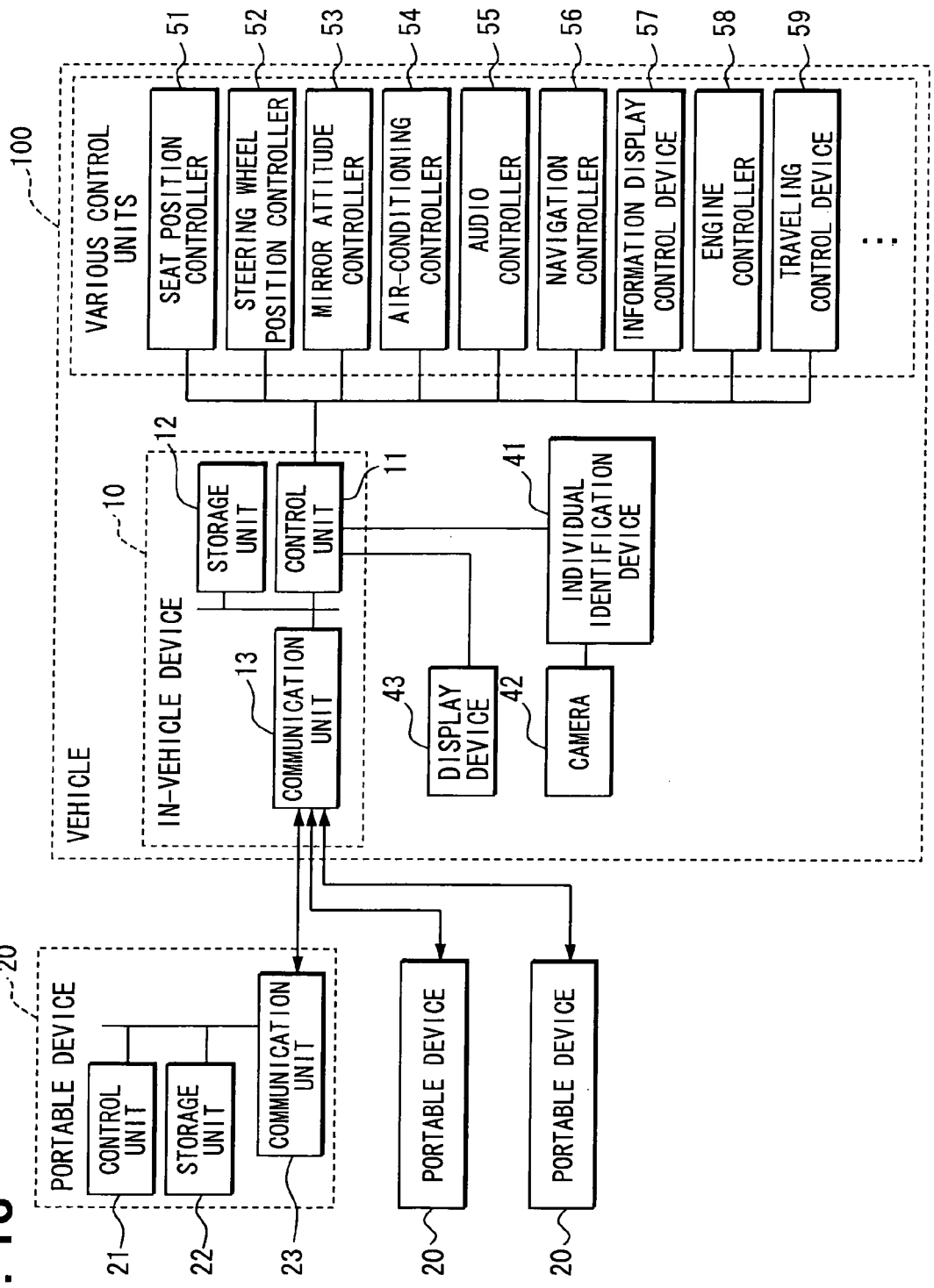
FIG. 13 is a block diagram illustrating an outline structure of a driving-environment setup system according to a fourth embodiment of the present invention.

FIG. 13 is a block diagram illustrating an outline structure of a driving-environment setup system according to the fourth embodiment.

In comparison with the driving-environment setup system (FIG. 1) of the first embodiment, the driving-environment setup system of the fourth embodiment differs in that a display device 43 is mounted on a vehicle 100. Hereinafter, explanation is given focusing on the portion which is different from the driving-environment setup system of the first embodiment, and further explanation on the similar or identical portion to the first embodiment is omitted by using the same symbols and numerals to the same elements.

[4-1-1 Construction of an In-Vehicle Device]

In the driving-environment setup system of the fourth embodiment, a control unit 11 of the in-vehicle device 10 is coupled for capable of communicating with the display device 43 mounted in the vehicle 100.

Here, the display device 43 is for displaying a variety of information items as images which a user who sits in the driver's seat of the vehicle 100 can recognize visually. In the present embodiment, a touch-sensitive liquid crystal display used for a navigation system etc. is employed to provide not only the display of an image but a function which enables the input of instruction by the external operation by the user.

[4-1-2 Construction of the Portable Device]

In comparison with the first embodiment, the driving-environment setup system of the fourth embodiment differs in that name information indicative of the name of a user possessing the portable device 20 concerned is stored in a storage unit 22 of the portable device 20. That is, the storage unit 22 prestores user identification information, which is identification information unique to the user who possesses the portable device 20 concerned, facial feature information, which is indicative of a facial feature point of the user, environment setup information item, which is indicative of a driving environment for the user, and name information indicative of the user's name.

[4-2 Processing Performed by a Driving-Environment Setup System]

Next, the processing performed by the devices 10 and 20 which are included in the driving-environment setup system of the fourth embodiment is explained.

[4-2-1 Processing Performed by an In-Vehicle Device]

Figure 14:
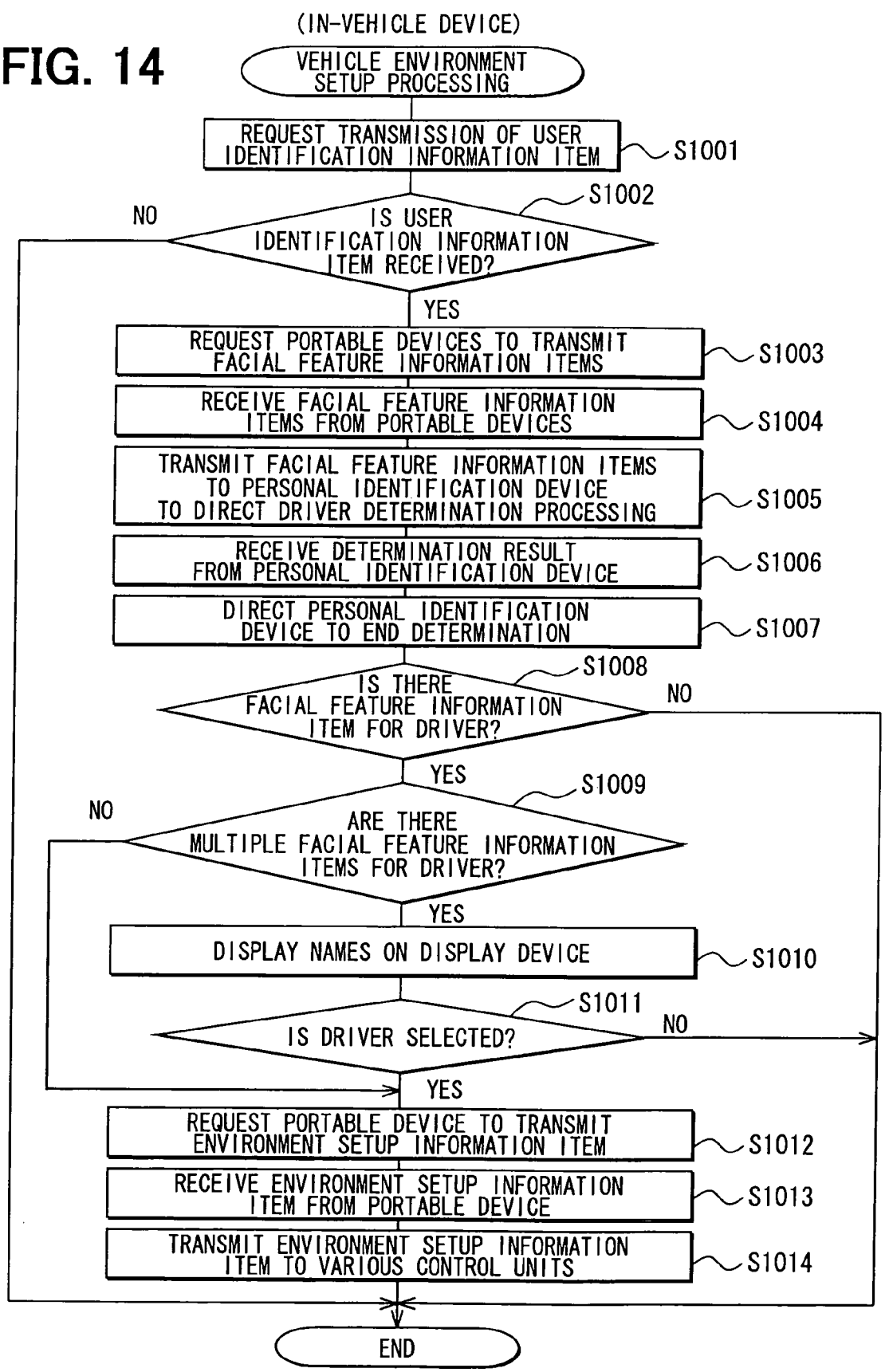
FIG. 14 is a flow chart illustrating a vehicle environment setup processing according to the fourth embodiment.

First, the vehicle environment setup processing performed by a control unit 11 of the in-vehicle device 10 is explained using a flow chart of FIG. 14. Compared with the vehicle environment setup processing (FIG. 2) of the first embodiment, the vehicle environment setup processing of the fourth embodiment differs in that processing of Step S103 is not performed and processing of Steps S1008-S1011 is performed instead. In addition, contents of each processing of Steps S1001-S1007, and Steps S1012-S1014 are respectively the same as contents of each processing of Steps S101 and S102, and Steps S104-S111; therefore, the explanation about the contents of the processing thereof is omitted.

When it is determined that the user identification information is received in Step S1002, the flow proceeds to Step S1003, regardless of whether a single piece or two or more pieces of the user identification information is received. That is, even when a single piece of the user identification information is received, a personal identification device 41 is made to perform the driver determination processing.

In Step S1008, it is determined whether there exists the facial feature information which is identified as belonging to the driver based on the determination result received in Step S1006. Namely, in the driving-environment setup system of the fourth embodiment, the personal identification device 41 sets up the identical determination condition used as a criterion in deciding or determining a facial feature point to be same as the driver's facial feature point indicated by the image taken with the camera 42. The personal identification device 41 identifies one of the facial feature information items received from the in-vehicle device 10 as belonging to the driver when the one of the facial feature information items satisfies the above identical determination condition. Consequently, in such a case where the driver does not possess the portable device 20 but a passenger other than the driver possesses the portable device 20, it may be determined that the facial feature information to be identified as belonging to the driver does not exist. On the contrary, when a user (for example, a twin brother) having a face that resembles with a face of the driver rides the vehicle 100, plural pieces of the facial feature information or multiple facial feature information items may be identified as belonging to the driver. Thus, because the facial feature information identified as belonging to the driver is not necessarily a single piece, unlike the first embodiment, determination processing such as in Step S1008 and in Step S1009 to be described later is performed.

When it is determined that there exists no facial feature information which is identified as belonging to the driver in Step S1008, the present vehicle environment setup processing is terminated without further execution.

When it is determined, on the other hand, that there exists the facial feature information which is identified as belonging to the driver in Step S1008, the flow proceeds to Step S1009 to determine whether there exist two or more pieces of the facial feature information identified as belonging to the driver. In other words, it is determined at step S1009 whether there are multiple facial feature information items for the driver.

When it is determined that there exist two or more pieces of the facial feature information in Step S1009, the flow proceeds to Step S1010, and the names indicated by the name information corresponding to the identified facial feature information (users' names, each identified as the possible driver) are displayed on the display device 43. Specifically, as illustrated in FIG. 15, while displaying a list of the users' names, a message ("please select the driver") requesting the user of the vehicle 100 of the selection operation to select a driver's name out of the names in the displayed list. The name information corresponding to the facial feature information is received together with the facial feature information in Step S1004.

Then, in Step S1011, it is determined whether the selection operation (touch panel operation) to select the driver's name out of the names in the displayed list on the display device 43 is performed by the user.

When it is determined that the selection operation to select the driver's name is not performed by the user in Step S1011, the present vehicle environment setup processing is terminated without further execution. In the present embodiment, if the selection operation is not performed within a fixed time (for example, for one minute) after displaying the users' names on the display device 43, it is determined that the selection operation is not performed by the user. Determination that the selection operation is not performed by the user is not limited to the lapse of fixed time. For example, the determination may be made when a parking brake is released, when the position of a shift lever is changed into D-range from P-range, or when the vehicle 100 begins to run etc.

On the other hand, when it is determined that the selection operation to select the driver's name is performed by the user in Step S1011, the user identification information which is received in Step S1004 together with the facial feature information corresponding to the selected name is considered to belong to the driver. Then, the flow proceeds to Step S1012.

Also when it is determined that there exists not plural pieces of but a single piece of the facial feature information identified as belonging to the driver in Step S1009, the user identification information received in Step S1004 together with the facial feature information is considered to belong to the driver. Then, the flow proceeds to Step S1012 without performing processing of Steps S1010 and S1011,

[4-2-2 Processing Performed by a Personal Identification Device]

Next, the driver determination processing performed by a personal identification device 41 is explained using a flow chart of FIG. 16. Compared with the driver determination processing (FIG. 3) of the first embodiment, the driver determination processing of the fourth embodiment differs in that processing of Step S1102 is performed instead of processing Step S202. In addition, contents of each processing of Step S1101, Steps S1103-S1105 are respectively the same as contents of each processing of Step S201, Steps S203-S205; therefore, the explanation about the contents of the processing thereof is omitted.

In Step S1102, by performing template matching for the facial feature information received from the in-vehicle device 10 with the image taken with the camera 42, the facial feature information for the driver is identified among the received facial feature information item(s). In the present embodiment, as described above, the identical determination condition is set up so as to be used as a criterion in deciding a facial feature point to be same as the driver's facial feature point indicated by an image taken with the camera 42. Then, one facial feature information item is identified or selected to correspond to the driver among the facial feature information items received from the in-vehicle device 10 when the one facial feature information item satisfies the identical determination condition. Consequently, as described above, there is a possibility that no facial feature information may exist which is identified as belonging to the driver, or two or more pieces of facial feature information may exist which is identified as belonging to the driver.

[4-2-3 Processing Performed by a Portable Device]

Figure 17:
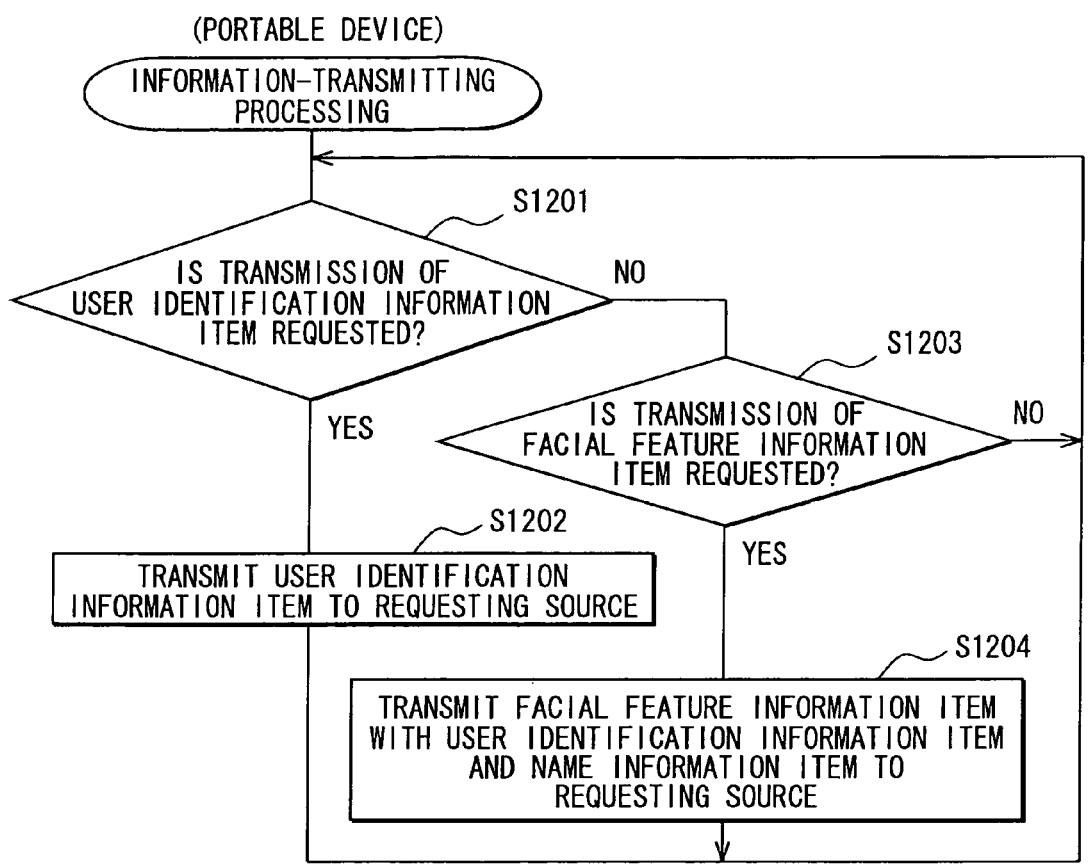
FIG. 17 is a flow chart illustrating an information-transmitting processing according to the fourth embodiment.

Next, the information-transmitting processing performed by a control unit 21 of the portable device 20 is explained using a flow chart of FIG. 17. Compared with the information-transmitting processing (FIG. 4) of the first embodiment, the information-transmitting processing of the fourth embodiment differs in that processing of Steps S305 and S306 is not performed, and that processing of Step S1204 is performed instead of processing of Step S304. In addition, contents of each processing of Steps S1201-S1203 are respectively the same as contents of each processing of Steps S301-S303; therefore, the explanation about the contents of the processing thereof is omitted.

In Step S1204, the facial feature information of the user possessing the portable device 20 concerned is transmitted to the in-vehicle device 10 as the requesting source, together with the user identification information and the name information, then the flow returns to Step S1201. That is, compared with Step S304 in the information-transmitting processing of the first embodiment, Step S1204 differs in that the name information is transmitted.

[4-3 Effect]

As explained above, according to the driving-environment setup system of the fourth embodiment, the following effects or advantages are achieved in addition to the same effect as in (1A)-(1D) and (1G) of the first embodiment.

(4E) The in-vehicle device 10 identifies as a driver a user possessing the facial feature point which is indicated by the facial feature information received from the portable device 20 and satisfies the identical determination condition set up based on the facial feature of the image of the driver taken with the camera 42. For this reason, the in-vehicle device 10 identifies a user with a high possibility of being the driver based on the facial feature point, thereby preventing to identify as a driver a user whose facial feature point is greatly different.

(4F) Even when a single piece of the user identification information is received from the portable device 20, the in-vehicle device 10 requests the portable device 20 of transmission of the facial feature information, and performs authentication based on the facial feature point. For this reason, when the driver does not possess the portable device 20 but a passenger other than the driver possesses the portable device 20 for example, it is possible to prevent to bring about a case where the driving environment is wrongly set for the passenger.

(4H) When there exist two or more users who satisfy the identical determination condition, the in-vehicle device 10 displays each user's name, and requests the user to select one. For this reason, even when determining by the facial feature point is difficult, it is possible to surely set the driving environment of vehicle 100 as the driving environment for the driver, at a cost of very easy selection operation.

[4-4 Correspondence with Claims]

In the driving-environment setup system of the fourth embodiment, the camera 42 corresponds to feature detection means.

The control unit 11 of the in-vehicle device 10 which performs processing of Steps S1003-S1006 and Steps S1008-S1011 in the vehicle environment setup processing (FIG. 14) corresponds to driver identifying means, and the control unit 11 of the in-vehicle device 10 which performs processing of Steps S1012-S1014 corresponds to driving-environment setup means.

The control unit 21 of the portable device 20 which performs processing of Steps S1201 and S1202 in the information-transmitting processing (FIG. 17) corresponds to environmental information transmitting means, and the control unit 21 of the portable device 20 which performs processing of Steps S1203 and S1204 corresponds to feature information transmitting means.

[5 Fifth Embodiment]

Next, a driving-environment setup system according to a fifth embodiment is explained. The entire structure of the driving-environment setup system of the fifth embodiment will be explained, referring to FIG. 13 which illustrates the outline structure of the driving-environment setup system of the fourth embodiment.

[5-1 Entire Structure]

In comparison with the driving-environment setup system of the fourth embodiment, the driving-environment setup system of the fifth embodiment differs in the processing performed when there exist two or more pieces of the facial feature information identified as belonging to the driver by the personal identification device 41. Specifically, before performing processing to display each name of the users identified as the driver, determination is performed whether the environment setup information item for each of the two or more users identified as the driver is the same, or similar to each other, or shares an identical part in common to each other, and the subsequent processing is performed according to the determination result. Hereinafter, explanation is given focusing on the portion which is different from the driving-environment setup system of the fourth embodiment, and further explanation on the similar or identical portion to the fourth embodiment is omitted by using the same symbols and numerals to the same elements.

[5-2 Processing Performed by a Driving-Environment Setup System]

Next, the processing performed by each of devices 10 and 20 which are included in the driving-environment setup system according to the fifth embodiment is explained.

[5-2-1 Processing Performed by an In-Vehicle Device]

Figure 18A:
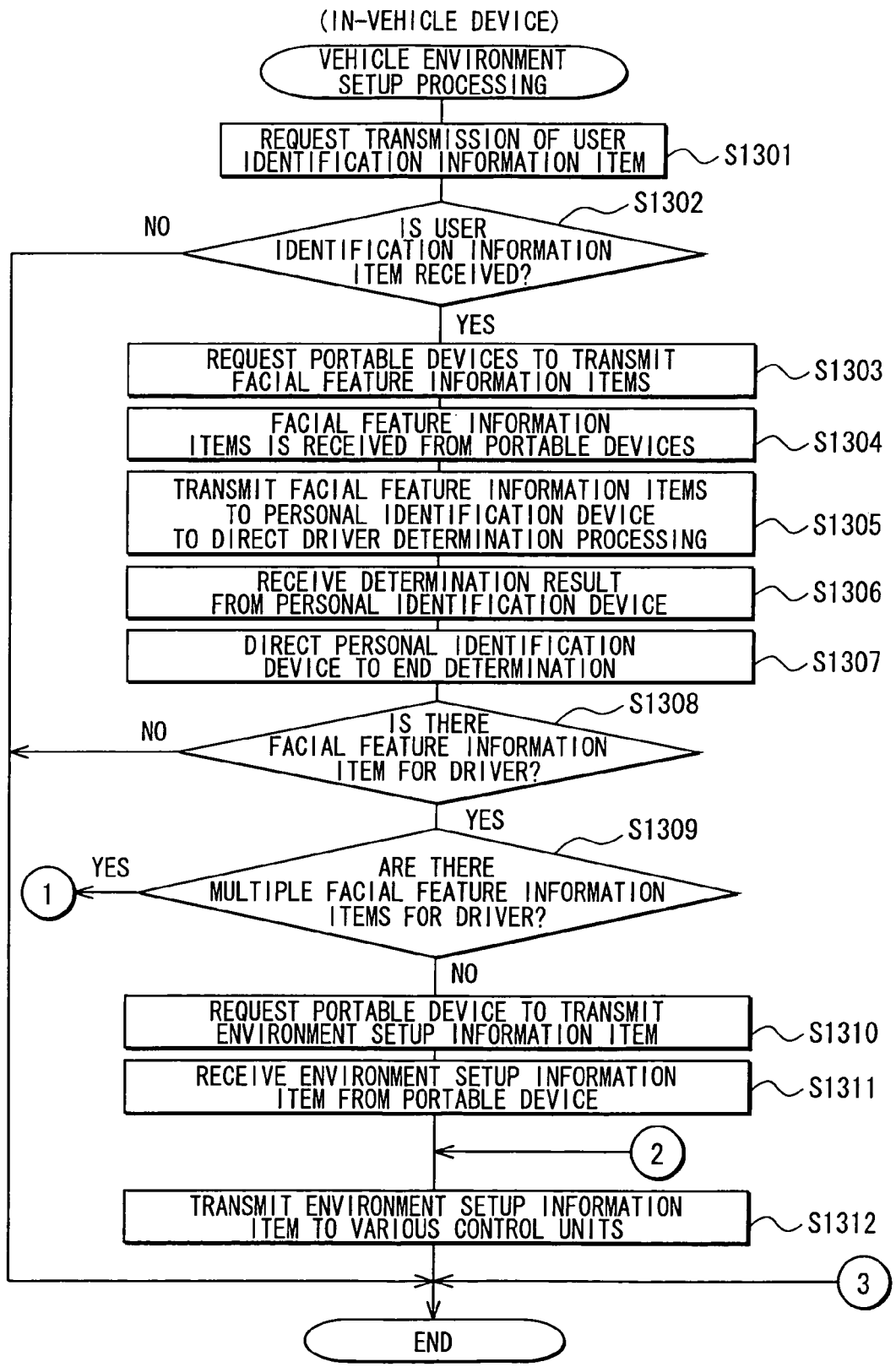
FIG. 18A is a flow chart illustrating a vehicle environment setup processing according to a fifth embodiment of the present invention.
Figure 18B:
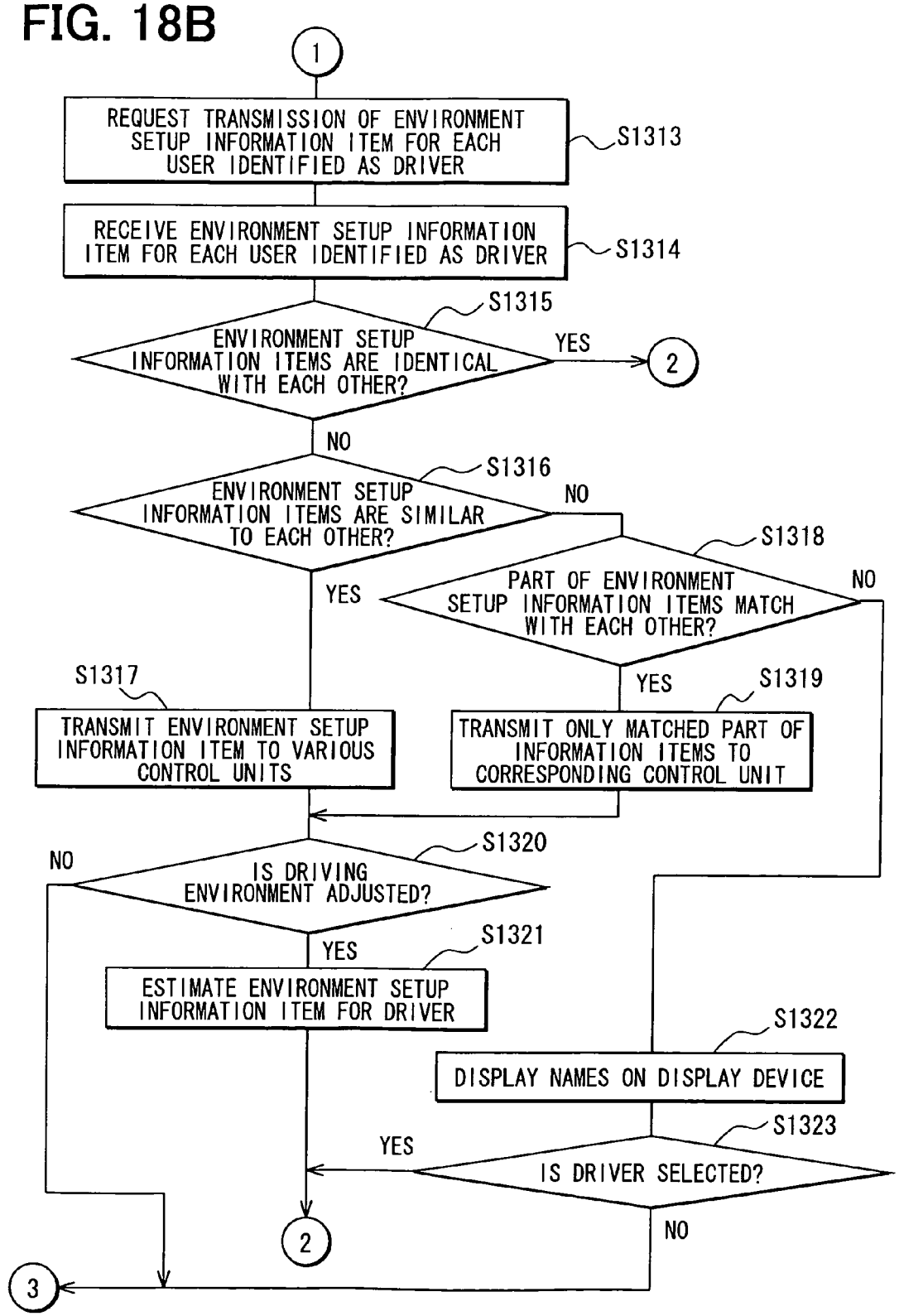
FIG. 18B is another flow chart in connection with the flow chart in FIG. 18A for illustrating the vehicle environment setup processing according to the fifth embodiment.

First, a vehicle environment setup processing performed by the control unit 11 of the in-vehicle device 10 is explained using a flow chart in FIGS. 18A and 18B. Compared with the vehicle environment setup processing (FIG. 14) of the fourth embodiment, in the vehicle environment setup processing of the fifth embodiment, contents of each processing of Steps S1301-S1312 are respectively the same as contents of each processing of Steps S1001-S1009 and Steps S1012-S1014, but processing is different if it is determined at S1309 that there exist two or more pieces of facial feature information identified as belonging to the driver.

In Step S1309, when it is determined that there exist two or more pieces of facial feature information identified as belonging to the driver, the flow proceeds to Step S1313.

In Step S1313, in order to acquire, from the portable device 20, the environment setup information item corresponding to the identified facial feature information, the setup information-sending request is transmitted to the portable device 20 which is a transmitting source of the each identified facial feature information. In other words, at S1313, the control unit 11 requests each of the portable devices 20 of the possible driver to transmit the environment setup information for each associated user identified as the possible driver. Consequently, the environment setup information items stored in the portable device 20 (environment setup information item for each user identified as the driver) are transmitted to the in-vehicle device 10.

In Step S1314, the environment setup information items transmitted by the portable device 20 are received.

In Step S1315, it is determined whether the contents of the environment setup information items received in Step S1314 are identical with each other. That is, it is determined whether the driving environment for each of users identified as the driver has the same conditions with each other.

In Step S1315, when it is determined that the contents of the environment setup information items are the same, it is considered that any one of the environment setup information items corresponds to the driver, and the flow proceeds to Step S1312. As a result, the driving environment of the vehicle 100 is set as the driving environment indicated by the environment setup information item (the driving environment for the driver).

On the other hand, in Step S1315, when it is determined that the contents of the environment setup information items are not the same with each other, the flow proceeds to Step S1316 to determine whether the contents of the environment setup information items (driving environment) are similar to each other. Specifically, the similarity range is set up for use as a criterion in deciding the similar driving environment, then, it is determined that the environment setup information items are similar to each other when the environment setup information items fall in the similarity range.

When it is determined, in Step S1316, that the contents of the environment setup information items are similar, the flow proceeds to Step S1317. After one of the multiple environment setup information items determined to be similar to each other is transmitted to the various control units 51-59, the flow proceeds to Step S1320. As a result, the driving environment of the vehicle 100 is set as the driving environment for one of the users among the multiple users identified as the driver.

When it is determined, on the other hand, in Step S1316, that the contents of the environment setup information items are not similar, the flow proceeds to Step S1318 to determine whether the contents of the environment setup information items are partially matching with each other. In other words, it is determined at S1318 whether the environment setup information items for the driver mutually have an identical part with each other. For example, when only the driving environment (seat position), which is set by the seat position controller 51 among the various control units 51-59, is the identical part shared by the environment setup information items, it is determined that the contents of the environment setup information item are partially matching with each other.

In Step S1318, when it is determined that the contents of the environment setup information item are partially matching with each other, the flow proceeds to Step S1319. After transmitting, to the various control units 51-59, only the identical portion shared among the environment setup information item, the flow proceeds to Step S1320. As a result, only the identical portion which is common among the driving environment for each of users identified as the driver is set up.

In Step S1320, it is determined whether the driving environment is adjusted by the external operation of the driver who rides the vehicle 100.

When it is determined that the driving environment has been adjusted in Step S1320, the flow proceeds to Step S1321. Based on the adjusted driving environment, the environment setup information item for the driver is estimated out of the environment setup information item of each of the users identified as the driver in Step S1321. Then, the flow proceeds to Step S1312. Namely, because adjustment of the driving environment by the user is operation for correcting the driving environment of the vehicle 100 to the driving environment for the user, it becomes possible to estimate the environment setup information item for the driver with the help of the adjusted driving environment as a clue. Consequently, the driving environment of the vehicle 100 is set (corrected) as the driving environment for the driver by processing in Step S1312.

On the other hand, when it is determined that the driving environment is not adjusted in Step S1320, the present vehicle environment setup processing is terminated without further execution. In the present embodiment, when no external operation to adjust the driving environment is performed within a fixed time (for example, for one minute), it is determined that the driving environment is not adjusted.

When it is determined in Step S1318 that the contents of the environment setup information items are not matching with each other even partially, the flow proceeds to Step S1322, and the name indicated by the name information corresponding to the identified facial feature information (name of each user identified as the driver) is displayed on the display device 43.

Then, in Step S1323, it is determined whether the user has performed operation (touch panel operation) to select the driver's name from the names listed on the display device 43.

When it is determined that the user has not performed operation to select the driver's name in Step S1323, the present vehicle environment setup processing is terminated without further execution. In the present embodiment, when selection operation is not performed within a fixed time (for example, for one minute) after displaying the user's name on the display device 43, it is determined that the selection operation has not been performed by the user.

On the other hand, in Step S1323, when it is determined that the user has performed operation to select the driver's name, it is considered that the environment setup information item corresponding to the selected name belongs to the driver, and the flow proceeds to Step S1312. As a result, the driving environment of the vehicle 100 is set as the driving environment indicated by the environment setup information item (the driving environment for the driver).

[5-2-2 Processing Performed by a Personal Identification Device]

Because the driver determination processing performed by the personal identification device 41 is the same as the driver determination processing (FIG. 16) of the fourth embodiment, the explanation thereof is omitted.

[5-2-3 Processing Performed by a Portable Device]

Because the information-transmitting processing performed by the control unit 21 of the portable device 20 is also the same as the information-transmitting processing (FIG. 17) of the fourth embodiment, the explanation thereof is omitted.

[5-3 Effect]

As explained above, according to the driving-environment setup system of the fifth embodiment, the following effects or advantages are obtained in addition to the same effect as in the fourth embodiment.

(5I) Even when there exist two or more users who satisfy the identical determination condition, if the driving environment for each user is identical or similar, the in-vehicle device 10 identifies one of the users as the driver, and sets the driving environment of the vehicle 100 as the driving environment for the identified user. For this reason, the driving environment of the vehicle 100 can be set as, or similar to, the driving environment for the driver, without requesting the user to perform the selection operation.

(5J) Even when there exist two or more users who satisfy the identical determination condition, if there is a portion which is mutually common in the driving environment for each user, the in-vehicle device 10 sets up the driving environment of the vehicle 100 for the common portion, regardless of the external operation. For this reason, a part of the driving environment of the vehicle 100 can be set as the driving environment for the driver, without requesting the user to perform the selection operation.

(5K) When the driving environment is adjusted through the external operation by the driver who rides the vehicle 100, the in-vehicle device 10 estimates, based on the adjusted driving environment, the driving environment for the driver out of the driving environments of the users, each identified as the driver. For this reason, the driving environment can be set up, without requesting the driver to make all the adjustments.

[5-4 Correspondence with Claims]

In the driving-environment setup system of the fifth embodiment, the camera 42 corresponds to feature detection means.

The control unit 11 of the in-vehicle device 10 which performs processing of Steps S1303-S1306, Steps S1308 and S1309, and Steps S1313-S1323 in the vehicle environment setup processing (FIGS. 18A and 18B) corresponds to driver identifying means, and the control unit 11 of the in-vehicle device 10 which performs processing of Steps S1310-S1312 corresponds to driving-environment setup means.

The control unit 21 of the portable device 20 which performs processing of Steps S1201 and S1202 in the information-transmitting processing (FIG. 17) corresponds to environmental information transmitting means, and the control unit 21 of the portable device 20 which performs processing of Steps S1203 and S1204 corresponds to feature information transmitting means.

[6 Sixth Embodiment]

Next, a driving-environment setup system according to a sixth embodiment is explained. The entire structure of the driving-environment setup system of the sixth embodiment will be explained, referring to FIG. 1 which illustrates the outline structure of the driving-environment setup system of the first embodiment.

[6-1 Entire Structure]

In comparison with the driving-environment setup system of the first embodiment, a driving-environment setup system of the sixth embodiment differs in that an in-vehicle device 10 sets a driving environment of a vehicle 100 as a driving environment for a user predicted to be a driver before the driver rides the vehicle 100. Specifically, a communication unit 13 of an in-vehicle device 10 is operable to perform a short distance radio communication between a portable device 20 existing in the communications area which includes the interior of a room of the vehicle 100 in which the in-vehicle device 10 concerned is mounted, and the exterior of the vehicle 100 (the circumference of the vehicle 100). Hereinafter, explanation is given focusing on the portion which is different from the driving-environment setup system of the first embodiment, and further explanation on the similar or identical portion to the first embodiment is omitted by using the same symbols and numerals to the same elements.

[6-2 Processing Performed by a Driving-Environment Setup System]

Next, the processing performed by each of devices 10 and 20 which are included in the driving-environment setup system of the sixth embodiment is explained.

[6-2-1 Processing Performed by an In-Vehicle Device]

First, the vehicle environment setup processing performed by the control unit 11 of the in-vehicle device 10 is explained using a flow chart of FIG. 19. Compared with the vehicle environment setup processing (FIG. 2) of the first embodiment, the vehicle environment setup processing of the sixth embodiment differs in that processing of Steps S1401-S1408 and processing of Step S1414 are performed instead of processing of Steps S101-S103. In addition, contents of each processing of Steps S1409-S1413, and Steps S1415-S1417 are respectively the same as contents of each processing of Steps S104-S111; therefore, the explanation of the contents of the processing thereof is omitted.

The vehicle environment setup processing of the sixth embodiment is started in the state where the user is not riding the vehicle 100. Specifically, for example, it is started when the engine of the vehicle 100 is stopped and when the portable device 20 has not been detected in the communications area for a predetermined time.

When the vehicle environment setup processing is started, first in Step S1401, the control unit 11 transmits the identification information-sending request to the portable device 20 by the short distance radio communication, in order to detect a user who is about to ride the vehicle 100 or a user who exists in the exterior of (in the areas surrounding) the vehicle 100. Consequently, when the portable device 20 exists in the areas surrounding the vehicle 100 or when the user is about to get in the vehicle 100 exists, the user identification information stored in the portable device 20 is transmitted to the in-vehicle device 10. This corresponds to Step S302 in the information-transmitting processing (FIG. 4) described above. That is, by receiving the user identification information transmitted by the portable device 20 in response to the identification information-sending request, the portable device 20 which exists in the communications area can be detected. In other words, the user in the communications area can be detected. The transmission of the identification information-sending request in Step S1401 is performed at an interval longer than a fixed time (for example, several seconds) from the last transmission. That is, the identification information-sending request is made to be transmitted periodically.

Then, in Step S1402, it is determined whether the user identification information is received.

When it is determined that the user identification information is received in Step S1402 (that is, when the portable device 20 is detected in the areas surrounding the vehicle 100, or when the user is about to ride the vehicle 100 is detected), the flow proceeds to Step S1403. After the start of the present vehicle environment setup processing, if the user identification information received is the same as the user identification information which has already been received, it is determined in Step S1402 that the user identification information is not received. That is, in Step S1402, it is designed so as to determine whether a new portable device 20 (a new user) is detected.

In Step S1403, it is determined whether the reception of the user identification information in Step S1402 is the first reception after the start of the present vehicle environment setup processing. In other words, it is determined at S1403 whether the user identification information received at S1402 corresponds to a first user who is about to ride the vehicle 100.

When it is determined that the reception is the first reception in Step S1403, the flow proceeds to Step S1404.

In Step S1404, in order to identify the driving environment for the user of the user identification information received or for the first user who is going to ride the vehicle 100, the setup information-sending request is transmitted to the portable device 20 which is a transmitting source of the above user identification information. Consequently, the environment setup information item stored in the portable device 20 is transmitted to the in-vehicle device 10 from the portable device 20. This corresponds to Step S306 in the information-transmitting processing (FIG. 4) described above.

In Step S1405, the environment setup information item transmitted by the portable device 20 is received.

In Step S1406, the environment setup information item received in Step S1405 is transmitted to various control units 51-59, and the flow proceeds to Step S1407. Consequently, the driving environment of the vehicle 100 is set as the driving environment for the user who is going to ride the vehicle 10 first.

On the other hand, also when it is determined in Step S1402 that the user identification information is not received in response to the transmission of the identification information-sending request in Step S1401 (that is, when the portable device 20 does not exist in the communications area), the flow proceeds to Step S1407.

Also when it is determined in Step S1403 that the reception is not the first reception, the flow proceeds to Step S1407.

In Step S1407, it is determined whether the user has sat or seated in the driver's seat of the vehicle 100 (that is, whether the driver has been seated or not). It is possible to perform the determination of whether the driver has sat down, for example, based on a detection value of a seat sensor provided in the driver's seat.

When it is determined in Step S1407 that the driver has not sat down, the flow returns to Step S1401. That is, processing of Steps S1401-S1406 is repeated until the driver sits down.

On the other hand, when it is determined in Step S1407 that the driver has sat down, the flow proceeds to Step S1408.

In Step S1408, it is determined whether two or more pieces of the user identification information are received after the start of the present vehicle environment setup processing. That is, it is determined whether multiple users, each of whom possesses the portable device 20, have ridden in the vehicle 100.

When it is determined that the multiple user identification information items are not received in Step S1408, the present vehicle environment setup processing is terminated without further execution. That is, when the single user identification information item is received, the driving environment is already set as the driving environment based on the above single user identification information item and it is not necessary to change the driving environment, then, the processing is terminated without further execution. Also when the user identification information is not received (when the user who rides in the vehicle 100 does not possess the portable device 20), the present vehicle environment setup processing is terminated.

On the other hand, when it is determined in Step S1408 that the multiple user identification information items are received (two or more users have ridden in the vehicle 100, each possessing the portable device 20), the flow proceeds to Step S1409.

In Step S1414, it is determined whether the environment setup information item has already been received from the portable device 20 in Step S1405. In this case, the portable device 20 is the transmitting source of the facial feature information which is identified as belonging to the driver, as the determination result of the driver determination processing directed to the personal identification device 41 in Step S1411. That is, it is intended to determine whether the driving environment, which has been set up before the driver rides the vehicle 100, belongs to the driver or not.

When it is determined that the environment setup information item is already received in Step S1414, the present vehicle environment setup processing is terminated without further execution, because the driving environment is already set as the driving environment for the driver.

On the other hand, when it is determined that the environment setup information item is not received yet in Step S1414, (when the driving environment for a passenger other than the driver is set up), the processing of Steps S1415-S1417 is performed in order to reset the current driving environment to the driving environment for the driver, then the present vehicle environment setup processing is terminated.

[6-2-2 Processing Performed by a Personal Identification Device]

Because the driver determination processing performed by the personal identification device 41 is the same as the driver determination processing (FIG. 3) of the first embodiment, the explanation thereof is omitted.

[6-2-3 Processing Performed by a Portable Device]

Because the information-transmitting processing performed by portable device 20 is also the same as the information-transmitting processing (FIG. 4) of the first embodiment, the explanation thereof is omitted.

[6-3 Effect]

As explained above, according to the driving-environment setup system of the sixth embodiment, the following effects or advantages are obtained in addition to the same effect as in (1A)-(1C) and (1E)-(1G) of the first embodiment.

(6L) The in-vehicle device 10 sets the driving environment of the vehicle 100 as the driving environment for the user, before the driver rides the vehicle 100, based on the environment setup information item acquired from the portable device 20 which is possessed by the user before riding the vehicle 100. In this way, by performing temporary setting of the driving environment before the driver rides the vehicle 100, if the driving environment temporarily set is for the driver, it is possible to set the driving environment as the driving environment for the driver before the driver rides the vehicle 100.

(6M) The in-vehicle device 10 sets the driving environment as the driving environment for user who is going to ride the vehicle 100 first as temporary setting of the driving environment. For this reason, the driving environment can be set up in the earliest stage. Because the user who is going to ride the vehicle 100 first has a high possibility of being the driver, it is possible to increase the possibility that the driving environment which is set temporarily is for the driver.

[6-4 Correspondence with Claims]

In the driving-environment setup system of the sixth embodiment, the camera 42 corresponds to feature detection means.

The control unit 11 of the in-vehicle device 10 which performs processing of Steps S1401-S1407 in the vehicle environment setup processing (FIG. 19) corresponds to driving-environment temporary setup means, the control unit 11 of the in-vehicle device 10 which performs processing of Steps S1408-S1412 corresponds to driver identifying means, and the control unit 11 of the in-vehicle device 10 which performs processing of Steps S1415-S1417 corresponds to driving-environment setup means.

The control unit 21 of the portable device 20 which performs processing of Steps S303 and S304 in the information-transmitting processing (FIG. 4) corresponds to feature information transmitting means, and the control unit 21 of the portable device 20 which performs processing of Steps S305 and S306 corresponds to environmental information transmitting means.

[7 Seventh Embodiment]

Next, a driving-environment setup system of a seventh embodiment is explained. The entire structure of the driving-environment setup system of the seventh embodiment will be explained, referring to FIG. 1 which illustrates the outline structure of the driving-environment setup system of the first embodiment.

[7-1 Entire Structure]

In comparison with the driving-environment setup system of the sixth embodiment, the driving-environment setup system of the seventh embodiment differs in the conditions to predict that a user who is detected around a vehicle 100 before a driver rides the vehicle 100 is supposed to be the driver. Specifically, compared with the sixth embodiment in which a first user who is going to ride in the vehicle 100 is predicted to be the driver, in the seventh embodiment, a user who is registered beforehand or in advance is predicted to be the driver. Hereinafter, explanation is given focusing on the portion which is different from the driving-environment setup system of the sixth embodiment, and further explanation on the similar or identical portion to the sixth embodiment is omitted by using the same symbols and numerals to the same elements.

[7-2 Processing Performed by a Driving-Environment Setup System]

Next, the processing performed by each of devices 10 and 20 which are included in the driving-environment setup system of the seventh embodiment is explained.

[7-2-1 Processing Performed by an In-Vehicle Device]

First, a vehicle environment setup processing performed by a control unit 11 of the in-vehicle device 10 is explained using a flow chart of FIG. 20. Compared with the vehicle environment setup processing (FIG. 19) of the sixth embodiment, the vehicle environment setup processing of the seventh embodiment differs only in that the processing of Step S1503 is performed instead of the processing of Step S1403. In addition, contents of each processing of Steps S1501 and S1502, and Steps S1504-S1517 are respectively the same as contents of each processing of Steps S1401 and S1402 and Steps S1404-S1417; therefore, the explanation about the contents of the processing thereof is omitted.

In Step S1503, it is determined whether the user identification information received in Step S1502 is user identification information registered in advance in the in-vehicle device 10. For example, the user who has the registered user identification information is an owner of the vehicle 100 in the present embodiment.

When it is determined that the received user identification information is the user identification information registered in advance, the flow proceeds to Step S1504, and when it is determined that the received user identification information is not the user identification information registered in advance, the flow proceeds to Step S1507.

In this way, when a user who is the owner of the vehicle 100 is detected before the driver rides the vehicle 100, the driving environment of the vehicle 100 is set up as the driving environment for the user.

[7-2-2 Processing Performed by a Personal Identification Device]

Because the driver determination processing performed by a personal identification device 41 is the same as the driver determination processing (FIG. 3) of the sixth embodiment, the explanation thereof is omitted.

[7-2-3 Processing Performed by a Portable Device]

Because the information-transmitting processing performed by the portable device 20 is also the same as the information-transmitting processing (FIG. 4) of the sixth embodiment, the explanation thereof is omitted.

[7-3 Effect]

As explained above, according to the driving-environment setup system of the seventh embodiment, the following effects or advantages are obtained in addition to the same effect as in the sixth embodiment (except (6M)).

(7M) The in-vehicle device 10 sets the driving environment as the driving environment for a user registered in advance, as temporary setting of the driving environment. For this reason, by registering in advance a user who has a high possibility of driving the vehicle 100 (for example, the owner of the vehicle 100), it is possible to increase possibility that the driving environment is set temporarily to the driving environment for the driver.

[7-4 Correspondence with Claims]

In the driving-environment setup system of the seventh embodiment, the camera 42 corresponds to feature detection means.

The control unit 11 of the in-vehicle device 10 which performs processing of Steps S1501-S1507 in the vehicle environment setup processing (FIG. 20) corresponds to driving-environment temporary setup means, the control unit 11 of the in-vehicle device 10 which performs processing of Steps S1508-S1512 corresponds to driver identifying means, and the control unit 11 of the in-vehicle device 10 which performs processing of Steps S1515-S1517 corresponds to driving-environment setup means.

The control unit 21 of the portable device 20 which performs processing of Steps S303 and S304 in the information-transmitting processing (FIG. 4) corresponds to feature information transmitting means, and the control unit 21 of the portable device 20 which performs processing of Steps S305 and S306 corresponds to environmental information transmitting means.

[8 Eighth Embodiment]

Next, a driving-environment setup system according to an eighth embodiment is explained. The entire structure of the driving-environment setup system of the eighth embodiment will be explained, referring to FIG. 1 which illustrates the outline structure of the driving-environment setup system of the first embodiment.

[8-1 Entire Structure]

In comparison with the driving-environment setup system of the sixth embodiment, the driving-environment setup system of the eighth embodiment differs in conditions for predicting that a user who is detected around a vehicle 100 before a driver rides the vehicle 100 is supposed to be the driver. Specifically, compared with the sixth embodiment in which a user who is going to ride in the vehicle 100 first is predicted to be the driver, in the eighth embodiment, a user who is detected first by the side of the driver's seat is predicted to be the driver. That is, in the driving-environment setup system of the eighth embodiment, a communication unit 13 of the in-vehicle device 10 is operable to detect a portable device 20 which exists in the exterior of the vehicle 100, by distinguishing the exterior on the driver's side from the exterior on the passenger's side. Hereinafter, explanation is given focusing on the portion which is different from the driving-environment setup system of the sixth embodiment, and further explanation on the similar or identical portion to the sixth embodiment is omitted by using the same symbols and numerals to the same elements.

[8-2 Processing Performed by a Driving-Environment Setup System]

Next, the processing performed by each of devices 10 and 20 which are included in the driving-environment setup system of the eighth embodiment is explained.

[8-2-1 Processing Performed by an In-Vehicle Device]

Figure 21:
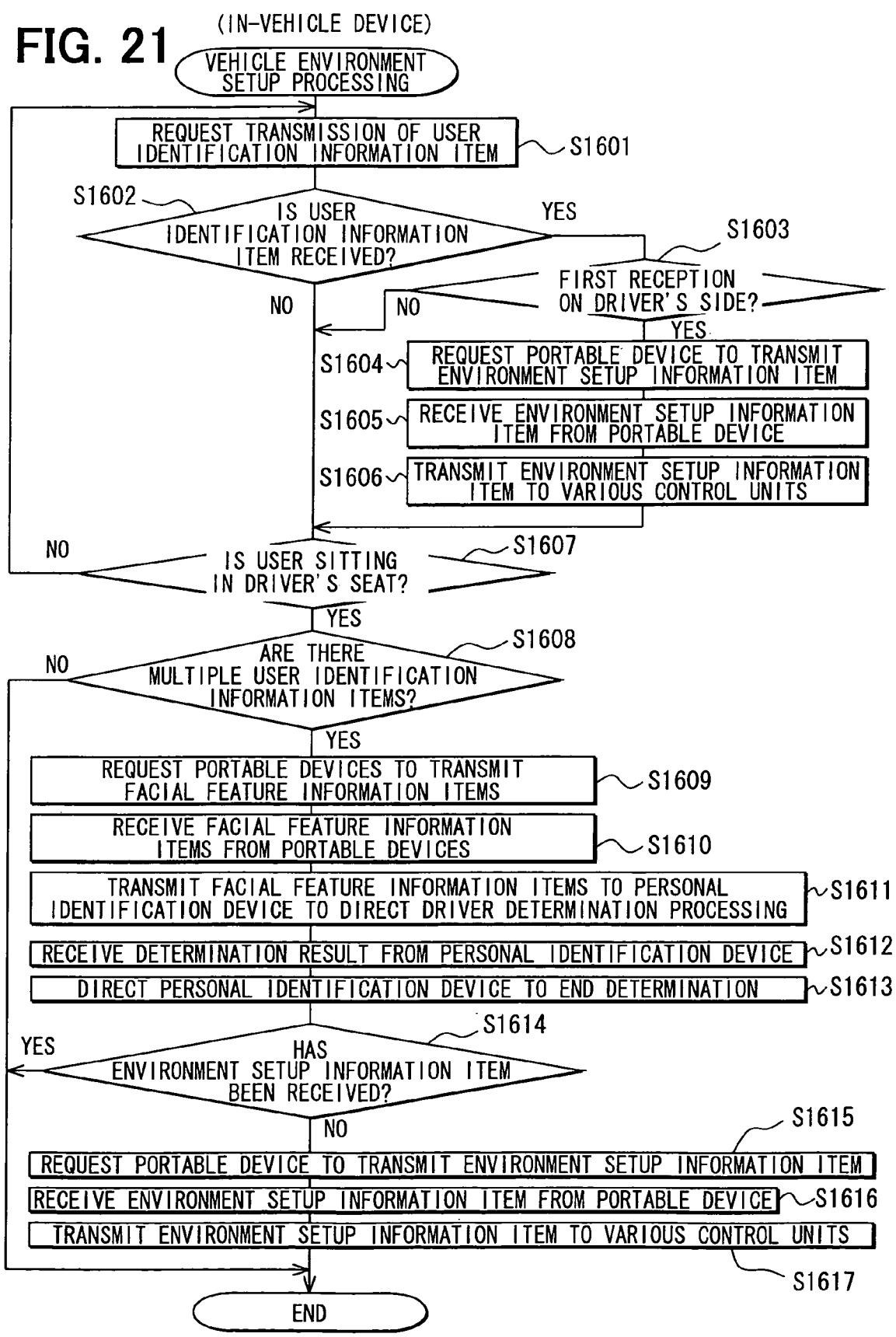
FIG. 21 is a flow chart illustrating a vehicle environment setup processing according to an eighth embodiment of the present invention.

First, a vehicle environment setup processing performed by a control unit 11 of the in-vehicle device 10 is explained using a flow chart of FIG. 21. Compared with the vehicle environment setup processing (FIG. 19) of the sixth embodiment, the vehicle environment setup processing of the eighth embodiment differs only in that the processing of Step S1603 is performed instead of the processing of Step S1403. In addition, contents of each processing of Steps S1601 and S1602, and Steps S1604-S1617 are respectively the same as contents of each processing of Steps S1401 and S1402 and Steps S1404-S1417; therefore, the explanation about the contents of the processing thereof is omitted.

In Step S1603, it is determined whether reception of the user identification information in Step S1602 is the first reception on the driver's side after the start of the present vehicle environment setup processing. In other words, it is determined whether the reception of the user identification information in Step S1602 corresponds to the first user who is going to ride in the vehicle 100 through the door on the side the vehicle for the driver's seat.

When it is determined that the reception is the first reception by the driver's side in Step S1603, the flow proceeds to Step S1604, and when it is determined that the reception is not the first reception by the driver's side, the flow proceeds to Step S1607.

In this way, the driving environment of the vehicle 100 is set as the driving environment for user first detected by the driver's side before the driver rides the vehicle 100.

[8-2-2 Processing Performed by a Personal Identification Device]

Because the driver determination processing performed by a personal identification device 41 is the same as the driver determination processing (FIG. 3) of the sixth embodiment, the explanation thereof is omitted.

[8-2-3 Processing Performed by a Portable Device]

Because the information-transmitting processing performed by the portable device 20 is also the same as the information-transmitting processing (FIG. 4) of the sixth embodiment, the explanation thereof is omitted.

[8-3 Effect]

As explained above, according to the driving-environment setup system of the eighth embodiment, the following effects or advantages are obtained in addition to the same effect as in the sixth embodiment (except (6M)).

(8M) The in-vehicle device 10 sets the driving environment as the driving environment for a user first detected by the driver's side, as temporary setting of the driving environment. For this reason, it is possible to further increase the possibility that the driving environment is temporarily set as the driving environment for the driver.

[8-4 Correspondence with Claims]

In the driving-environment setup system of the eighth embodiment, the camera 42 corresponds to feature detection means.

The control unit 11 of the in-vehicle device 10 which performs processing of Steps S1601-S1607 in the vehicle environment setup processing (FIG. 21) corresponds to driving-environment temporary setup means, the control unit 11 of the in-vehicle device 10 which performs processing of Steps S1608-S1612 corresponds to driver identifying means, and the control unit 11 of the in-vehicle device 10 which performs processing of Steps S1615-S1617 corresponds to driving-environment setup means.

The control unit 21 of the portable device 20 which performs processing of Steps S303 and S304 in the information-transmitting processing (FIG. 4) corresponds to feature information transmitting means, and the control unit 21 of the portable device 20 which performs processing of Steps S305 and S306 corresponds to environmental information transmitting means.

[9 Ninth Embodiment]

Next, a driving-environment setup system of a ninth embodiment is explained. The entire structure of the driving-environment setup system of the ninth embodiment will be explained, referring to FIG. 1 which illustrates the outline structure of the driving-environment setup system of the first embodiment.

[9-1 Entire Structure]

In comparison with the driving-environment setup system of the first embodiment, the driving-environment setup system of ninth embodiment differs in that a storage unit 22 of a portable device 20 does not store the environment setup information item indicative of the driving environment for the associated user who possesses the portable device 20. However, the storage unit 12 of the in-vehicle device 10 stores the environment setup information items for two or more associated users of the multiple portable devices 20.

That is, the setup information database which registers the environment setup information item indicative of the driving environment for each of two or more users is stored in the storage unit 12 of the in-vehicle device 10. In the setup information database, the environment setup information item for each user is registered in association with the user identification information of the user, and it is possible to identify the environment setup information item based on the user identification information.

The environment setup information item is registered in the setup information database by a predetermined procedure. In the present embodiment, in the vehicle 100, the driving environment for the user is set up by the external operation by the user, and registration operation of the environment setup information item is subsequently performed in the portable device 20, and the portable device 20 transmits the registration directions of the environment setup information item to the in-vehicle device 10 together with the user identification information stored in the storage unit 22. Then, upon receiving the registration directions, the in-vehicle device 10 registers, in the setup information database of the storage unit 12, the environment setup information item indicative of the current driving environment of the vehicle 100 and the user identification information received from the portable device 20. Here, the current driving environment has been set up by the user through the external operation by the time of the above procedure. The in-vehicle device 10 registers the environment setup information item and the user identification information in association with each other.

Hereinafter, explanation is given focusing on the portion which is different from the driving-environment setup system of the first embodiment, and further explanation on the similar or identical portion to the first embodiment is omitted by using the same symbols and numerals to the same elements.

[9-2 Processing Performed by a Driving-Environment Setup System]

Next, the processing performed by each of devices 10 and 20 which are included in the driving-environment setup system of the ninth embodiment is explained.

[9-2-1 Processing Performed by an In-Vehicle Device]

Figure 22:
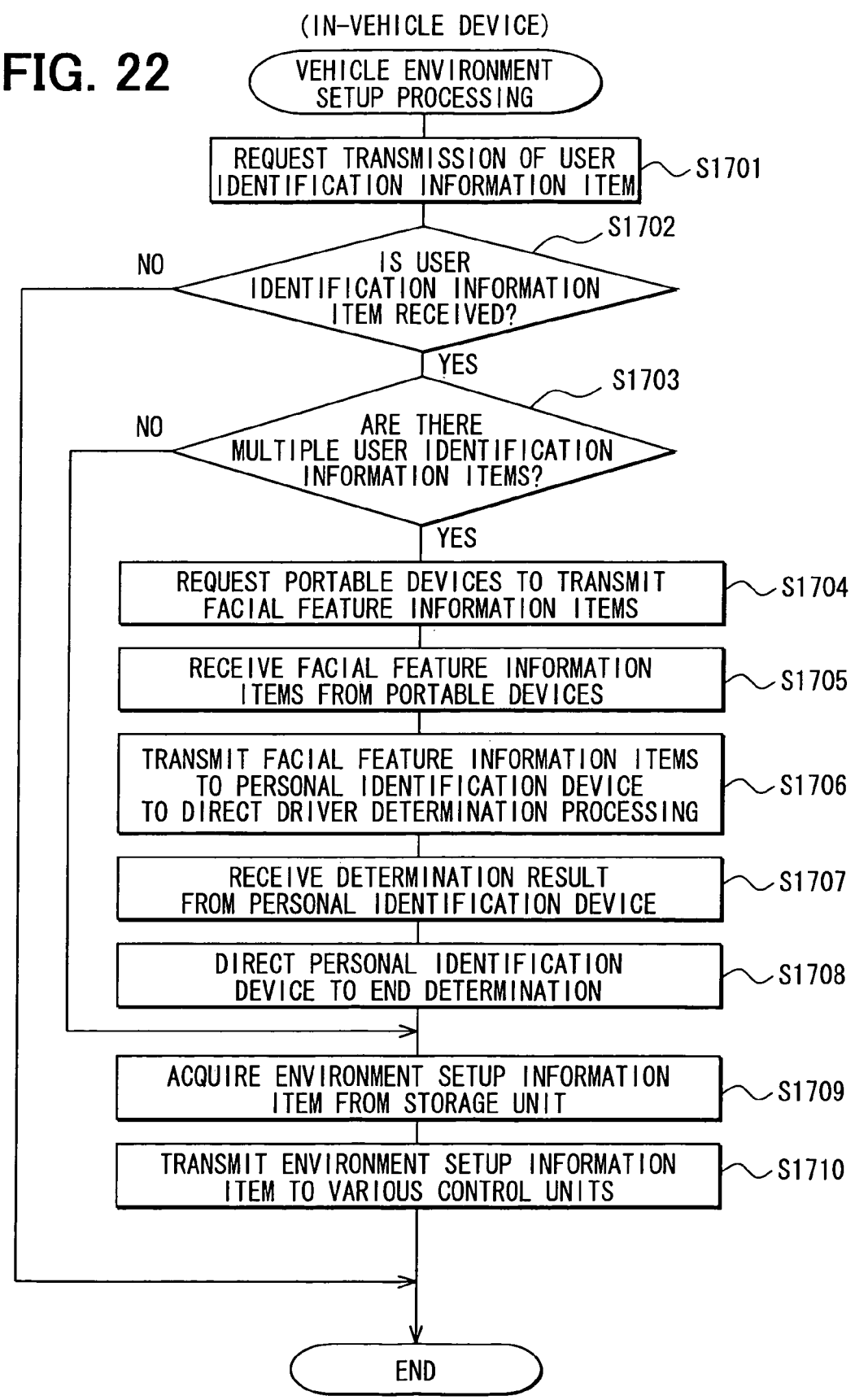
FIG. 22 is a flow chart illustrating a vehicle environment setup processing according to a ninth embodiment of the present invention.

First, a vehicle environment setup processing performed by a control unit 11 of the in-vehicle device 10 is explained using a flow chart of FIG. 22. Compared with the vehicle environment setup processing (FIG. 2) of the first embodiment, the vehicle environment setup processing of the ninth embodiment differs in that the processing of Step S1709 is performed instead of the processing of Steps S109 and S110. In addition, contents of each processing of Steps S1701-S1708 and Step S1710 are respectively the same as contents of each processing of Steps S101-S108 and Step S111; therefore, the explanation about the contents of the processing thereof is omitted.

In Step S1709, in order to identify the driving environment for the driver, the environment setup information item corresponding to the user identification information of the driver is acquired from the storage unit 12. Here, the environment setup information item indicates the driving environment for the driver. That is, the present embodiment differs from the first embodiment in that the environment setup information item is acquired not from the portable device 20, but from own storage unit 12.

[9-2-2 Processing Performed by a Personal Identification Device]

Because the driver determination processing performed by a personal identification device 41 is the same as the driver determination processing (FIG. 3) of the first embodiment, the explanation thereof is omitted.

[9-2-3 Processing Performed by a Portable Device]

The information-transmitting processing performed by the control unit 21 of the portable device 20 is different from the information-transmitting processing (FIG. 4) of the first embodiment, but the same as the information-transmitting processing (FIG. 8) of the second embodiment; therefore, the explanation thereof is omitted.

[9-3 Effect]

As explained above, according to the driving-environment setup system of the ninth embodiment, the following effects or advantages are obtained in addition to the same effect as in (1A)-(1F) of the first embodiment.

(9H) Because the portable device 20 only has to store and transmit to the in-vehicle device 10 the user identification information instead of the environment setup information item, it is possible to reduce the amount of information to be stored in the storage unit 22 and the amount of information to be transmitted to the in-vehicle device 10.

[9-4 Correspondence with Claims]

In the driving-environment setup system of the ninth embodiment, the camera 42 corresponds to feature detection means.

The storage unit 12 of the in-vehicle device 10 corresponds to a setup information storage means, the control unit 11 of the in-vehicle device 10 which performs processing of Steps S1703-S1707 in the vehicle environment setup processing (FIG. 22) corresponds to driver identifying means, and the control unit 11 of the in-vehicle device 10 which performs processing of Steps S1709 and S1710 corresponds to driving-environment setup means.

The control unit 21 of the portable device 20 which performs processing of Steps S303 and S304 in the information-transmitting processing (FIG. 4) corresponds to feature information transmitting means, and the control unit 21 of the portable device 20 which performs processing of Steps S305 and S306 corresponds to environmental information transmitting means.

[10 Tenth Embodiment]

Next, a driving-environment setup system of a tenth embodiment of the present invention is explained. The entire structure of the driving-environment setup system of the tenth embodiment will be explained, referring to FIG. 1 which illustrates the outline structure of the driving-environment setup system of the first embodiment.

[10-1 Entire Structure]

In comparison with the driving-environment setup system of the ninth embodiment, the driving-environment setup system of the tenth embodiment differs in that the storage unit 12 of the in-vehicle device 10 stores not only the environment setup information items for two or more users but also the facial feature information items for the users.

That is, the storage unit 22 of the portable device 20 doe not store the facial feature information indicative of the facial feature point of the associated user who possesses the portable device 20.

On the other hand, the storage unit 12 of the in-vehicle device 10 stores the setup information database for two or more users is stored, which registers the environment setup information item indicative of the driving environment for each user and the facial feature information indicative of the facial feature point of each user. In the present setup information database, the environment setup information item and the facial feature information for each user are registered in association with the user identification information for the user, and it is possible to identify the environment setup information item and the facial feature information based on the user identification information.

Hereinafter, explanation is given focusing on the portion which is different from the driving-environment setup system of the ninth embodiment, and further explanation on the similar or identical portion is omitted by using the same symbols and numerals to the same elements.

[10-2 Processing Performed by a Driving-Environment Setup System]

Next, the processing performed by each of devices 10 and 20 which are included in the driving-environment setup system of the tenth embodiment is explained.

[10-2-1 Processing Performed by an In-Vehicle Device]

Figure 23:
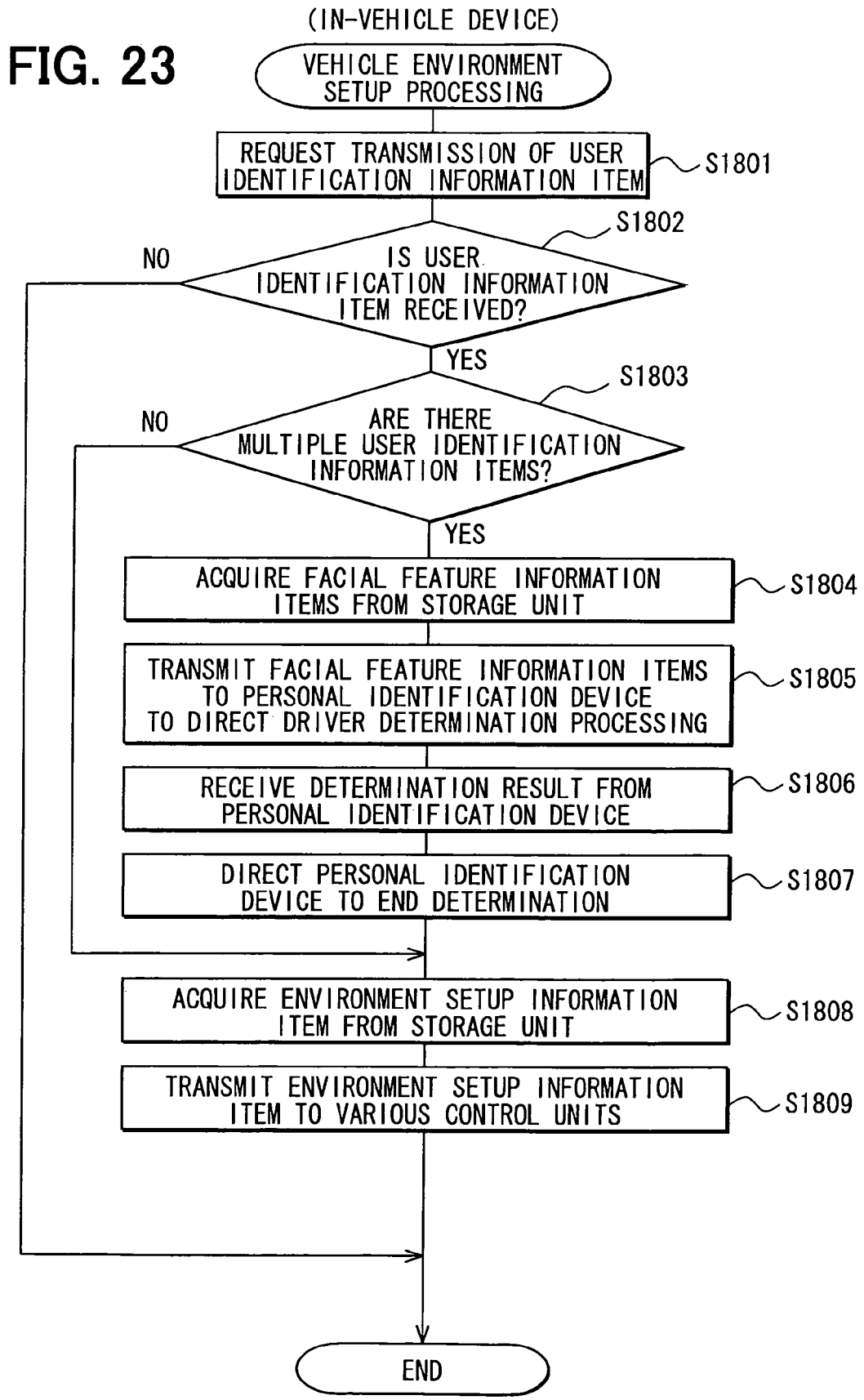
FIG. 23 is a flow chart illustrating a vehicle environment setup processing according to a tenth embodiment of the present invention.

First, a vehicle environment setup processing performed by a control unit 11 of the in-vehicle device 10 is explained using a flow chart of FIG. 23. Compared with the vehicle environment setup processing (FIG. 22) of the ninth embodiment, the vehicle environment setup processing of the tenth embodiment differs in that the processing of Step S1804 is performed instead of the processing of Steps S1704 and S1705. In addition, contents of each processing of Steps S1801-S1803 and Steps S1805-S1809 are respectively the same as contents of each processing of Steps S1701-S1703 and Steps S1706-S1710; therefore, the explanation about the contents of the processing thereof is omitted.

In Step S1804, the facial feature information corresponding to the user identification information received from the portable device 20 (the facial feature information of the user who rides in the vehicle 100) is acquired from the storage unit 12. That is, the present embodiment differs from the ninth embodiment in that the facial feature information is acquired not from the portable device 20, but from own storage unit 12.

[10-2-2 Processing Performed by a Personal Identification Device]

Because the driver determination processing performed by a personal identification device 41 is the same as the driver determination processing (FIG. 3) of the ninth embodiment, the explanation thereof is omitted.

[10-2-3 Processing Performed by a Portable Device]

The information-transmitting processing performed by the control unit 21 of the portable device 20 is different from the information-transmitting processing (FIG. 8) of the ninth embodiment, but the same as the information-transmitting processing (FIG. 11) of the third embodiment; therefore, explanation thereof is omitted.

[10-3 Effect]

As explained above, according to the driving-environment setup system of the tenth embodiment, in addition to the same effects as in (1A)-(1F) of the first embodiment, the following effects or advantages are obtained.

(10H) Because the portable device 20 should just store and transmit to the in-vehicle device 10 the user identification information instead of the facial feature information and the environment setup information item, it is possible to reduce the amount of information to be stored to the storage unit 22 and the amount of information to be transmitted to the in-vehicle device 10.

[10-4 Correspondence with Claims]

In the driving-environment setup system of the tenth embodiment, the camera 42 corresponds to feature detection means.

The storage unit 12 of the in-vehicle device 10 corresponds to a setup information storage means and feature information storage means, the control unit 11 of the in-vehicle device 10 which performs processing of Steps S1803-S1806 in the vehicle environment setup processing (FIG. 23) corresponds to driver identifying means, and the control unit 11 of the in-vehicle device 10 which performs processing of Steps S1808 and S1809 corresponds to driving-environment setup means.

The control unit 21 of the portable device 20 which performs processing of Steps S303 and S304 in the information-transmitting processing (FIG. 4) corresponds to feature information transmitting means, and the control unit 21 of the portable device 20 which performs processing of Steps S305 and S306 corresponds to environmental information transmitting means.

[11 Modification]

In the above, one embodiment of the present invention has been described. It is needless to say that the present invention can be practiced in various embodiments.

[11-1 Processing in Case Where a Single Piece of User Identification Information is Received]

In the fourth and fifth embodiments described above, even when the in-vehicle device 10 receives a single piece of the user identification information from the portable device 20 or when only one set of portable device 20 exists, the personal identification device 41 is made to perform the driver determination processing. However, the present invention is not limited to the case.

For example, like other embodiments (the first to third embodiments, the sixth to tenth embodiments), when a single piece of the user identification information is received, the driving environment may be set up, based on the environment setup information item corresponding to the received user identification information, without requesting the personal identification device 41 to perform the driver determination processing.

Figure 24:
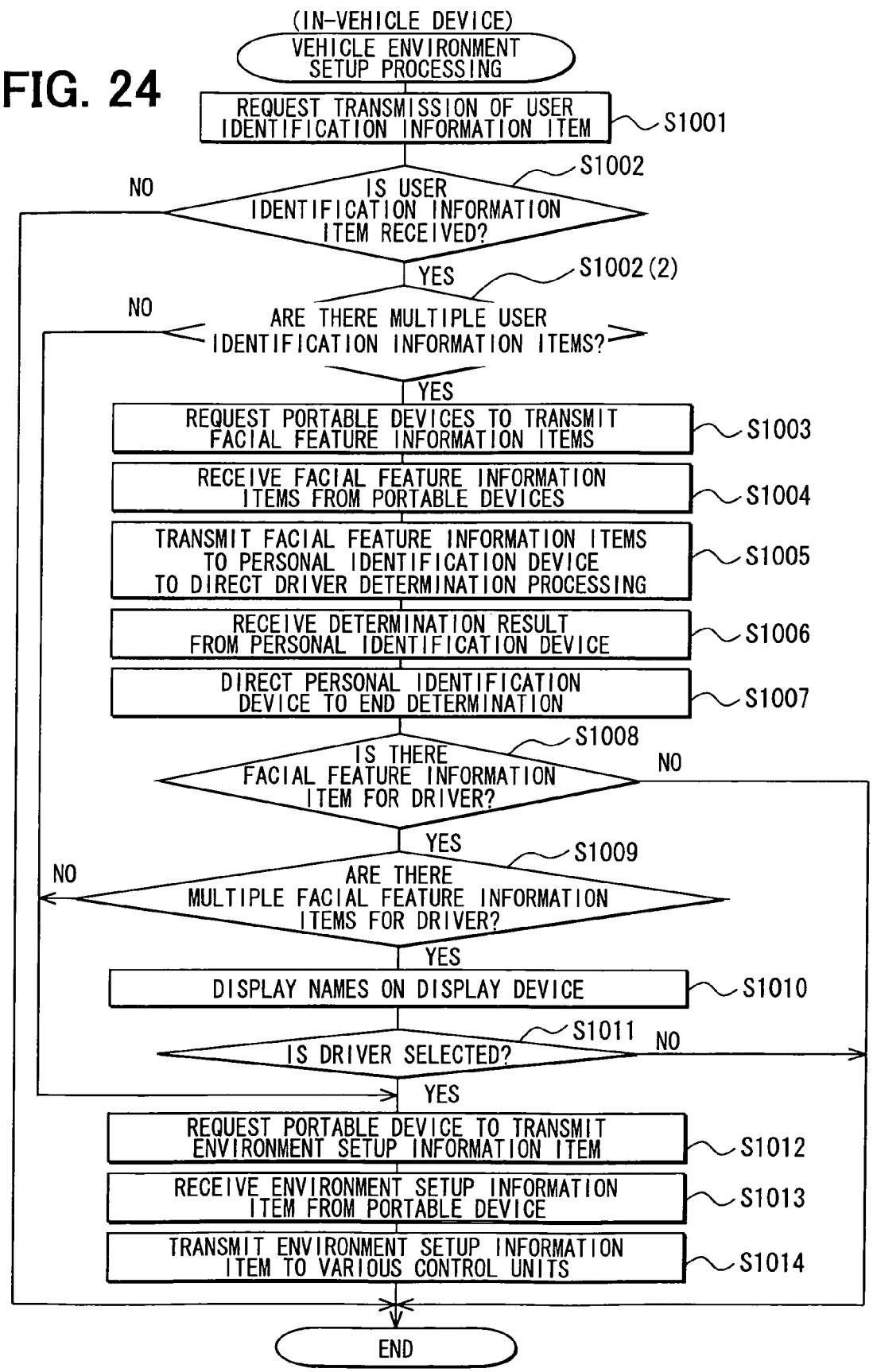
FIG. 24 is a flow chart illustrating a vehicle environment setup processing of a modified example of the fourth embodiment.

Specifically, the vehicle environment setup processing (FIG. 14) of the fourth embodiment can be accomplished by adding processing of Step S1002 (2), as illustrated in FIG. 24. That is, when it is determined that the user identification information is received in Step S1002, the flow proceeds to Step S1002 (2), and it is determined whether the multiple user identification information items are received or not. In Step S1002 (2), when it is determined that the multiple user identification information items are received, the flow proceeds to Step S1003. On the contrary, when it is determined that the multiple user identification information items are not received, the flow proceeds to Step S1012, without performing processing of Steps S1003-S1011.

Figure 25A:
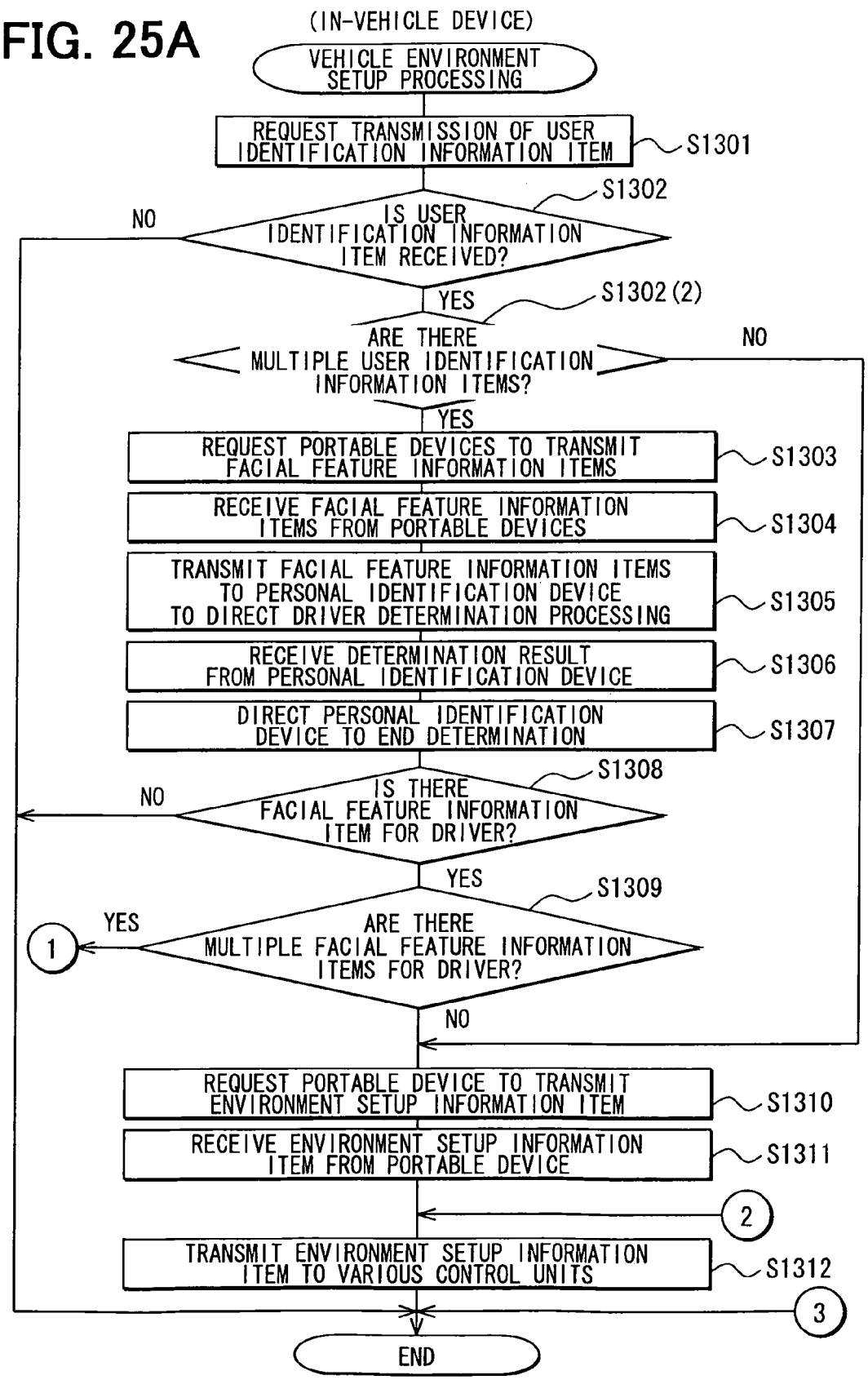
FIG. 25A is a flow chart illustrating a vehicle environment setup processing of a modified example of the fifth embodiment.
Figure 25B:
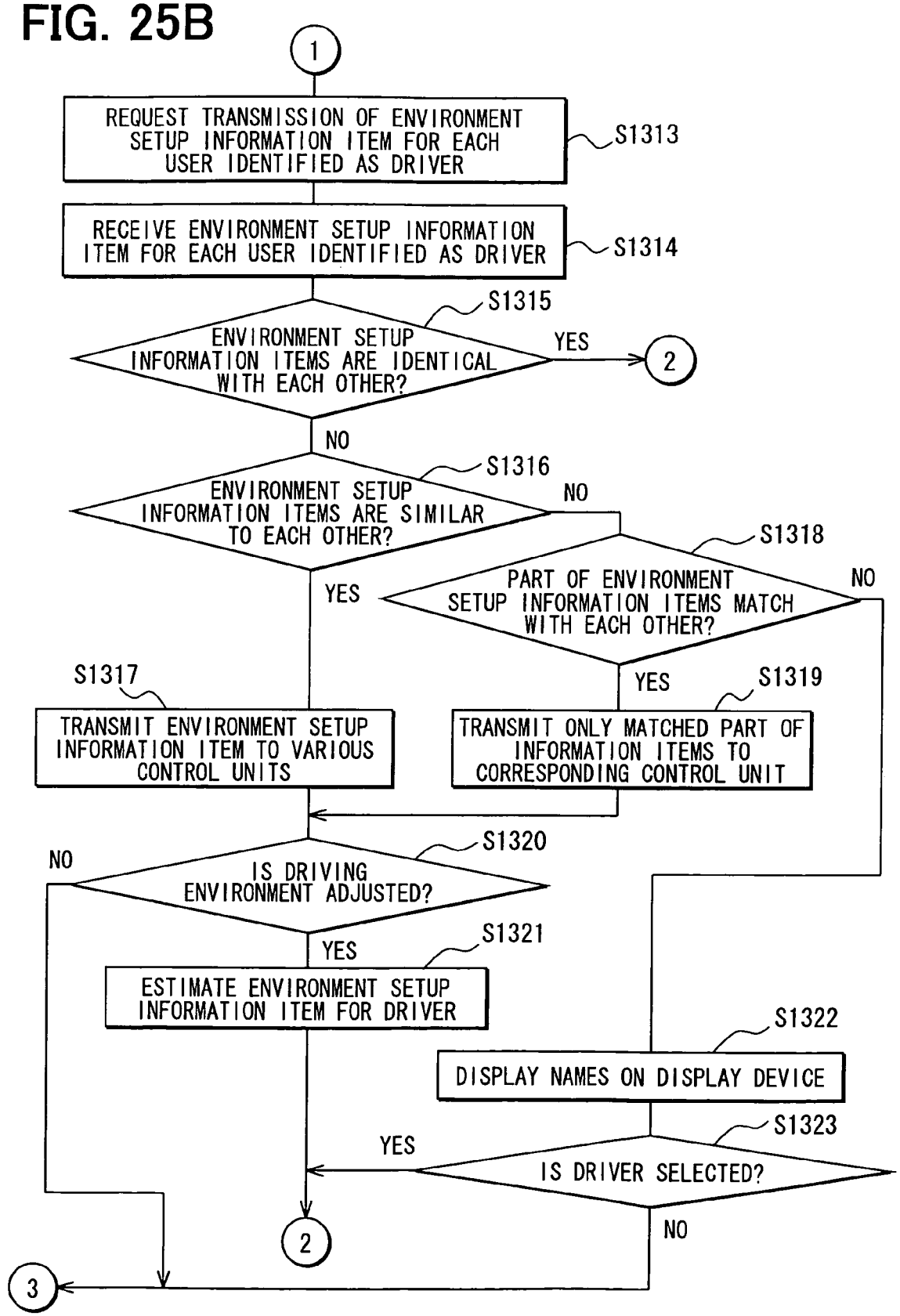
FIG. 25B is another flow chart in connection with the flow chart in FIG. 25A for illustrating the vehicle environment setup processing of the modified example of the fifth embodiment.

The vehicle environment setup processing (FIGS. 18A and 18B) of the fifth embodiment can be accomplished by adding processing of Step S1302 (2), as illustrated in FIGS. 25A and 25B. That is, when it is determined that the user identification information is received in Step S1302, the flow proceeds to Step S1302 (2), and it is determined whether the multiple user identification information items are received or not. In Step S1302 (2), when it is determined that the multiple user identification information items are received, the flow proceeds to Step S1303; on the contrary, when it is determined that the multiple user identification information items are not received, the flow proceeds to Step S1310, without performing processing of Steps S1303-S1309 and Steps S1313-S1323.

On the other hand, in the first to third embodiments and the sixth to tenth embodiments, when the in-vehicle device 10 receives a single piece of the user identification information from the portable device 20, the driving environment is set up, based on the environment setup information item corresponding to the user identification information, without requesting the personal identification device 41 to perform the driver determination processing. However, the present invention is not limited to the case.

That is, in these embodiments, the personal identification device 41 performs the driver determination processing for identifying one of the facial feature information items received from the in-vehicle device 10 as the facial feature information item for the driver, the one being most similar to the facial feature point indicated by the taken image to belong to the driver. Therefore, the one facial feature information item which belongs to the driver is certainly identified. However, when the driver does not possess the portable device 20 but a passenger other than the driver possesses the portable device 20, it is likely that the driving environment of the vehicle 100 will be wrongly set as the driving environment for the passenger by such processing. Accordingly, even for the facial feature information item, which is one of the information items received from the in-vehicle device 10, and which is most similar to the facial feature point indicated by the taken image among the received information items, it is preferable to perform a driver determination processing, in which the facial feature information shall not be identified as belonging to the driver unless the facial feature information satisfies the identical determination condition, as in the fourth and fifth embodiments described above. Even when the in-vehicle device 10 receives a single piece of user identification information from the portable device 20, it is possible to prevent the driving environment of the vehicle 100 from being wrongly set as the driving environment for the fellow passenger, as long as the personal identification device 41 is made to perform the driver determination processing.

[11-2 A Driver's Riding Detection]

According to each embodiment described above, the in-vehicle device 10 detects the fact that the driver rides the vehicle 100 with the aid of the seat sensor provided in the driver's seat. However, the present invention is not limited to the case. For example, it may be possible-.to detect the fact that the driver rides the vehicle 100, through the detection of opening, closing, and unlocking of the door of the driver's seat side, or in use of the taken image of the camera 42, etc.

In the first to fifth embodiments and the ninth and tenth embodiments, the in-vehicle device 10 performs processing to acquire the user identification information (to detect a user who rides in the vehicle 100), at the time when it is detected that the driver rides in the vehicle 100. However, the present invention is not limited to the case. For example, the in-vehicle device 10 may perform processing in which the user identification information is periodically acquired, prior to the time when the driver rides in the vehicle 100.

[11-3 Acquisition of Information from a Portable Device by an In-Vehicle Device]

In the first and second embodiments, and the fourth to ninth embodiments described above, the in-vehicle device 10 detects the portable device 20 which exists in the communications area by acquiring the user identification information from the portable device 20, and acquires the facial feature information by transmitting a feature information-sending request to the detected portable device 20. However, the timing when the in-vehicle device 10 acquires the facial feature information from the portable device 20 is not limited to the case.

For example, when the in-vehicle device 10 detects the portable device 20 which exists in the communications area, the in-vehicle device 10 may acquire the facial feature information instead of, or together with, the user identification information. In this way, the in-vehicle device 10 does not need to transmit a feature information-sending request to the portable device 20, after detecting the portable device 20 which exists in the communications area. Therefore, it is possible to simplify the processing.

In the construction in which the in-vehicle device 10 acquires the environment setup information item from the portable device 20, the environment setup information item may be acquired when detecting the portable device 20 which exists in the communications area. In this way, the in-vehicle device 10 does not need to transmit a setup information-sending request to the portable device 20, thereby simplifying the processing.

Acquisition of the information from the portable device 20 by the in-vehicle device 10 is not limited to the method performed in response to the request from the in-vehicle device 10. For example, it may be possible to provide construction in which the portable device 20 transmits information to the in-vehicle device 10 periodically.

[11-4 Acquisition of Information from a Management Device by an In-Vehicle Device]

In the second and third embodiments described above, the in-vehicle device 10 receives the environment setup information item corresponding to the user identification information from the management device 30, by transmitting a setup information-sending request to the management device 30 together with the user identification information. However, the method in which the in-vehicle device 10 acquires the environment setup information item from the management device 30 is not limited to the case.

For example, when the portable device 20 is operable to perform communication with the management device 30, the following construction may be also possible.

That is, the driving-environment setup system may be constructed such that the portable device 20 transmits a setup information-sending request to the management device 30 together with the user identification information, and receives the environment setup information item corresponding to the user identification information from the management device 30, then the portable device 20 transmits the environment setup information item received to the in-vehicle device 10.

Alternatively, the driving-environment setup system may be constructed such that the portable device 20 transmits a setup information-sending request to the management device 30, together with the user identification information and the vehicles identification information, then the management device 30 transmits the environment setup information item corresponding to the received user identification information to the in-vehicle device 10 identified based on the received vehicles identification information.

In the third embodiment described above, the in-vehicle device 10 receives the facial feature information corresponding to the user identification information from the management device 30, by transmitting a feature information-sending request to the management device 30 together with the user identification information. It is also possible to provide a similar construction for the case.

[11-5 Selection Operation by a User]

In the fourth and fifth embodiments described above, when there exist the multiple facial feature information items identified as belonging to the driver by the personal identification device 41, name of each user identified as the driver is displayed on the display device 43, and the user is requested to select the name. However, the present invention is not limited to the case.

For example, the name of each user identified as the driver may be displayed on display means other than the display device 43 (for example, on an in-meter-panel indicator of the vehicle 100, or a display area provided in the portable device 20 of each user). Alternatively, it may be preferable to let the user know the name of each user by other modes than a display (for example, by voice). Further, the selection operation by a user may be possible to use other operation than a touch panel operation (for example, operation of a steering wheel-mounted switch, operation of a switch on an instrument panel, voice-activated operation based on speech recognition). In addition, it is also preferable to let the user know other information than the name of the user.

[11-6 Construction of a Portable Device]

In each of the embodiments described above, examples are explained in which a portable telephone terminal is employed to construct the portable device 20. However, the portable device 20 is not limited to the case. For example, a storage device possessing a scheme operable to perform radio communication, such as a portable information device such as PDA, an electronic key (smart key) of the vehicle 100, may be employed to construct the portable device 20. A storage device which performs a non-contact-type or contact-type data transfer, such as an IC card, an Edy Card, a USB memory, and an SD card, may be employed. A special-purpose device may be preferably employed instead of employing other devices.

In each of the embodiments described above, cases where each user possesses one portable device 20 are exemplified. However, the present invention is not limited to the cases, and two or more users may share one portable device 20, for example. In this case, the portable device 20 stores the information about each of the two or more users who share the portable device 20. The information may include the user identification information, the facial feature information, the environment setup information item, as required, in association with each other. Even in such construction, the same effects as in each of the embodiments described above will be obtained.

[11-7 Physical Feature Detected from a Driver]

In each of the embodiments described above, the construction in which the authentication of the driver is performed by detecting a facial feature point as a user's physical feature is exemplified. However, the present invention is not limited to the case. Alternatively, the user's physical feature may include other features (e.g., biological feature), which is unique to the individual body, such as a fingerprint, a vein, an iris, a voiceprint, a retina, etc.

Feature identification information and environment identification information, which are adopted in the present driving-environment setup system, do not necessarily need to be such information that possesses mutually different contents. For example, they may be common information which can identify both a user's physical feature and a driving environment for the user. In this case, environmental information transmitting means and feature information transmitting means, which are adopted in the present driving-environment setup system, can be constructed as one common means.

In the above embodiments, information is directly transmitted from a portable device to an in-vehicle device. However, the information may be transmitted from the portable device indirectly to the in-vehicle device via an intermediate device. In the above case, the intermediate device transmits the received information as it is, or alternatively, may transmit differently-formatted information different from the received information. For example, the portable device may transmit, to an intermediate device, information which indirectly indicates a physical feature of the associated user of the portable device. Then, the intermediate device converts the information received from the portable device into another information directly indicative of the physical feature of the associated user of the portable device and transmits the converted information to the in-vehicle device. In such construction, feature identification information which can identify a user's physical feature will be transmitted from the portable device to the in-vehicle device as a result.

When the in-vehicle device is capable of communicating with the portable device in at least one of the situations where a user who possesses the portable device is going to ride or has ridden a vehicle, for example, it can be considered that the portable device of the user can communicate with the in-vehicle device.

Additional advantages and modifications will readily occur to those skilled in the art. The invention in its broader terms is therefore not limited to the specific details, representative apparatus, and illustrative examples shown and described.

What is claimed is:

1. A driving-environment setup system comprising:
an in-vehicle device mounted on a vehicle; and
a plurality of portable devices configured to be carried in the vehicle, wherein:
each of the plurality of portable devices includes:
feature information transmitting means for transmitting, to the in-vehicle device, a feature identification information item indicative of a physical feature of an associated user of the each of the plurality of portable devices; and
environmental information transmitting means for transmitting, to the in-vehicle device, an environment identification information item indicative of a driving environment for the associated user; and
the in-vehicle device includes:
feature detection means for detecting a physical feature of a person sitting in a driver's seat of the vehicle
radio communication means for performing radio communication with the plurality of portable devices existing in a communication area of the radio communication means;
driver identifying means for identifying which one of the associated users of the each of the plurality of portable devices is a driver of the vehicle, by:
determining whether or not the plurality of portable devices is carried in the vehicle, and acquiring the feature identification information items from the plurality of portable devices by the radio communication when it is determined that the plurality of portable devices is carried in the vehicle; and
determining which one of the physical features indicated by the received feature identification information matches the physical feature of the person sitting in the driver's seat detected by the feature detection means; and
driving-environment setup means for setting a driving environment of the vehicle to the driving environment for the one of the associated users who is identified as the driver by the driver identifying means, based on the environment identification information item received by the radio communication means.

2. The driving-environment setup system of claim 1, wherein:
the feature information transmitting means is operable to transmit the feature identification information item to the in-vehicle device when the in-vehicle device requests the feature information transmitting means to transmit the feature identification information item; and
the driver identifying means requests the portable device of the associated user, which gets in the vehicle, to transmit the feature identification information item such that the driver identifying means receives the feature identification information item.

3. The driving-environment setup system of claim 2, wherein the driver identifying means requests the portable device, which is in communication with the in-vehicle device, to transmit the feature identification information item.

4. The driving-environment setup system of claim 1, wherein:
the environmental information transmitting means is operable to transmit the environment identification information item to the in-vehicle device when the in-vehicle device requests the environmental information transmitting means to transmit the environment identification information item; and
the driving-environment setup means requests the portable device of the one of the associated users to transmit the environment identification information item such that the driving-environment setup means receives the environment identification information item.

5. The driving-environment setup system of claim 1, wherein:
when a single feature identification information item is receivable from one of the plurality of portable devices, the driver identifying means identifies the associated user of the one of the plurality of portable devices as the driver of the vehicle.

6. The driving-environment setup system of claim 1, further comprising:
a setup information management device operable to store an environment setup information item indicative of the driving environment of the associated user of the each of the plurality of portable devices, wherein:
the environmental information transmitting means of the each of the plurality of portable devices is operable to transmit, as the environment identification information item, an information item that is used for identifying the environment setup information item of the associated user of the each of the plurality of portable devices among the environment setup information items stored in the setup information management device; and
the driving-environment setup means acquires, from the setup information management device, the environment setup information item identified based on the environment identification information item and sets the driving environment of the vehicle for the driver as the driving environment indicated by the environment setup information item acquired from the setup information management device.

7. The driving-environment setup system of claim 6, wherein the setup information management device includes setup information replying means for transmitting, to the in-vehicle device, the environment setup information item identified based on the environment identification information item, when the environment identification information item is received from the in-vehicle device, and
wherein the driving-environment setup means acquires the environment setup information item by transmitting the environment identification information item to the setup information management device.

8. The driving-environment setup system of claim 1, wherein the in-vehicle device includes setup information storage means for storing an environment setup information item indicative of the driving environment of the associated user of the each of the plurality of portable devices,
wherein the environmental information transmitting means of the each of the plurality of portable devices is operable to transmit, as the environment setup information item, an information item that is used for identifying the environment setup information item of the associated user of the each of the plurality of portable devices among the environment setup information items stored in the setup information storage means, and
wherein the driving-environment setup means acquires, from the setup information storage means, the environment setup information item identified based on the environment identification information item and sets the driving environment of the vehicle for the driver as the driving environment indicated by the environment setup information item acquired from the setup information storage means.

9. The driving-environment setup system of claim 1, wherein the environmental information transmitting means of the each of the plurality of portable devices is operable to transmit, as the environment identification information item, an information item indicative of the driving environment for the associated user of the each of the plurality of portable devices, and
wherein the driving-environment setup means sets the driving environment of the vehicle as the driving environment indicated by the environment identification information item.

10. The driving-environment setup system of claim 1, wherein the driver identifying means identifies the one of the associated users as the driver of the vehicle when the physical feature identified based on the received feature identification information item of the one of the associated users is most similar to the physical feature detected by the feature detection means.

11. The driving-environment setup system of claim 1, wherein the driver identifying means identifies the one of the associated users as the driver of the vehicle when the physical feature identified based on the received feature identification information item of the one of the associated users corresponds to the physical feature detected by the feature detection means to satisfy an identical determination condition.

12. The driving-environment setup system of claim 11, wherein when the physical feature identified based on the received feature identification information item of another one of the associated users satisfies the identical determination condition, the driver identifying means identifies, as the driver of the vehicle, one of the one and the another one of the associated users based on an external operation.

13. The driving-environment setup system of claim 12, wherein, even in a case, where the physical feature identified based on the received feature identification information item of the another one of the associated users satisfies the identical determination condition, if the driving environments identified based on the environment identification information items of the one and the another one of the associated users are similar to each other to satisfy a similarity criterion condition, the driver identifying means identifies as the driver of the vehicle one of the one and the another one of the associated users regardless of the external operation.

14. The driving-environment setup system of claim 13, wherein the driver identifying means identifies the one of the one and the another one of the associated users as the driver of the vehicle based on the external operation for adjusting the driving environment of the vehicle.

15. The driving-environment setup system of claim 12, wherein, even in a case, where the physical feature indicated by the received feature identification information item of the another one of the associated users satisfies the identical determination condition, if the driving environments identified based on the environment identification information items of the one and the another one of the associated users mutually have an identical part with each other, the driving-environment setup means sets the identical part of the driving environment of the vehicle regardless of the external operation.

16. The driving-environment setup system of claim 1, wherein the in-vehicle device includes driving-environment temporary setup means for setting the driving environment of the vehicle as the driving environment for the associated user of the portable device before the driver gets in the vehicle, based on the environment identification information item received from the portable device located outside the vehicle.

17. The driving-environment setup system of claim 16, wherein the driving-environment temporary setup means sets the driving environment of the vehicle, based on the environment identification information item firstly received from the portable device located outside the vehicle.

18. The driving-environment setup system of claim 16, wherein the driving-environment temporary setup means sets the driving environment of the vehicle, based on the environment identification information item received from the portable device, which is located outside the vehicle, and the associated user of which is registered in advance.

19. The driving-environment setup system of claim 16, wherein the driving-environment temporary setup means sets the driving environment of the vehicle, based on the environment identification information item which is received from the portable device located outside on a driver's seat side of the vehicle.

20. The driving-environment setup system of claim 1, further comprising:
a feature information management device operable to store a feature information item indicative of the physical feature of the associated user of the each of the plurality of portable devices,
wherein the feature information transmitting means of the each of the plurality of portable devices is operable to transmit, as the feature identification information item, an information item used for identifying the feature information item of the associated user of the each of the plurality of portable devices among the feature information items stored in the feature information management device, and
wherein the driver identifying means acquires, from the feature information management device, the feature information item identified based on the feature identification information item and identifies the one of the associated users as the driver of the vehicle when the physical feature indicated by the feature information item acquired from the feature information management device corresponds to the physical feature detected by the feature detection means.

21. The driving-environment setup system of claim 20,
wherein the feature information management device includes feature information replying means for transmitting, to the in-vehicle device, the feature information item identified based on the feature identification information item, when the feature identification information item is received from the in-vehicle device, and
wherein the driver identifying means acquires the feature information item by transmitting the feature identification information item to the feature information management device.

22. The driving-environment setup system of claim 1,
wherein the in-vehicle device includes feature information storage means for storing a feature information item indicative of the physical feature of the associated user of the each of the plurality of portable devices,
wherein the feature information transmitting means of the portable device is operable to transmit, as the feature identification information item, an information item used for identifying the feature information item of the associated user of the each of the plurality of the portable devices among the feature information items stored in the feature information storage means, and
wherein the driver identifying means acquires, from the feature information storage means, the feature information item identified based on the feature identification information item and identifies the one of the associated users as the driver of the vehicle when the physical feature indicated by the feature information item acquired from the feature information storage means corresponds to the physical feature detected by the feature detection means.

23. The driving-environment setup system of claim 1,
wherein the feature information transmitting means of the each of the plurality of portable devices is operable to transmit, as the feature identification information item, an information item indicative of the physical feature of the associated user of the each of the plurality of portable devices, and
wherein the driver identifying means identifies the one of the associated users as the driver of the vehicle when the physical feature indicated by the feature identification information item of the one of the associated users corresponds to the physical feature detected by the feature detection means.

24. The driving-environment setup system of claim 1, wherein the physical feature is a facial feature point of the associated user.

25. An in-vehicle device mounted on a vehicle and configured to communicate with a plurality of portable devices, wherein the plurality of portable devices are configured to be carried in the vehicle, wherein each of the plurality of portable devices transmits, to the in-vehicle device, a feature identification information item used for identifying a physical feature of an associated user of the each of the plurality of portable devices, and wherein the each of the plurality of portable devices transmits, to the in-vehicle device, an environment identification information item indicative of a driving environment for the associated user, the in-vehicle device comprising:
radio communication means for performing radio communication with the plurality of portable devices existing in a communication area of the radio communication means; driver identifying means for identifying which one of the associated users of the each of the plurality of portable devices is a driver of the vehicle, by:

determining whether or not the plurality of portable devices is carried in the vehicle, and acquiring the feature identification information items from the plurality of portable devices by the radio communication when it is determined that the plurality of portable devices is carried in the vehicle; and determining which one of the physical features indicated by the feature identification information matches a physical feature of a person detected as the person sitting in a driver's seat of the vehicle, and driving-environment setup means for setting a driving environment of the vehicle to the driving environment for the one of the associated users who is identified as the driver based on the environment identification information item received by the radio communication means.

26. The in-vehicle device of claim 25, wherein when a single feature identification information item is receivable from one of the plurality of portable devices, the driver identifying means identifies the associated user of the one of the plurality of portable devices as the driver of the vehicle.

27. The in-vehicle device of claim 25, further comprising:
a setup information management device operable to store an environment setup information item indicative of the driving environment of the associated user of the each of the plurality of portable devices, wherein:
the environmental information transmitting means of the each of the plurality of portable devices is operable to transmit, as the environment identification information item, an information item that is used for identifying the environment setup information item of the associated user of the each of the plurality of portable devices among the environment setup information items stored in the setup information management device; and
the driving-environment setup means acquires, from the setup information management device, the environment setup information item identified based on the environment identification information item and sets the driving environment of the vehicle for the driver as the driving environment indicated by the environment setup information item acquired from the setup information management device.

28. The in-vehicle device of claim 25, further comprising:
wherein the in-vehicle device includes setup information storage means for storing an environment setup information item indicative of the driving environment of the associated user of the each of the plurality of portable devices,
wherein the environmental information transmitting means of the each of the plurality of portable devices is operable to transmit, as the environment setup information item, an information item that is used for identifying the environment setup information item of the associated user of the each of the plurality of portable devices among the environment setup information items stored in the setup information storage means, and
wherein the driving-environment setup means acquires, from the setup information storage means, the environment setup information item identified based on the environment identification information item and sets the driving environment of the vehicle for the driver as the driving environment indicated by the environment setup information item acquired from the setup information storage means.

29. The in-vehicle device of claim 25,
wherein the environmental information transmitting means of the each of the plurality of portable devices is operable to transmit, as the environment identification information item, an information item indicative of the driving environment for the associated user of the each of the plurality of portable devices, and
wherein the driving-environment setup means sets the driving environment of the vehicle as the driving environment indicated by the environment identification information item.

30. The in-vehicle device of claim 25, wherein the driver identifying means identifies the one of the associated users as the driver of the vehicle when the physical feature identified based on the received feature identification information item of the one of the associated users is most similar to the physical feature detected by the feature detection means.

31. The in-vehicle device of claim 25, wherein the driver identifying means identifies the one of the associated users as the driver of the vehicle when the physical feature identified based on the received feature identification information item of the one of the associated users corresponds to the physical feature detected by the feature detection means to satisfy an identical determination condition.

32. The in-vehicle device of claim 31, wherein when the physical feature identified based on the received feature identification information item of another one of the associated users satisfies the identical determination condition, the driver identifying means identifies, as the driver of the vehicle, one of the one and the another one of the associated users based on an external operation.

33. The in-vehicle device of claim 32, wherein, even in a case, where the physical feature identified based on the received feature identification information item of the another one of the associated users satisfies the identical determination condition, if the driving environments identified based on the environment identification information items of the one and the another one of the associated users are similar to each other to satisfy a similarity criterion condition, the driver identifying means identifies as the driver of the vehicle one of the one and the another one of the associated users regardless of the external operation.

34. The in-vehicle device of claim 33, wherein the driver identifying means identifies the one of the one and the another one of the associated users as the driver of the vehicle based on the external operation for adjusting the driving environment of the vehicle.

35. The in-vehicle device of claim 32, wherein, even in a case, where the physical feature indicated by the received feature identification information item of the another one of the associated users satisfies the identical determination condition, if the driving environments identified based on the environment identification information items of the one and the another one of the associated users mutually have an identical part with each other, the driving-environment setup means sets the identical part of the driving environment of the vehicle regardless of the external operation.

36. The in-vehicle device of claim 25, wherein the in-vehicle device includes driving-environment temporary setup means for setting the driving environment of the vehicle as the driving environment for the associated user of the portable device before the driver gets in the vehicle, based on the environment identification information item received from the portable device located outside the vehicle.

37. The in-vehicle device of claim 25, further comprising:
a feature information management device operable to store a feature information item indicative of the physical feature of the associated user of the each of the plurality of portable devices,
wherein the feature information transmitting means of the each of the plurality of portable devices is operable to transmit, as the feature identification information item, an information item used for identifying the feature information item of the associated user of the each of the plurality of portable devices among the feature information items stored in the feature information management device, and wherein the driver identifying means acquires, from the feature information management device, the feature information item identified based on the feature identification information item and identifies the one of the associated users as the driver of the vehicle when the physical feature indicated by the feature information item acquired from the feature information management device corresponds to the physical feature detected by the feature detection means.

38. The in-vehicle device of claim 25,
wherein the in-vehicle device includes feature information storage means for storing a feature information item indicative of the physical feature of the associated user of the each of the plurality of portable devices,
wherein the feature information transmitting means of the portable device is operable to transmit, as the feature identification information item, an information item used for identifying the feature information item of the associated user of the each of the plurality of the portable devices among the feature information items stored in the feature information storage means, and
wherein the driver identifying means acquires, from the feature information storage means, the feature information item identified based on the feature identification information item and identifies the one of the associated users as the driver of the vehicle when the physical feature indicated by the feature information item acquired from the feature information storage means corresponds to the physical feature detected by the feature detection means.

39. The in-vehicle device of claim 25,
wherein the feature information transmitting means of the each of the plurality of portable devices is operable to transmit, as the feature identification information item, an information item indicative of the physical feature of the associated user of the each of the plurality of portable devices, and
wherein the driver identifying means identifies the one of the associated users as the driver of the vehicle when the physical feature indicated by the feature identification information item of the one of the associated users corresponds to the physical feature detected by the feature detection means.

40. A portable device for an associated user configured to communicate with an in-vehicle device mounted in a vehicle, wherein the portable device is configured to be carried in the vehicle, wherein the in-vehicle device detects a physical feature of a person sitting in a driver's seat of the vehicle, wherein the portable device is configured to mutually communicate with the in-vehicle device that includes radio communication means for performing radio communication with a plurality of portable devices existing in a communication area of the radio communication means and the in-vehicle device identifies which one of the associated users of each of the plurality of portable devices is a driver of the vehicle by determining whether or not the plurality of portable devices is carried in the vehicle and acquiring the feature identification items from the plurality of portable devices by the radio communication when it is determined that the plurality of portable devices is carried in the vehicle, the in-vehicle device determines which one of the physical features indicated by a received feature identification information item matches a physical feature of the person sitting in the driver's seat as detected by the in-vehicle device, and wherein the in-vehicle device sets a driving environment of the vehicle to the driving environment for the one of the associated users who is identified as the driver, based on the environment identification information item received by the radio communication means, the portable device comprising:
feature information transmitting means for transmitting, to the in-vehicle device, the feature identification information item indicative of the physical feature of the associated user of the portable device; and
environmental information transmitting means for transmitting, to the in-vehicle device, the environment identification information item indicative of the driving environment for the associated user.

41. An article of manufacture for an in-vehicle device mounted on a vehicle, wherein the in-vehicle device is configured to communicate with a plurality of portable devices, wherein the plurality of portable devices are configured to be carried in the vehicle, wherein each of the plurality of portable devices transmits, to the in-vehicle device, a feature identification information item indicative of a physical feature of an associated user of the each of the plurality of portable devices, and wherein the each of the plurality of portable devices transmits, to the in-vehicle device, an environment identification information item indicative of a driving environment for the associated user, the article of manufacture comprising:
a computer readable medium readable by a computer; and
program instructions carried by the computer readable medium for causing the computer to serve as:
driver identifying means for identifying which one of the associated users of the each of the plurality of portable devices is a driver of the vehicle, by:
communicating, via a radio communication means of the in-vehicle device, with the plurality of portable devices existing in a communication area of the radio communication means;
determining whether or not the plurality of portable devices is carried in the vehicle, and acquiring the feature identification information items from the plurality of portable devices by the radio communication when it is determined that the plurality of portable devices is carried in the vehicle; and
determining which one of the physical features indicated by the feature identification information matches a physical feature detected of the person sitting in a driver's seat of the vehicle; and
driving-environment setup means for setting a driving environment of the vehicle to the driving environment for the one of the associated users who is identified as the driver, based on the environment identification information item received by the radio communication means.

42. An article of manufacture for a portable device for an associated user, wherein the portable device is configured to communicate with an in-vehicle device mounted in a vehicle, wherein the portable device is configured to be carried in the vehicle, wherein the in-vehicle device detects a physical feature of a person sitting in a driver's seat of the vehicle, wherein the portable device is configured to mutually communicate with the in-vehicle device that includes radio communication means for performing radio communication with a plurality of portable devices existing in a communication area of the radio communication means and the in-vehicle device identifies which one of the associated users of each of the plurality of portable devices is a driver of the vehicle by determining whether or not the plurality of portable devices is carried in the vehicle and acquiring the feature identification items from the plurality of portable devices by the radio communication when it is determined that the plurality of portable devices is carried in the vehicle, the in-vehicle device determines which one of the physical features indicated by a received feature identification information item matches a physical feature of the person sitting in the driver's seat as detected by the in-vehicle device, and wherein the in-vehicle device sets a driving environment of the vehicle to the driving environment for the one of the associated users who is identified as the driver, based on the environment identification information item received by the radio communication means, the article of manufacture comprising:

a computer readable medium readable by a computer; and program instructions carried by the computer readable medium for causing the computer to serve as:

feature information transmitting means for transmitting, to the in-vehicle device, the feature identification information item indicative of the physical feature of the associated user of the portable device; and environmental information transmitting means for transmitting, to the in-vehicle device, the environment identification information item indicative of the driving environment for the associated user.

43. An in-vehicle device mounted on a vehicle, wherein the in-vehicle device is configured to communicate with a plurality of portable devices, each of which transmits identification information unique to the each of the plurality of portable devices, the in-vehicle device comprising:

feature detection means for detecting a physical feature of a person sitting in a driver's seat of the vehicle;

radio communication means for performing radio communication with the plurality of portable devices existing in a communication area of the radio communication means; driver identifying means for identifying which one of the associated users of the each of the plurality of portable devices is a driver of the vehicle, by:

determining whether or not the plurality of portable devices is carried in the vehicle, and acquiring feature identification information items from the plurality of portable devices by the radio communication when it is determined that the plurality of portable devices is carried in the vehicle; and determining which one of the physical features of the person sitting in the driver's seat as indicated by the feature detection means matches a predetermined physical feature identified based on the identification information received from one of the plurality of portable devices; and driving-environment setup means for setting a driving environment of the vehicle to a predetermined driving environment for the one of the associated users who is identified as the driver by the driver identifying means, based on the identification information received from the one of the plurality of the portable devices when the driver identifying means determines that the detected physical feature corresponds to the predetermined physical feature of the one of the plurality of the portable devices.

\* \* \* \* \*